US009262404B2

(12) United States Patent
Ingram et al.

(10) Patent No.: US 9,262,404 B2
(45) Date of Patent: Feb. 16, 2016

(54) SYSTEM FOR GENERATING TEST SCENARIOS AND TEST CONDITIONS AND EXPECTED RESULTS

(71) Applicant: Accenture Global Services Limited, Dublin (IE)

(72) Inventors: David E. Ingram, Kent (GB); Brian Ahern, Surrey (GB); Shubhashis Sengupta, Bangalore (IN); Anurag Dwarakanath, Bangalore (IN); Kapil Singi, Bangalore (IN); Anitha Chandran, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 551 days.

(21) Appl. No.: 13/724,739

(22) Filed: Dec. 21, 2012

(65) Prior Publication Data

US 2013/0185056 A1 Jul. 18, 2013

(30) Foreign Application Priority Data

Jan. 12, 2012 (IN) ............................ 122/CHE/2012
Dec. 13, 2012 (IN) ............................ 122/CHE/2012

(51) Int. Cl.
*G06F 17/27* (2006.01)
*G06F 17/21* (2006.01)
(Continued)

(52) U.S. Cl.
CPC ............ *G06F 17/28* (2013.01); *G06F 11/3684* (2013.01); *G06F 17/271* (2013.01)

(58) Field of Classification Search
CPC .............. G06F 17/2725; G06F 17/272; G06F 17/2775; G06F 17/30731; G06F 17/30914; G06F 11/3664; G06F 17/2264; G06F 17/24; G06F 17/2705; G06F 17/30371; G06F 17/30938; G06F 8/427; G06F 11/2294; G06F 11/302; G06F 11/3604; G06F 11/3608
USPC ......... 704/9, 10, E15.026, E15.022, 270, 275
See application file for complete search history.

(56) References Cited

U.S. PATENT DOCUMENTS 6,907,546 B1 * 6/2005 Haswell et al. ............ 714/38.11
7,844,861 B2 * 11/2010 Hegarty et al. ................. 714/46

(Continued)

FOREIGN PATENT DOCUMENTS

AU 2012 200171 1/2012

OTHER PUBLICATIONS

Fabbrini, F.; Fusani, M.; Gnesi, S.; Lami, G., "The linguistic approach to the natural language requirements quality: benefit of the use of an automatic tool," Software Engineering Workshop, 2001. Proceedings. 26th Annual NASA Goddard, vol., no., pp. 97,105, 2001.*

(Continued)

*Primary Examiner* — Edgar Guerra-Erazo
(74) *Attorney, Agent, or Firm* — Brinks Gilson & Lione

(57) ABSTRACT

A requirements testing system facilitates the review and analysis of requirement statements for software applications. The requirements testing system automatically generates test artifacts from the requirement statements, including test scenarios, test conditions, test hints, and expected results. These test artifacts characterize the requirements statements to provide valuable analysis information that aids understanding what the intentions of the requirement statements are. The automation of the generation of these test artifacts produces numerous benefits, including fewer errors, objectivity, and no dependency on the skills and experience of a creator.

20 Claims, 36 Drawing Sheets

(51) Int. Cl.
*G06F 17/28* (2006.01)
*G06F 11/36* (2006.01)

(56) References Cited

U.S. PATENT DOCUMENTS

| | | | | |
|---|---|---|---|---|
| 8,271,870 | B2 * | 9/2012 | Verma et al. | 715/237 |
| 8,843,819 | B2 * | 9/2014 | Verma et al. | 715/229 |
| 8,935,654 | B2 * | 1/2015 | Sengupta et al. | 717/101 |
| 9,038,026 | B2 * | 5/2015 | Chandra et al. | 717/124 |
| 9,047,414 | B1 * | 6/2015 | Matyjek | |
| 2005/0193269 | A1 * | 9/2005 | Haswell et al. | 714/38 |
| 2005/0240794 | A1 | 10/2005 | Sinha et al. | |
| 2006/0161414 | A1 * | 7/2006 | Carignano et al. | 703/17 |
| 2008/0109475 | A1 | 5/2008 | Burmester et al. | |
| 2009/0192787 | A1 * | 7/2009 | Roon | G06F 17/2715 704/9 |
| 2011/0239104 | A1 | 9/2011 | Prasad et al. | |
| 2013/0097586 | A1 * | 4/2013 | Chandra et al. | 717/124 |
| 2013/0332812 | A1 * | 12/2013 | Houston | G06F 17/2725 715/230 |
| 2014/0123113 | A1 * | 5/2014 | Murthy et al. | 717/125 |

OTHER PUBLICATIONS

Boddu, R.; Guo, L.; Mukhopadhyay, S.; Cukic, Bojan, "RETNA: from requirements to testing in a natural way," Requirements Engineering Conference, 2004. Proceedings. 12th IEEE International, vol., no., pp. 262,271, Sep. 6-11, 2004.*

Extended European Search Report issued on May 14, 2013 in EP Appln. No. 13000150.6 (9 pgs).

Thummalapenta Suresh, et al., "Automating Test Automation", IBM Research Report, Sep. 2011, XP002696059, http://researcher.watson.ibm.com/researcher/files/in-saurabhsinha/ata-techrep-RI11014.pdf (16 pgs).

Sneed, H., et al., "Testing against Natural Language Requirements", Quality Software, 2007. QSIC '07, Seventh International Conference on, IRRR, Piscataway NJ, USA Oct. 11, 2007, XP031338267, ISBN:978-0-7695-3035-2 (8 pgs).

Office Action issued in corresponding Australian Appln. No. 2013200136 dated Aug. 9, 2013 (5 pgs).

Australian Patent Examination Report No. 3, dated Feb. 28, 2014, pp. 1-5, issued in Australian Patent Application No. 2013200136, IP Australia, Woden, ACT, Australia.

Australian Patent Examination Report No. 4, dated Jul. 8, 2014, pp. 1-3, issued in Australian Patent Application No. 2013200136, IP Australia, Woden, ACT, Australia.

Notice of Acceptance, dated Jul. 28, 2014, pp. 1-3, issued in Australian Patent Application No. 2013200136, IP Australia, Woden, ACT, Australia.

Office Action issued in corresponding Australian Appln. No. 2013200136 dated Mar. 6, 2013 (5 pgs).

* cited by examiner 1.1 S-I-O

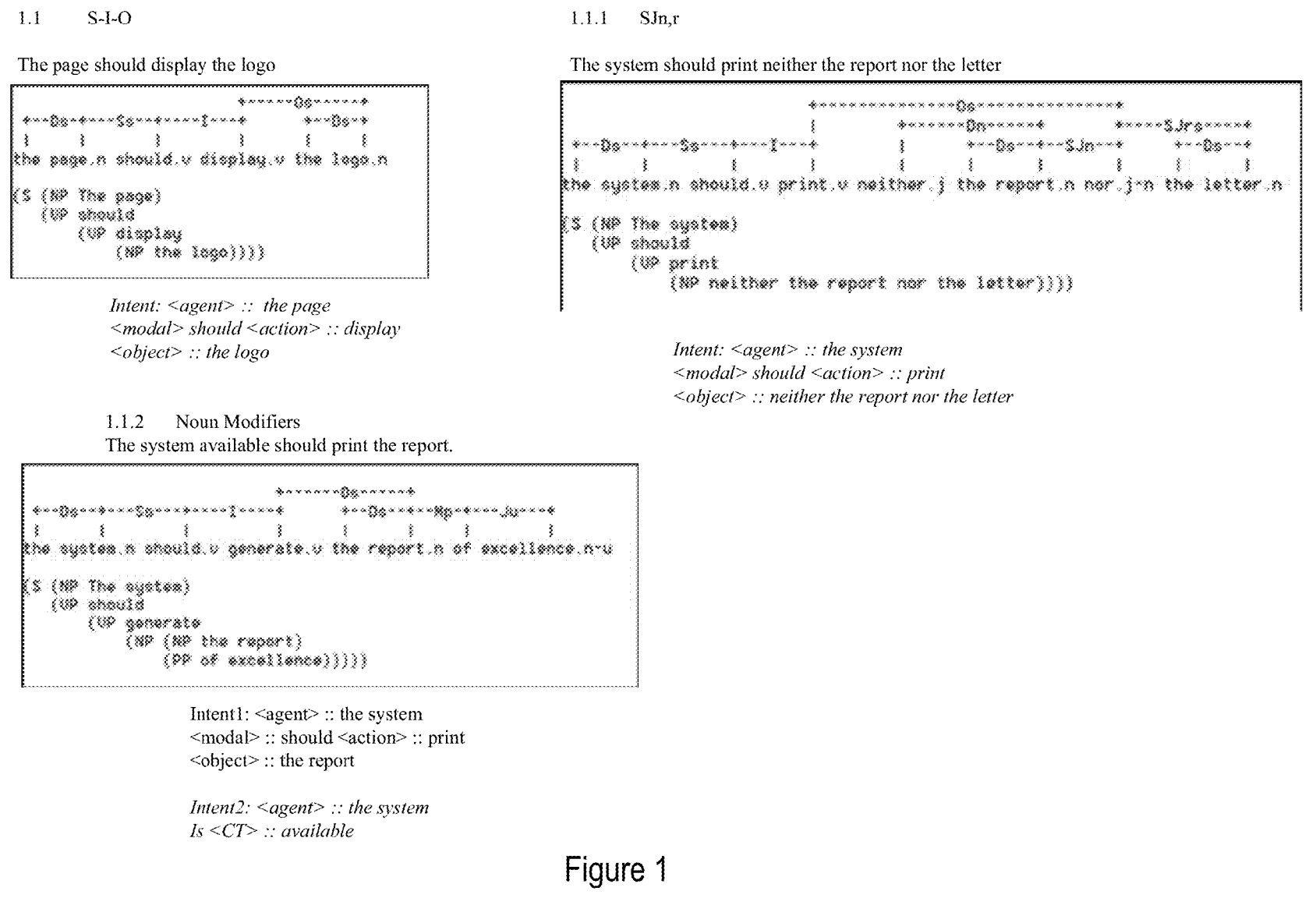

The page should display the logo

```
                                +------Os------+
+--Ds--+----Ss--+-----I---+        +--Ds-+
|      |        |         |        |     |
the page.n should.v display.v the logo.n

(S (NP The page)
   (VP should
       (VP display
           (NP the logo))))
```

*Intent: <agent> :: the page*
*<modal> should <action> :: display*
*<object> :: the logo*

1.1.1 SJn,r

The system should print neither the report nor the letter

```
                                     +---------------Os---------------+
                                     |         +------Dn------+      +----SJrs-----+
+--Ds--+---Ss---+---I---+             |        +--Ds--+--SJn--+       +--Ds--+
|      |        |       |             |        |      |       |       |      |
the system.n should.v print.v neither.j the report.n nor.j-n the letter.n

(S (NP The system)
   (VP should
       (VP print
           (NP neither the report nor the letter))))
```

*Intent: <agent> :: the system*
*<modal> should <action> :: print*
*<object> :: neither the report nor the letter*

1.1.2 Noun Modifiers

The system available should print the report.

```
                                     +------Os------+
+--Ds--+---Ss---+-----I----+         +--Ds--+--Mp--+----Ju---+
|      |        |          |         |      |      |         |
the system.n should.v generate.v the report.n of excellence.n-u

(S (NP The system)
   (VP should
       (VP generate
           (NP (NP the report)
               (PP of excellence)))))
```

Intent1: <agent> :: the system
<modal> :: should <action> :: print
<object> :: the report

*Intent2: <agent> :: the system*
*Is <CT> :: available*

Figure 1

1.1.3 Noun Modifiers – Pronoun

The password should contain numbers whose total is 8

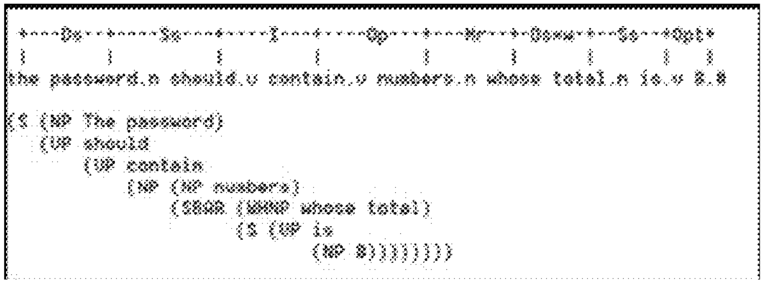

Intent1: <agent> :: the password
<modal> should <action> :: contain
<object> :: numbers

*Intent 2: <object's>:: numbers's*
*<SBAR>:: total is 8*

1.1.4 Noun Modifiers – infinitive to, object

The system should generate a password to authenticate the user

Intent1: <agent> :: the system
<modal> should <action> :: generate
<object> :: a password

*Intent 2: <object>:: the password*
*<previous action in past tense> is generated <action>:: to authenticate*
*<object>:: the user*

Figure 2

1.1.5 Noun Modifiers – infinitive to

The user should enter the CLOSE command to exit

```
                         +---------Os---------+
                         |     +------Ds------+
+---Ds--+---Ss--+---I----+     |   +---AN---+----TO---+--I--+
|       |       |        |     |   |        |         |     |
the user.n should.v enter.v the CLOSE command.n to.r exit.v

(S (NP The user)
   (VP should
      (VP enter
         (NP the CLOSE command
            (S (VP to
                  (VP exit)))))))
```

Intent1: <agent> :: the user
<modal> should <action> :: enter
<object> :: the CLOSE command

*Intent 2: <object>:: the CLOSE command*
*<previous action in past tense> is entered <action>:: to exit*

1.1.6 Noun Modifiers – "which"

The system should display passwords that are unencrypted

```
                                            +---------Bp---------+
+---Ds--+---Ss---+----I----+-----Op-----+------R-----+---RS---+----Pa---+
|       |        |         |            |            |        |         |
the system.n should.v display.v passwords.n that.j-r are.v unencrypted.a

(S (NP The system)
   (VP should
      (VP display
         (NP (NP passwords)
            (SBAR (WHNP that)
               (S (VP are
                     (ADJP unencrypted))))))))
```

Intent1: <agent> :: the system
<modal> should <action> :: display
<object> :: passwords

*Intent2: <clause2>:: the passwords are unencrypted*

Figure 3

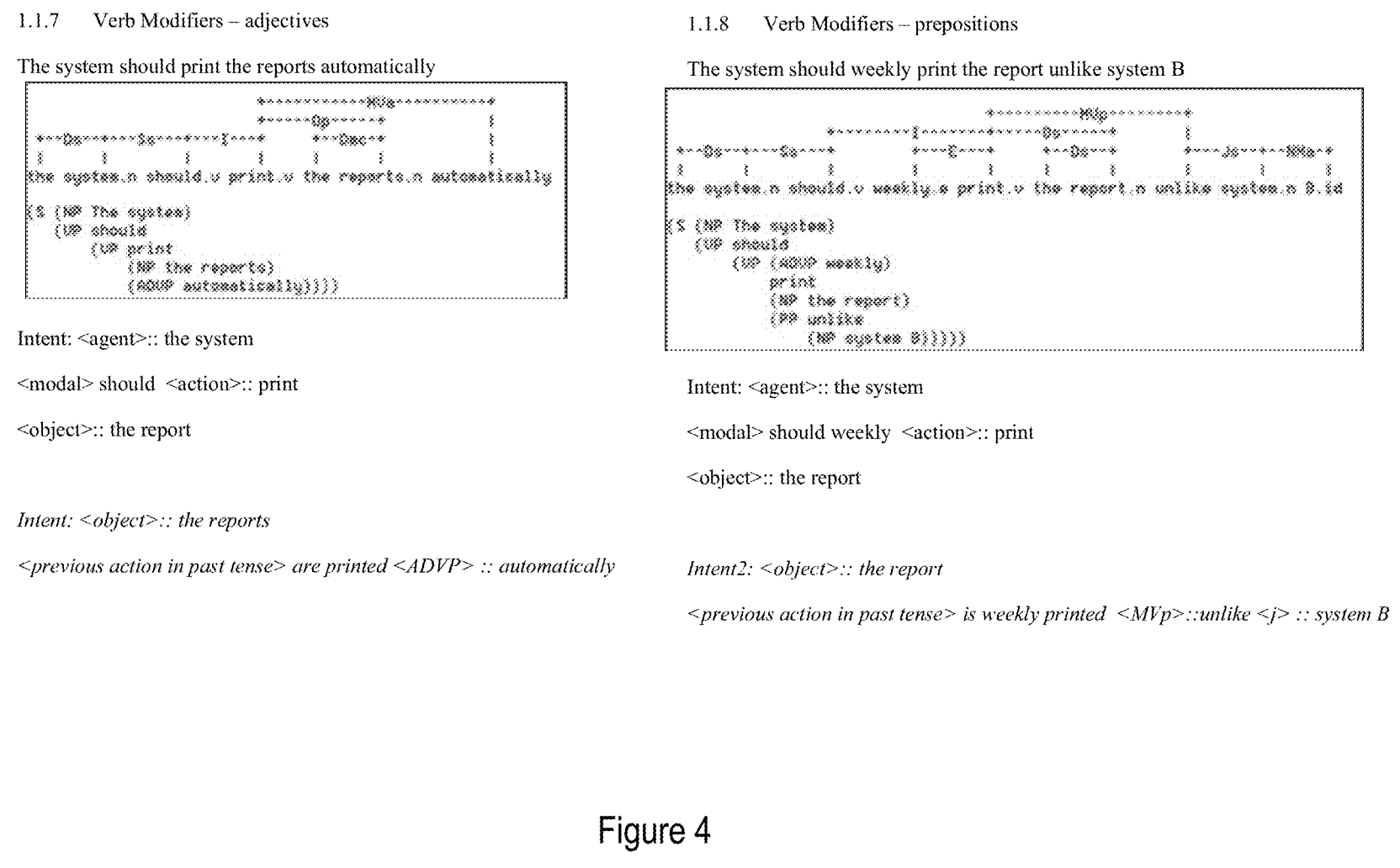

1.1.7 Verb Modifiers – adjectives

The system should print the reports automatically

```
                              +------------MVa-----------+
                              +------Op------+           |
+--Ds--+---Ss---+---I----+    +--Dmc-+              |
|      |        |        |    |      |              |
the system.n should.v print.v the reports.n automatically

(S (NP The system)
   (VP should
      (VP print
         (NP the reports)
         (ADVP automatically))))
```

Intent: <agent>:: the system

<modal> should <action>:: print

<object>:: the report

*Intent: <object>:: the reports*

*<previous action in past tense> are printed <ADVP> :: automatically*

1.1.8 Verb Modifiers – prepositions

The system should weekly print the report unlike system B

```
                                  +---------MVp---------+
                    +--------I--------+-----Os------+        |
+--Ds--+---Ss---+        +---E---+    +--Ds--+      +---Js--+--NMa-+
|      |        |        |       |    |      |      |       |      |
the system.n should.v weekly.e print.v the report.n unlike system.n B.id

(S (NP The system)
   (VP should
      (VP (ADVP weekly)
         print
         (NP the report)
         (PP unlike
            (NP system B)))))
```

Intent: <agent>:: the system

<modal> should weekly <action>:: print

<object>:: the report

*Intent2: <object>:: the report*

*<previous action in past tense> is weekly printed <MVp>::unlike <j> :: system B*

Figure 4

1.1.9 Verb Modifiers – conjunctions

The system should print the report once

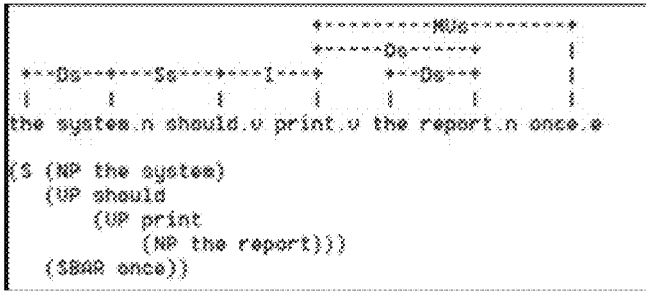

Intent: <agent>:: the system
<modal> should <action>:: print
<object>:: the report
*Intent2: <object>:: the report*
*<previous action in past tense> is printed <ADVP> :: once*

1.1.10 Verb Modifiers – "in order to"

The system should print the report to maintain a record

Intent: <agent>:: the system
<modal> should <action>:: print
<object>:: the report

*Intent2: <object> :: the report*
*<previous action in past tense> is printed*
*<action2> :: to maintain*
*<object2> :: a record*

Figure 5

1.1.11 Verb Modified by forms of 'be' the system should put the tasks into the list

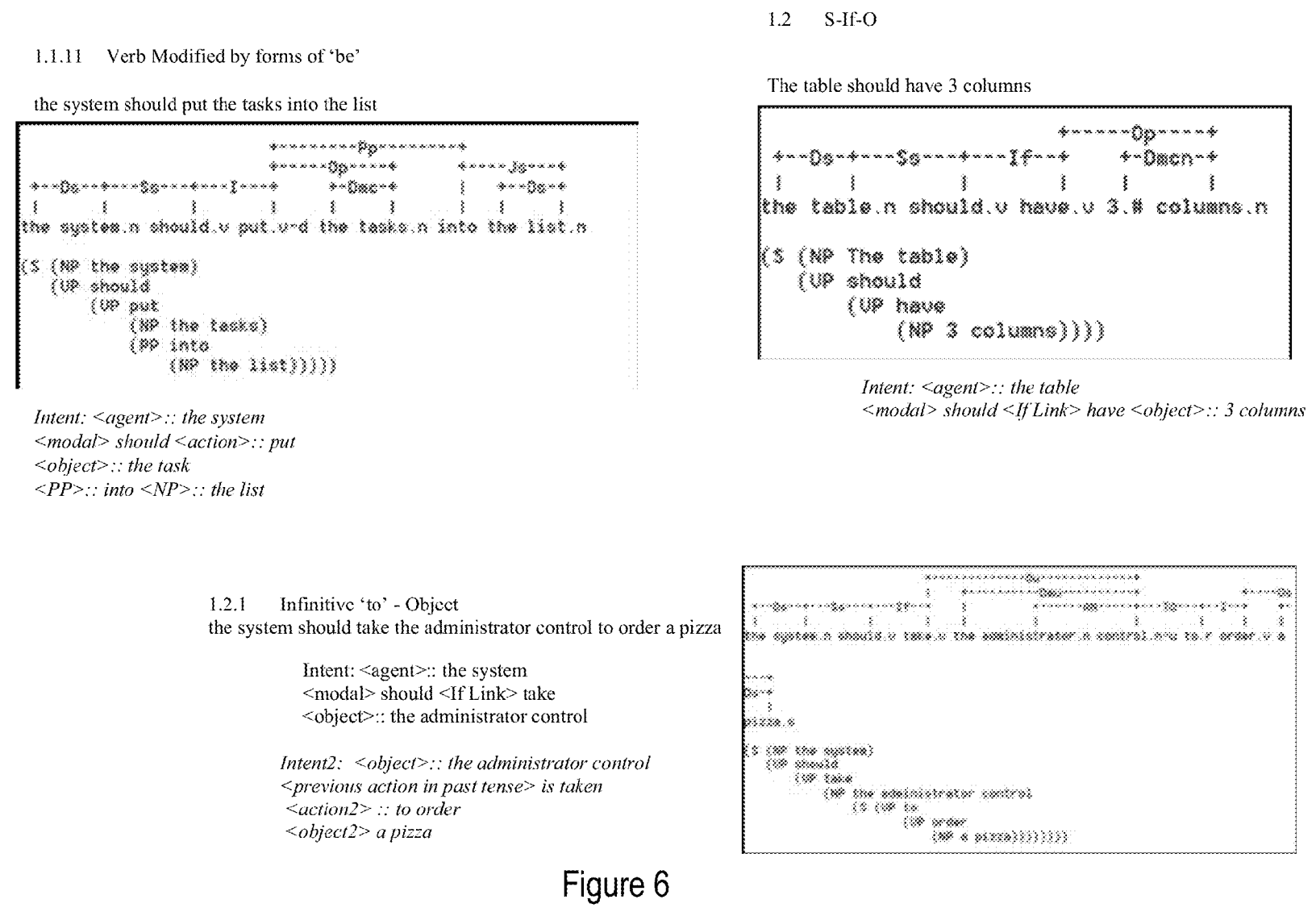

```
                              +---------Pp----------+
                              +-----Op----+      +-----Js----+
+--Ds--+---Ss---+----I----+      +--Dmc--+      |    +--Ds--+
|      |        |         |      |       |      |    |      |
the system.n should.v put.v-d the tasks.n into the list.n

(S (NP the system)
   (VP should
      (VP put
         (NP the tasks)
         (PP into
            (NP the list)))))
```

*Intent: <agent>:: the system*
*<modal> should <action>:: put*
*<object>:: the task*
*<PP>:: into <NP>:: the list*

1.2 S-If-O

The table should have 3 columns

```
                                +-----Op----+
+--Ds--+---Ss---+---If--+      +-Dmcn-+
|      |        |       |      |      |
the table.n should.v have.v 3.# columns.n

(S (NP The table)
   (VP should
      (VP have
         (NP 3 columns))))
```

*Intent: <agent>:: the table*
*<modal> should <If Link> have <object>:: 3 columns*

1.2.1 Infinitive 'to' - Object
the system should take the administrator control to order a pizza

```
the system.n should.v take.v the administrator.n control.n-u to.r order.v a
pizza.n

(S (NP the system)
   (VP should
      (VP take
         (NP the administrator control
            (S (VP to
               (VP order
                  (NP a pizza))))))))
```

Intent: <agent>:: the system
<modal> should <If Link> take
<object>:: the administrator control

*Intent2: <object>:: the administrator control*
*<previous action in past tense> is taken*
*<action2> :: to order*
*<object2> a pizza*

Figure 6

1.2.2 Infinitive ‘to’ the system should take the administrator control to exit

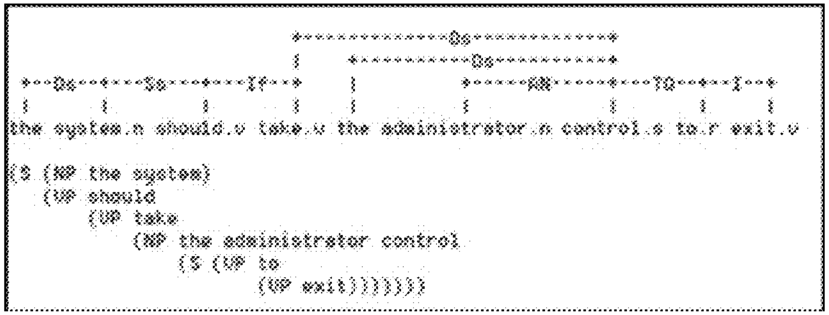

Intent: <agent>:: the system
<modal> should <If Link> take
<object>:: the administrator control

*Intent2: <object>:: the administrator control*
*<previous action in past tense> is taken*
*<action2> :: to exit*

1.2.3 Verb modifiers – adjectival;Prepositions;conjunctions the administrator should have access to the reports

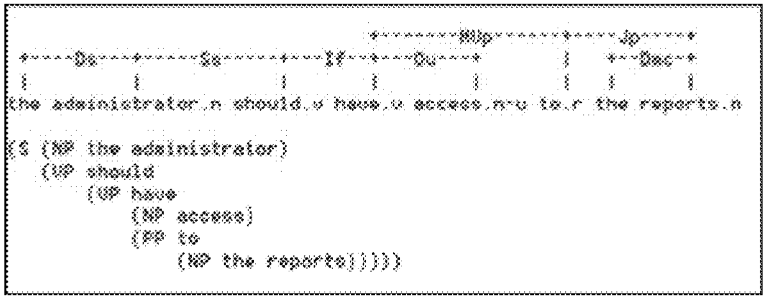

*Intent: <agent>:: the administrator*
*<modal> should <If Link>have <object>:: access*
*<PP>::to <J>:: the reports*

1.2.4 Verb Modifiers – Connecting to noun modifiers
the administrator should have control on the printing of management reports

*Intent: <agent>:: the administrator*
*<modal> should <If Link>have <object>:: control*
*<PP>:: on <J>the printing*
*<PP>::of <J>management reports*

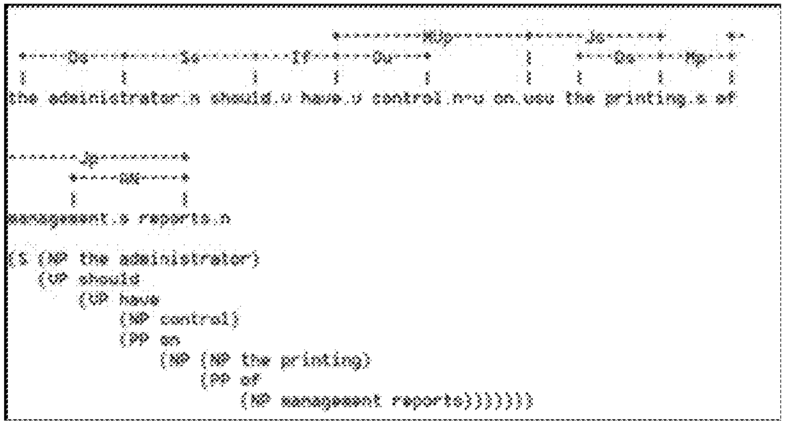

Figure 7

Figure 8:
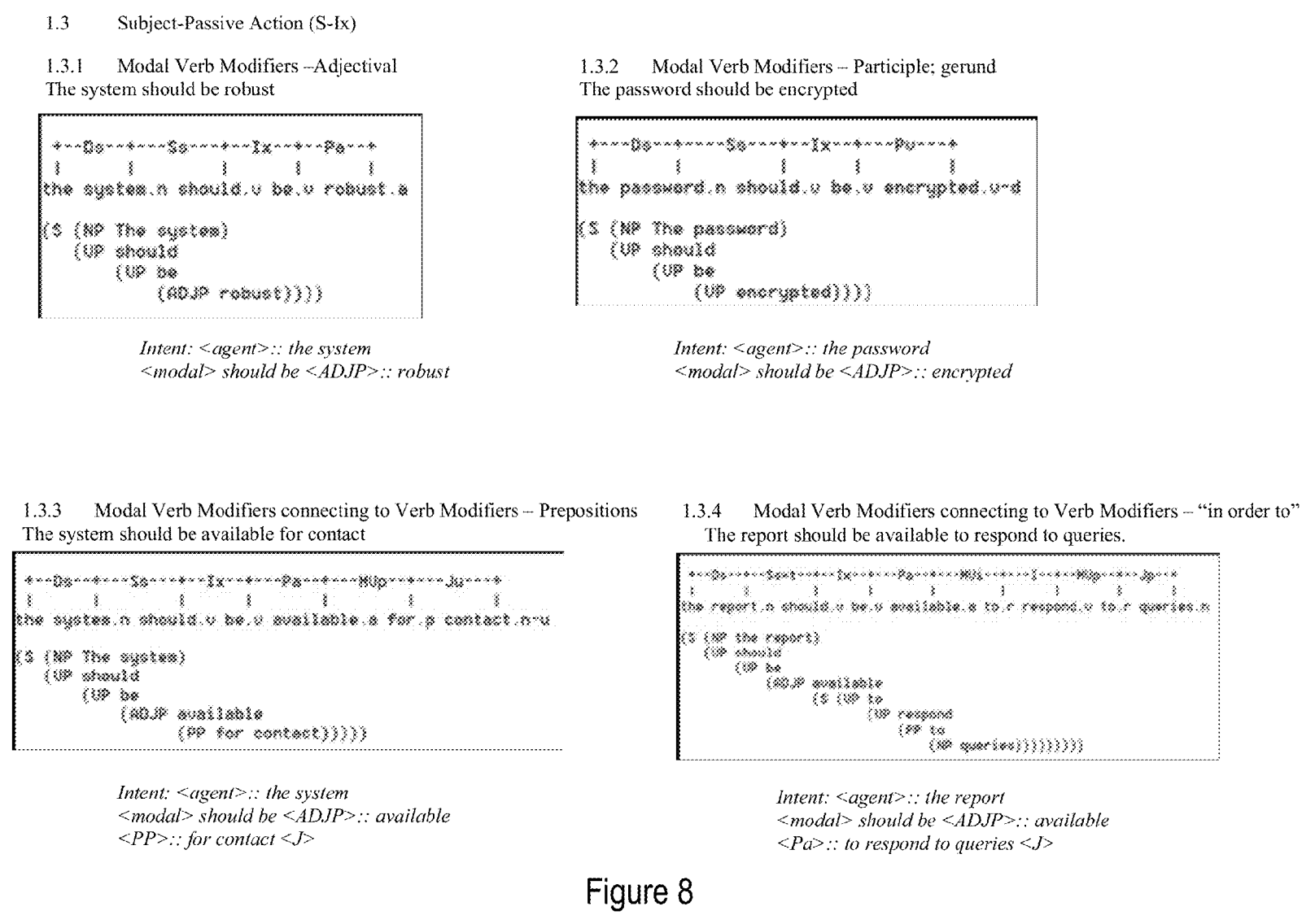

1.3 Subject-Passive Action (S-Ix)

1.3.1 Modal Verb Modifiers –Adjectival
The system should be robust

```
+--Ds--+---Ss---+--Ix--+--Pa--+
|      |        |      |      |
the system.n should.v be.v robust.a

(S (NP The system)
   (VP should
       (VP be
           (ADJP robust))))
```

*Intent: <agent>:: the system*
*<modal> should be <ADJP>:: robust*

1.3.2 Modal Verb Modifiers – Participle; gerund
The password should be encrypted

```
+---Ds--+----Ss---+--Ix--+---Pv---+
|       |         |      |        |
the password.n should.v be.v encrypted.v-d

(S (NP The password)
   (VP should
       (VP be
           (VP encrypted))))
```

*Intent: <agent>:: the password*
*<modal> should be <ADJP>:: encrypted*

1.3.3 Modal Verb Modifiers connecting to Verb Modifiers – Prepositions
The system should be available for contact

```
+--Ds--+---Ss---+--Ix--+---Pa--+---MVp---+---Jp---+
|      |        |      |       |         |        |
the system.n should.v be.v available.a for.p contact.n-u

(S (NP The system)
   (VP should
      (VP be
         (ADJP available
               (PP for contact)))))
```

*Intent: <agent>:: the system*
*<modal> should be <ADJP>:: available*
*<PP>:: for contact <J>*

1.3.4 Modal Verb Modifiers connecting to Verb Modifiers – "in order to"
The report should be available to respond to queries.

```
+--Ds---+--Ss*t---+--Ix---+---Pa---+--MVi----+---I---+--MVp---+--Jp--+
|       |         |       |        |         |       |        |      |
the report.n should.v be.v available.a to.r respond.v to.r queries.n

(S (NP the report)
   (VP should
      (VP be
         (ADJP available
            (S (VP to
               (VP respond
                  (PP to
                     (NP queries))))))))))
```

*Intent: <agent>:: the report*
*<modal> should be <ADJP>:: available*
*<Pa>:: to respond to queries <J>*

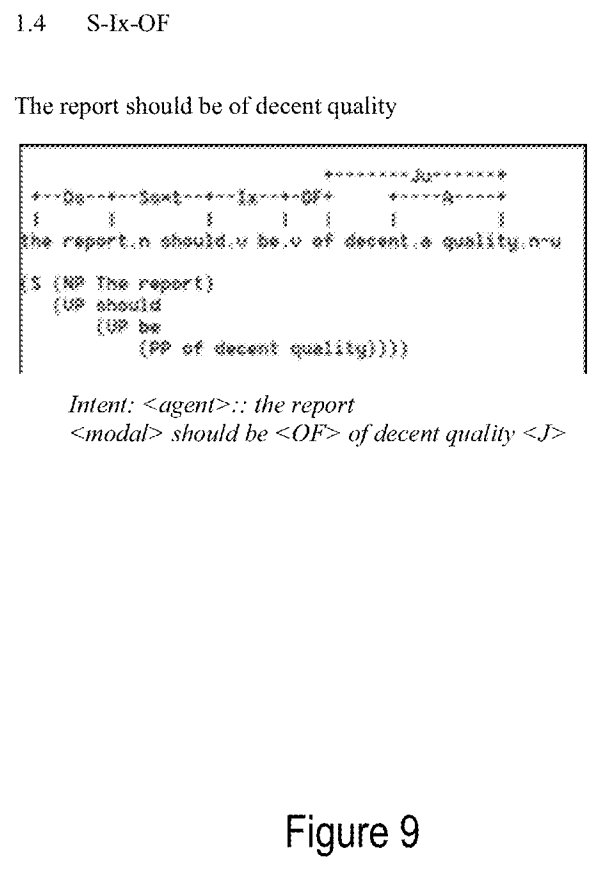

The report should be of decent quality

```
                                   +-------Ju-------+
 +--Ds--+--Ss*s--+--Ix--+-OF+      +----A----+
 |      |        |      |   |      |         |
the report.n should.v be.v of decent.a quality.n-u

(S (NP The report)
   (VP should
       (VP be
           (PP of decent quality))))
```

*Intent: <agent>:: the report*
*<modal> should be <OF> of decent quality <J>*

Figure 9

1.5 Subj-Participle – infinitval 'to' – Object

The users are required to produce management reports

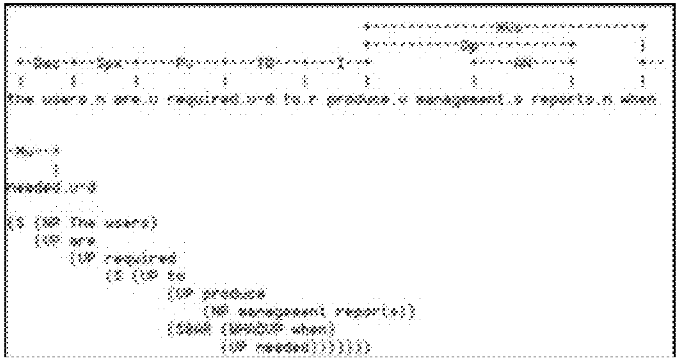

Intent1: <agent>:: the users
<modal> are required to <action>:: produce
<object>:: the management reports 1.6 Cause & effect – Testable & non-testable clauses C (among other things) connects 'when' & 'after' to the subject of the clause. By removing the C link, the sentence is broken into two clauses. We test whether any of the earlier identified testable links occur in the clauses – if so, substitute with the corresponding intent, else check for the following basic link: <clause->: S-O, <clause+>: S-I after the user clicks the button, the window should close

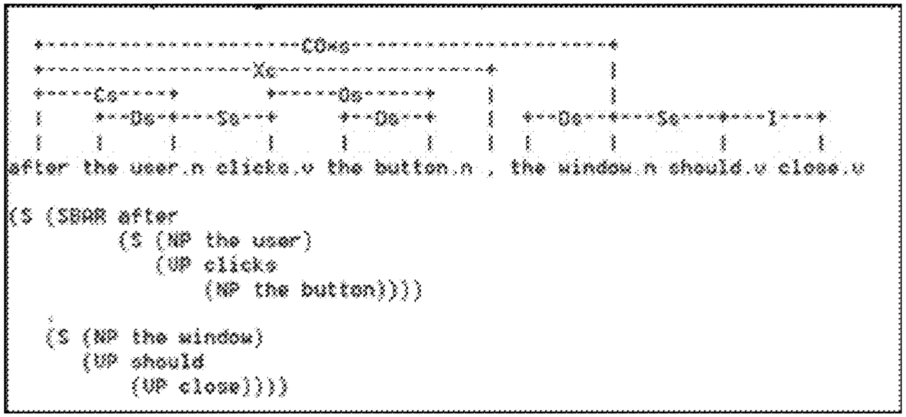

{Intent-}: <agent->:: the user
<action->:: clicks
<object->:: the button

{Intent+}: <agent+>:: the window
<action->:: should <action+>::close
<object+>

The CC link connects from the Subject of the first clause to the conjunction "and".
Break the sentences into two clauses. <clause-> is the set of words that can be reached from CC-. <clause+> that can be reached through <CC+>. Run the testability of individual clauses and put the relevant intents.
The Screen should display the user's home page and the user should be allowed to alter it

```
      +----------------------------CC----------------------------+
      |                +-----------------Os----------------+     |
      |                |                   +------Os------+      +----Wdc---+
 +--DG-+---Ss--+-----I---+     +--Ds-+--YS-+     +--AN--+      |    +--Ds-+---
 |     |      |          |     |     |     |     |      |      |    |     |
the Screen should.v display.v the user.n 's.p home.a page.n and.ij the user.n

Ss--+--Ix--+---Pv--+---TO---+--I--+--Ox-+
    |      |       |        |     |     |
should.v be.v allowed.v-d to.r alter.v it

(S (NP The Screen)
   (VP should
       (VP display
           (NP (NP the user 's)
               home page)))
   and
   (S (NP the user)
      (VP should
          (VP be
              (VP allowed
                  (S (VP to
                         (VP alter
                             (NP it))))))))))
```

Figure 11

<Intent-> <agent->:: the screen
<modal> should <action->:: display
<object->:: the user's home page <Intent+> <agent+>:: the user
Is <PV+>:: allowed
To <action+> alter
<object+>{it }

1.8 CO

CO is the opener and breaks the sentence into clauses.
<clause-> must be testable. Generally, <clause+> is only an opener
If so, replace it with the appropriate intent:
<intent->
<intent-> happens <clause+> apparently, the system should print the report

```
    +-------CO------+                  +-----Os------+
    +--Xc-+  +--Ds--+---Ss---+---I---+     +--Ds--+
    |     |  |      |        |       |     |      |
apparently . the system.n should.v print.v the report.n

(S (PP apparently)
   ,
   (S (NP the system)
      (VP should
          (VP print
              (NP the report)))))
```

<Intent> <agent->:: the system
<N> <modal> should <action->:: print
<object->:: the report
the <intent> happens <apparently>

Figure 12

Figure 13:
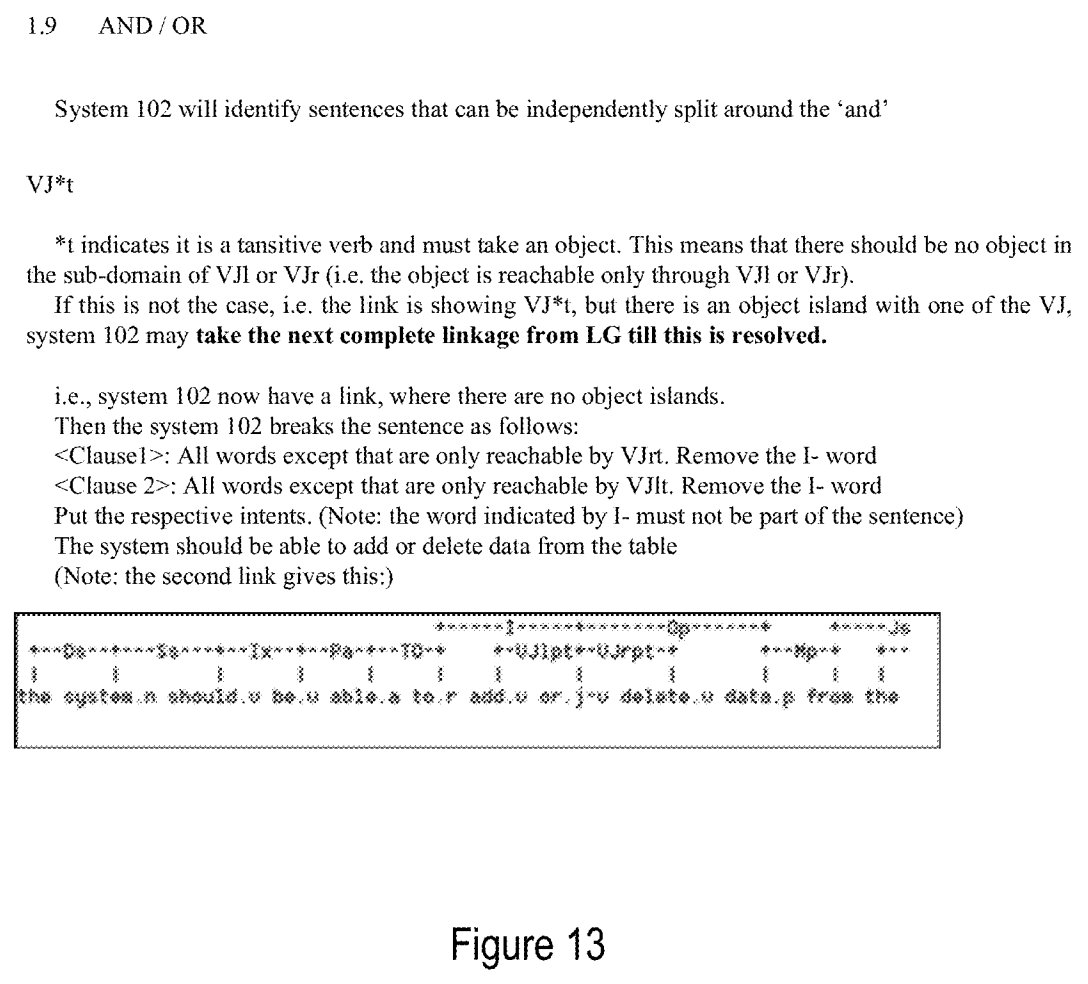

1.9 AND / OR

System 102 will identify sentences that can be independently split around the 'and'

VJ*t

*t indicates it is a tansitive verb and must take an object. This means that there should be no object in the sub-domain of VJl or VJr (i.e. the object is reachable only through VJl or VJr).

If this is not the case, i.e. the link is showing VJ*t, but there is an object island with one of the VJ, system 102 may take the next complete linkage from LG till this is resolved.

i.e., system 102 now have a link, where there are no object islands.
Then the system 102 breaks the sentence as follows:
<Clause1>: All words except that are only reachable by VJrt. Remove the I- word
<Clause 2>: All words except that are only reachable by VJlt. Remove the I- word
Put the respective intents. (Note: the word indicated by I- must not be part of the sentence)
The system should be able to add or delete data from the table
(Note: the second link gives this:)

```
                                        +------I-------------Op-------+      +-----Js
 +--Ds--+----Ss----+---Ix---+--Pa-+--TO-+     +-VJlpt+-VJrpt-+        +--Mp-+    +--
 |      |          |        |     |     |     |      |       |        |     |    |
the system.n should.v be.v able.a to.r add.v or.j-v delete.v data.p from the
```

Clause1: the system should be able to add data from the table
Clause2: the system should be able to delete data from the table
<Intent1>: <agent>:: the system
<N> <modal> should be<ADJP>:: able
<action>:: to add
<object> :: data
<Intent2> <object>:: data
Is <action in past tense> added
<PP> from <NP>:: the table <Intent3>: <agent>:: the system
<N> <modal> should be<ADJP>:: able
<action>:: to delete
<object> :: data
<Intent4> <object>:: data
Is <action in past tense> deleted
<PP> from <NP>:: the table

*i indicates intransitive verb. Both of VJli VJri must have an object associated with it.

If this is not the case, i.e. the link is showing VJ*t, but there is an object island with one of the VJ, system 102 take the next complete linkage from LG till this is resolved.

System 102 may divide into clauses as follows:

<Clause1>: remove I- word and all words reachable only through VJri

<Clause2>: remove I- word & all words reachable only through VJl*I+ word

Run independent sentences with the associated intent template. Conjoin the templates with the I- link The system should print the document and dispatch it to the user Clause1: the system should print the document Clause2: the system should dispatch it to the user <intent1>: <agent>:: the system
<Modal> should <action1>:: print
<object1>:: the document <intent2>: <agent>:: the system
<Modal> should <action2>:: dispatch
{<object2>} -> if <object2> is Ox put <object1> in brackets:: it (the document)

<intent3>: <Object>:: it (the document)
is <action in past tense>:: dispatched
<PP>:: to <NP>:: the user

MJ connects the prepositions together. When MJl,r occurs, one of them (generally MJr) should break the sentence into two distinct pasts. If the word connected by MJr- can be reached without going through MJr, then system 102 gets the next link.

the user should select the option below 10 but above 5

<Clause 1>: Remove words that are only connected by MJr
The user should select the option below 10
<Clause 2>: Remove words that are only connected by MJl
The user should select the option above 5

<Clause1> and <clause2>

Figure 26:
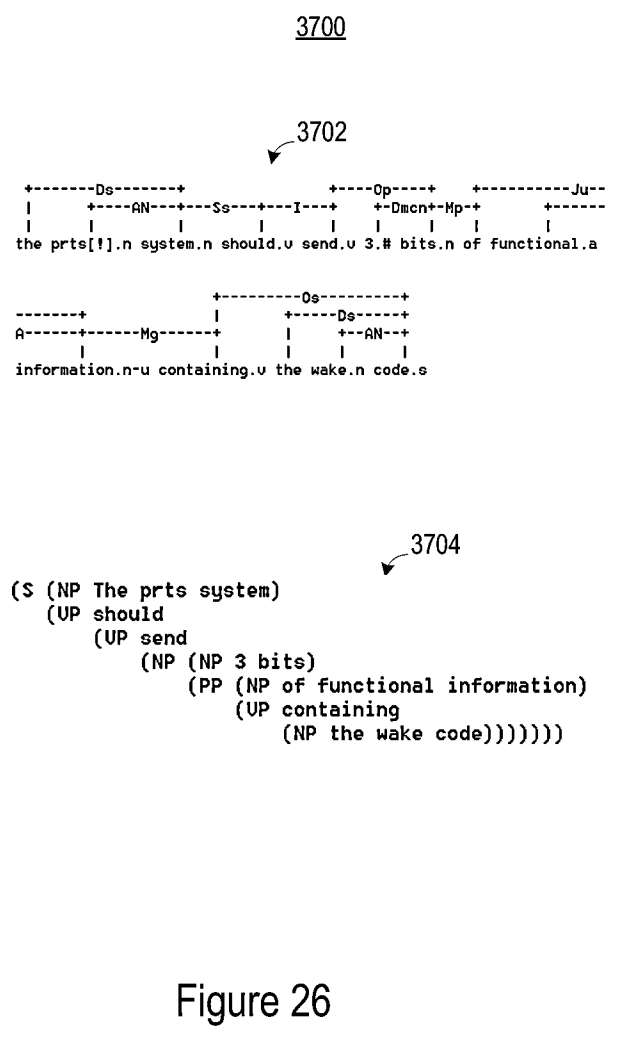

```
+--------Ds--------+                  +----Op----+    +-----------Ju--
|       +----AN---+---Ss---+---I---+     +-Dmcn+-Mp-+        +------
|       |         |        |       |     |     |    |        |
the prts[!].n system.n should.v send.v 3.# bits.n of functional.a

                              +---------Os---------+
-------+                      |       +-----Ds-----+
A------+------Mg------+       |       |     +--AN--+
       |              |       |       |     |      |
information.n-u containing.v the wake.n code.s
```

3704

```
(S (NP The prts system)
   (VP should
       (VP send
           (NP (NP 3 bits)
               (PP (NP of functional information)
                   (VP containing
                       (NP the wake code)))))))
```

Examples: MVs-Cs

Intent: <agent>:: the usable fuel
<action>:: falls
<object>::below 15 %
Intent: <agent>:: the module
<Modal> should <action> illuminate
<object> the low-fuel warning error Weak Verb Example: (I.5)

Figure 28:
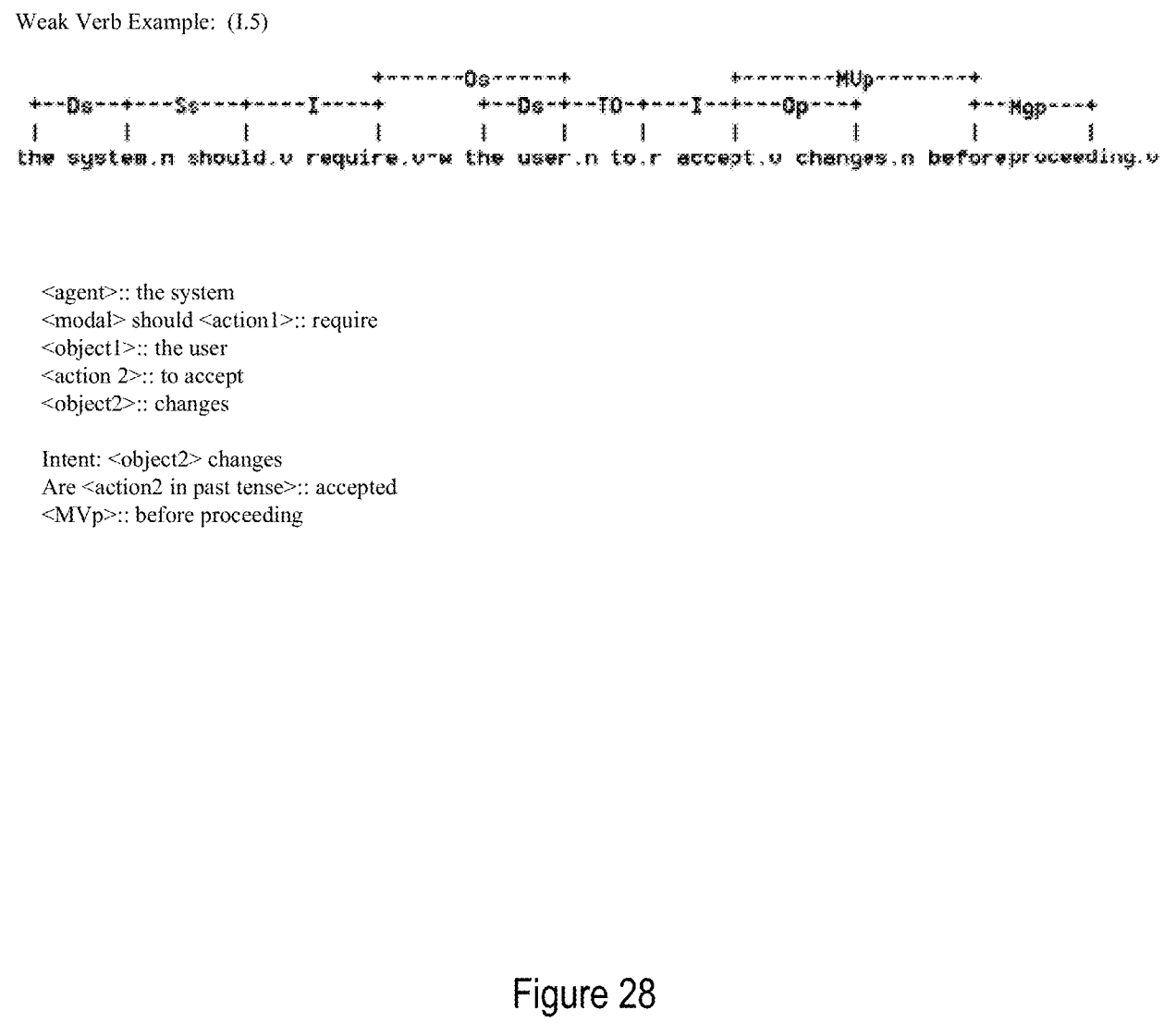

```
                        +-------Os-------+           +---------MVp---------+
 +--Ds--+----Ss---+-----I-----+      +--Ds-+--TO-+---I--+---Op---+      +--Mgp---+
 |      |         |           |      |     |     |      |        |      |        |
the system.n should.v require.v-w the user.n to.r accept.v changes.n beforeproceeding.v
```

<agent>:: the system
<modal> should <action1>:: require
<object1>:: the user
<action 2>:: to accept
<object2>:: changes Intent: <object2> changes
Are <action2 in past tense>:: accepted
<MVp>:: before proceeding

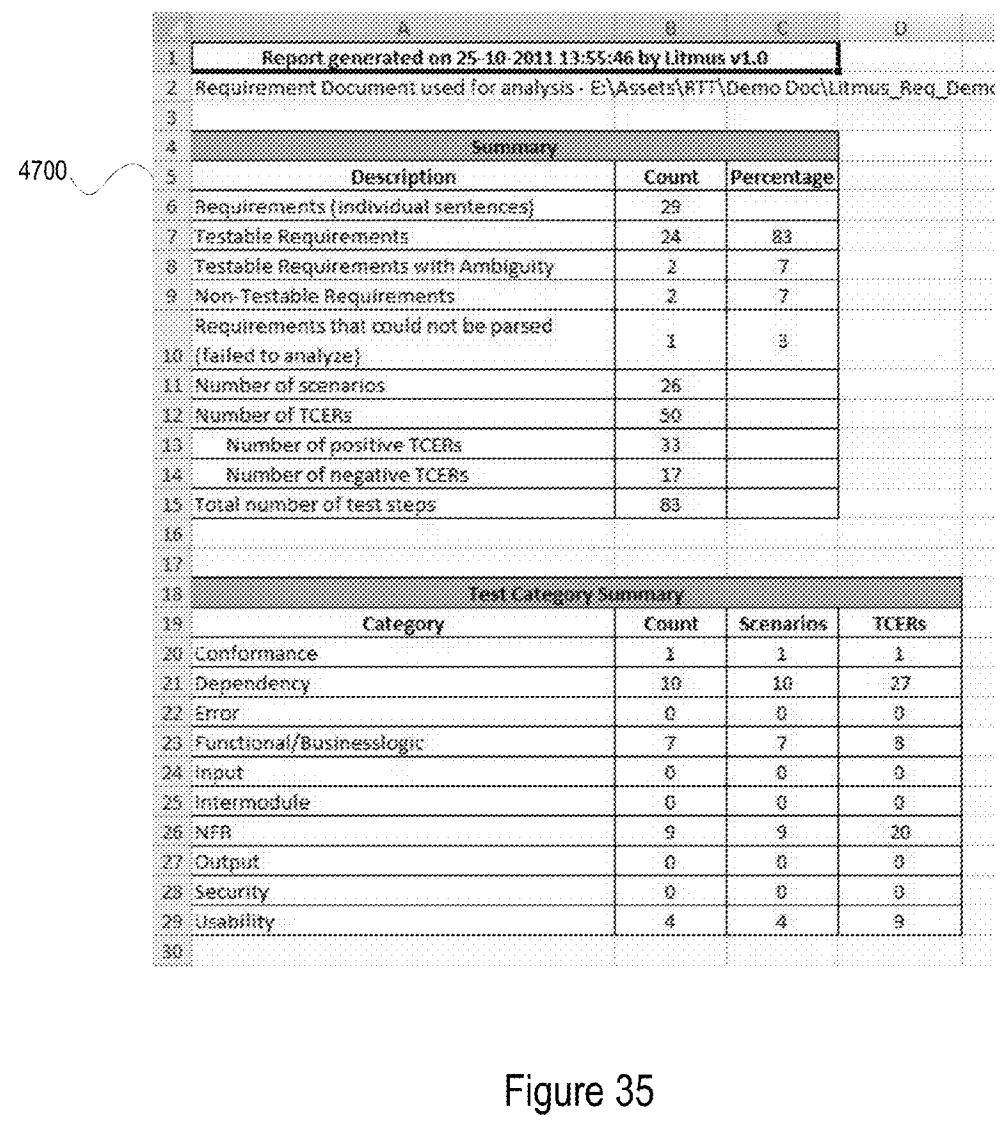

| | A | B | C | D |
|---|---|---|---|---|
| 1 | Report generated on 25-10-2011 13:55:46 by Litmus v1.0 | | | |
| 2 | Requirement Document used for analysis - E:\Assets\RTT\Demo Doc\Litmus_Req_Demo | | | |
| 3 | | | | |
| 4 | Summary | | | |
| 5 | Description | Count | Percentage | |
| 6 | Requirements (individual sentences) | 29 | | |
| 7 | Testable Requirements | 24 | 83 | |
| 8 | Testable Requirements with Ambiguity | 2 | 7 | |
| 9 | Non-Testable Requirements | 2 | 7 | |
| 10 | Requirements that could not be parsed (failed to analyze) | 1 | 3 | |
| 11 | Number of scenarios | 26 | | |
| 12 | Number of TCERs | 50 | | |
| 13 | Number of positive TCERs | 33 | | |
| 14 | Number of negative TCERs | 17 | | |
| 15 | Total number of test steps | 83 | | |
| 16 | | | | |
| 17 | | | | |
| 18 | Test Category Summary | | | |
| 19 | Category | Count | Scenarios | TCERs |
| 20 | Conformance | 1 | 1 | 1 |
| 21 | Dependency | 10 | 10 | 27 |
| 22 | Error | 0 | 0 | 0 |
| 23 | Functional/Businesslogic | 7 | 7 | 8 |
| 24 | Input | 0 | 0 | 0 |
| 25 | Intermodule | 0 | 0 | 0 |
| 26 | NFR | 9 | 9 | 20 |
| 27 | Output | 0 | 0 | 0 |
| 28 | Security | 0 | 0 | 0 |
| 29 | Usability | 4 | 4 | 9 |
| 30 | | | | |

Figure 35

SYSTEM FOR GENERATING TEST SCENARIOS AND TEST CONDITIONS AND EXPECTED RESULTS

BACKGROUND

Related Applications

This application claims priority to Indian provisional patent application No. 122/CHE/2012, filed Jan. 12, 2012, and to the corresponding Indian non-provisional patent application, given the same serial number by the Indian Patent Office as the provisional patent application, No. 122/CHE/2012, and that was received at the Indian Patent Office on Dec. 13, 2012. Both applications are entirely incorporated by reference.

TECHNICAL FIELD

This disclosure relates to test scenarios, and test conditions and expected results (TCERs). More specifically, this disclosure relates to systems and methods (generally referred to as systems) for generating test scenarios and TCERs from natural language (e.g., English language) specification documents.

BRIEF DESCRIPTION OF THE DRAWINGS

The system may be better understood with reference to the following drawings and description. In the figures, like reference numerals designate corresponding parts throughout the different views.

FIGS. 1-16 illustrate examples of the application of various rules by the system to requirement statements.

FIG. 26 shows an example of a requirement statement parsed into links and a constituent tree.

FIGS. 27 and 28 illustrate examples of the application of various rules by the system to requirement statements.

FIG. 35 shows an example report that may be generated by a requirements testing system.

DETAILED DESCRIPTION

The present systems and methods described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

It is noted that this description discusses document analysis. The analysis operates on units of information in the document. The units of information, as examples, may include full sentences, sentence fragments, phrases, or any other sequence of one or more words. In some examples given below, the units of information are statements, such as requirements statements in a requirements specification. The statements may or may not be full sentences. Thus, while some examples may refer specifically to sentence analysis or statement analysis, the techniques described below are not limited to sentences or statements, but may be applied to other units of information present in a document. For instance, the document analysis methods described in this description may be applied to both requirements statements and requirements sentences in a same or similar way.

Figure 29:
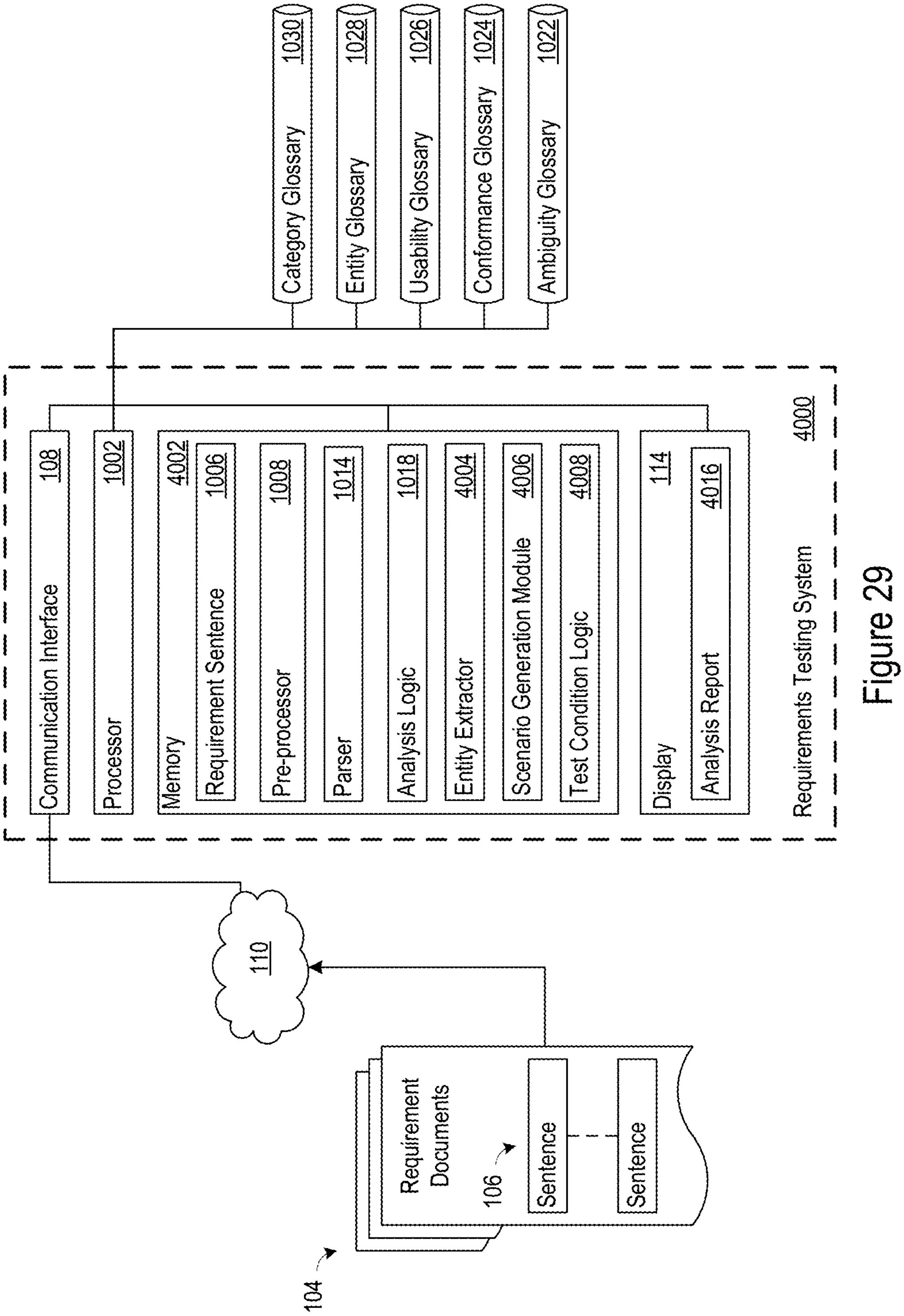
FIG. 29 shows an example of a requirements testing system.

FIG. 29 illustrates a requirements testing system architecture. The architecture includes a requirements testing system 4000 ("system 4000"), an implementation of which is described in more detail below. The system 4000 analyzes requirement statements to determine test artifacts. To that end, the system 4000 receives requirements document 104 including one or more requirements sentences 106. The system 4000 may obtain the requirements document 104 through the communication interface 108. The communication interface 108 may connect to networks 110 to obtain the requirements document 104 from local or remote sources.

The network 110 may follow any of a wide variety of network topologies and technologies. As examples, the network 110 may include Local Area Networks (LANs), Wide Area Networks (WANs), Internet connections, Ethernet networks, or Fiber Distributed Data Interconnect (FDDI) packet switched networks that may communicate Transmission Control Protocol/Internet Protocol (TCP/IP) packets, or any data following any other communication protocol. The network 110 provides a transport mechanism or interconnection of multiple transport mechanisms supporting data exchange between the system 4000 and any source of documents to analyze, including the requirements document 104.

A processor 1002 in the system 4000 may analyze the requirement statements to determine the test artifacts. A requirement statement may, for example, be implemented as a single sentence or other sequence of one or more words. The requirement statement may, for example, be in unconstrained natural language, structured formats, or model based formats. An example of a requirement statement in a structured format may be a requirement statement limited to subject, action and object. Such a restriction may exclude requirement statements with multiple objects, or requirement statements with nouns which are neither subjects nor objects. Other examples are possible.

In some instances, the requirement statements may include data that is not intended for processing. Such data may be marked (e.g., the data not intended for processing may be enclosed in brackets). The requirement statements may first be processed by the preprocessor 1008 as described in more detail below. Among other things, the preprocessor 1008 may remove data enclosed in brackets as well as the brackets themselves. The processor 1002 may generate, (e.g., on the display 114), an analysis report 4016. The analysis report 4016 may specify the artifacts, test artifacts or any other analysis details that the system 4000 determines.

An artifact may be a tangible by-product produced during the development of software (e.g., a use case or a class diagram). Artifacts of a software project may be or resemble deliverables of the software project, though the software itself (i.e., the released end-product) may not be an artifact. A test artifact may be a tangible by-product produced during software testing. Test artifacts may relate to a characteristic of a requirement statement. Examples of test artifacts may include an indication of one or more of the following: requirement testability, requirement intent, test scenario, test conditions, expected results, requirement category, requirement data and requirement ambiguity. Testability artifacts, intent artifacts, category artifacts, and data artifacts may be examples of test artifacts, as well as or alternatively an ambiguous phrase identified in a requirement statement. For example, the test artifacts may include: Testability, specifying, for example, whether the requirement statement is testable; Intent, specifying, for example, the intent or purpose of the requirement statement; Category, specifying, for example, what type of requirement the requirement statement establishes; Data, specifying, for example, the data that the requirement statement operates on; and Ambiguity, specifying whether all or parts of a requirement statement are ambiguous with regard to its testability; The test scenarios, the test conditions and the expected results. The system 4000 may determine additional, fewer, or different artifacts, including grammatical correctness of the requirement statement in whole or in part.

In some requirements testing systems and methods, a requirement statement is obtained and stored in a memory. The requirement statement is submitted to a grammatical parser executed by a processor to obtain parser outputs characterizing the requirement statement. A test artifact ruleset is applied with the processor to the parser outputs to determine a test artifact applicable to the requirement statement.

These and other requirements testing systems and methods allow for developers to check for testability and various features of statements and documents. Another benefit of the requirements testing system is that it facilitates creation of test artifacts from requirement statements. The test artifacts reduce testing cycle time, effort, and expense, and improve test quality. As a result, the resulting software application is more reliable, less expensive, and is more timely delivered. This allows developers to implement complex statements and documents in less time and with fewer mistakes or ambiguities, increasing efficiency and effectiveness of the requirements statements. Requirements testing systems also result in various other advantages and effects.

In some instances, it may be beneficial to identify and review one or more test artifacts, such as one or more Test Scenarios, Test Conditions and Expected Results and/or the Test Hints, each of which is explained in more detail below. However, there are significant technical challenges involved with generating these test artifacts in a consistent, accurate, and reliable way. The technical implementation of the requirement testing system addresses these technical challenges. The resulting requirement testing system is less error prone, may in some instances provide a guarantee on completeness, may be very efficient and objective (and not time consuming or subjective), and/or may not require any extra effort to build traceability and audit compliance.

FIG. 29 shows an example of a requirements testing system 4000 that may be configured or operable to automatically generate one or more test artifacts, such as one or more Test Scenario, Test Conditions and Expected Results and/or the Test Hints from requirement sentences or statements, such as requirements sentence 106, in a functional requirement document such as requirements document 104. The requirements testing system 4000 (which may also be referred to as a "requirements statement testing system", "requirement statement analysis system," "statement testing system," or "statement analysis system") may analyze grammatically correct statements, such as functional/business requirements, and/or may not require or enforce any particular format for writing the requirement sentences. The requirements testing system 4000 may generate test scenarios from each requirement sentence or statement. As one non-limiting example, the generation of the test artifacts may be performed by the requirements testing system 4000 through the following process—1) The requirement sentence may be pre-processed and analyzed through a syntactic parser to break it into simple Subject-Action-Object sentences or phrases 2) The simple sentences/phrases may then be checked for testability and test intents generated (test intents map to the atomic aspects on which the requirement is to be tested); 3) the test intents may be grouped and sequenced in temporal order to generate a positive test case that may check for the affirmative action of the system; and 4) wherever applicable, negative test cases may be generated. Boundary Value Analysis techniques may be used in cases where data is present. Negative test cases may specify the verification of the behavior of the system for exceptions. In some systems, once analyzed, the requirements testing system 4000 may generate, create, and/or display a report containing the test scenarios, test conditions and expected results (TCERs) with negative cases and boundary value analysis, and/or a summary of the analysis including testability, ambiguity and categorization of the requirements. Numerous examples of the process of generating test conditions and expected results, as well as test hints, are shown in Appendix A.

The requirement testing system 4000 may include a communication interface 108, processor 1002, memory 4002, and/or display 114, The memory 4002 may also or alternatively include preprocessor logic 1008, an entity extractor 4004, scenario generation module 4006, and/or test condition logic 4008. The entity extractor 4004 may be configured to extract proper nouns from a requirements sentence 106, as discussed later. The scenario generation module 4006 may be configured to generate one or more test scenarios for the requirements sentence 106, as discussed later. The test condition logic 4008 may be configured to generate one or more positive or negative test conditions, test hints, and/or expected results for the requirements sentence 106, as discussed later. While shown as separate modules or logic, one or more of the entity extractor 4004, scenario generation module 4006, test condition logic 4008, may be combined, incorporated, or part of one module or logic, such as one analysis logic component. Other implementations are possible.

A "Test Scenario" (also referred to as a "scenario description" or a "test scenario description") may be a short description of the test being conducted to verify a requirement. A "Test Condition" may be the particular condition which is being tested. "Test Hints" may be the ordered sequence of steps a tester would have to execute to perform the test. The corresponding output from a correctly implemented system may be an “Expected Result”. The combination of a Test Condition and the Expected Result is referred to as a TCER.

The requirements testing system 4000 may also or alternatively determine the categorization of a requirements sentence 106 and/or identify ambiguous phrases in the requirements sentence 106. In some embodiments, no restriction on the structure of the requirements sentence 106 is imposed, and the requirement testing system 4000 may work on each single requirements sentence 106 and generate one or more test conditions and associated test hints and expected results. The requirement testing system 4000 may be configured or operable to analyze a single sentence or requirement statement (or as many as desired), and need not maintain state across multiple statements or sentences within statements.

Figure 25:
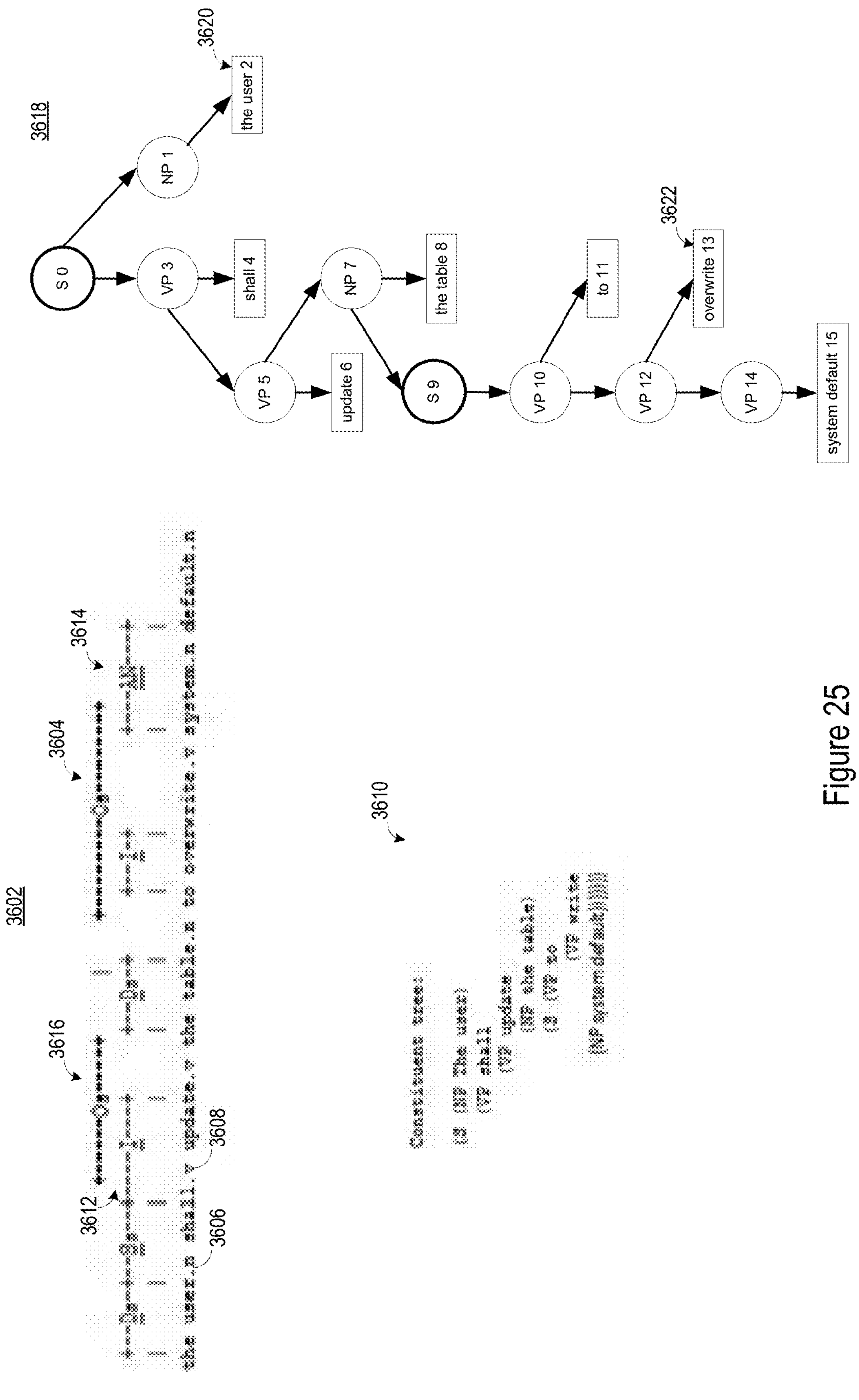
FIG. 25 shows an example of a requirement statement parsed into a constituent tree.

The requirement sentences are parsed using Link Grammar parser (abbreviated as LG). LG provides information on the syntax of a grammatically correct English sentence by connecting pairs of words through labeled links (FIG. 25 shows the parsed output of a sentence). The links between pairs of words are labeled and each label provides specific information about the connecting pair. For example, the Subject of a sentence is indicated by a link having a label “S”. LG also provides the Noun Phrases, Verb Phrases, etc. through a constituent tree output (FIG. 26). The links are created through a Grammar maintained in a dictionary file. The interpretation of the parsed output through the label of the links, the structure of the sentence and the constituent tree helps us decipher the following information—the sentence structure (antecedent and consequent), quantity (singular and plural), Parts-of-Speech (Noun, Verb, Verb in past tense, etc.) and grammar (Subject, Object, etc.). We interpret and exploit this information to extract entities and generate the Test Cases The pre-processor logic 1008 includes preprocessing rulesets (e.g., the preprocessing rulesets 1010 and 1012). The preprocessing rulesets cause the pre-processor logic 1008 to perform analysis, modification, or other actions on requirement statements. Table 1 and Table 2 give examples of the pre-processing rulesets.

TABLE 1

| Preprocessor Ruleset |
|---|
| Rule 1: Prune ending punctuation marks. |
| Rule 2: Convert Unicode text to ASCII text |
| Rule 3: Convert URLs in text into an Acronym |
| Rule 4: Replace quoted words into Acronyms. Replace other words which are in title case with Acronyms. |
| Rule 5: Add a space before and after a comma (if not present) |
| Rule 6: Remove extra white spaces |
| Rule 7: Remove text enclosed in brackets and the brackets themselves |
| Rule 8: Replace terms in the entity glossary with Acronyms |
| Rule 9: Convert the sentence to lower case. |

TABLE 2

| Preprocessor Ruleset |
|---|
| Rule: Replace won’t -> would not |
| Rule: Replace can’t -> can not |
| Rule: Replace mustn’t -> must not |
| Rule: Replace couldn’t -> could not |
| Rule: Replace shouldn’t -> should not |
| Rule: Replace cannot -> can not |
| Rule: Replace needn’t-> need not |
| Rule: Replace wouldn’t->would not |
| Rule: Replace “no later than” with “by” |
| Rule: Replace “no sooner than” with “after” |
| Rule: Replace “less than”, “lesser than”, “lower than”, “fewer than” with “<” |

TABLE 2-continued

| Preprocessor Ruleset |
|---|
| Rule: Replace “as many as”, “as much as”, “up-to”, “at most”, “some”, “about”, with <= |
| Rule: Replace “more than”, “greater than”, “higher than”, “further than”, “just over”, “well over”, “” with > |
| Rule: Replace “at least” with >= |

Figure 30:
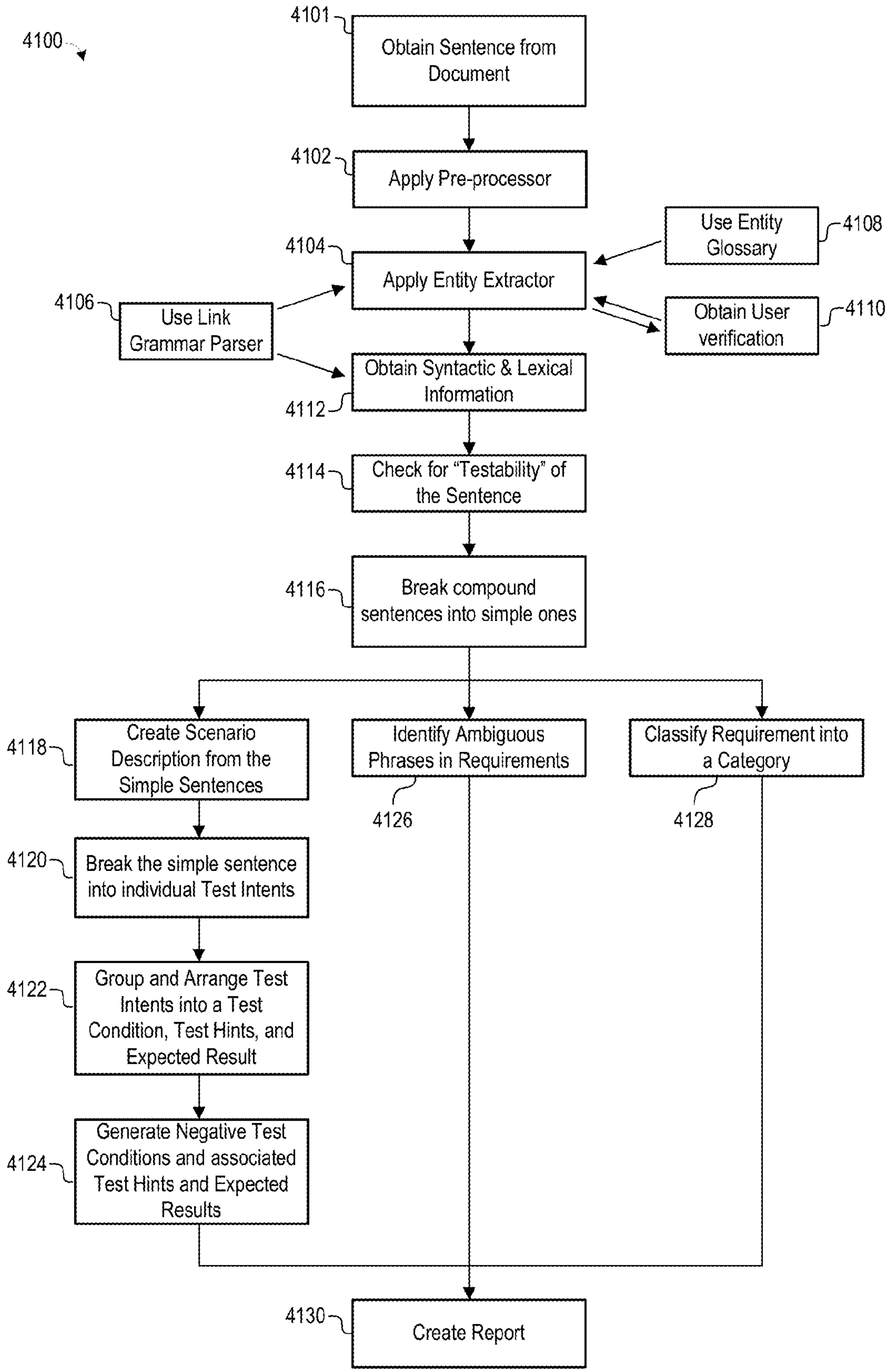
FIG. 30 shows an example of a method of generating a test scenario and TCERs.

In some instances, when the pre-processor logic 1008 converts the words in the sentence to lower case, the words (e.g., when they are acronyms) may not be recognized as valid entries in the parser logic dictionary. To address this situation, the system 4000 may modify the parser logic dictionary to treat all unknown words as a noun, and associate with the unknown words with the links given to recognized nouns. The system 4000 may also handle verbs used as nouns, as with the word “update” in the example “The system should disable the update button.” In one implementation, the system 4000 identifies as dual use words those words that may be used both as a verb and as a noun, updates the parser logic dictionary to indicate that the dual use words may be used as both a verb and a noun, and associates the links given to verbs and nouns with the dual use words. Words may be identified as dual use words in many ways, such as by scanning a dictionary or other grammatical database such as the WordNet™ database (wordnet.princeton.edu). Identifying dual use words in the parser logic dictionary may be advantageous in some instances, such as where a requirement statement might not otherwise be properly parsed, like where a noun may be incorrectly identified as a verb FIG. 30 shows one example of logic 4100 that the system 4000 may implement (e.g., as program instructions that implement the analysis logic 1018) to generate a test scenario, test condition, test hints, and/or expected result for a statement, such as a requirements sentence 106 after pre-processing is completed at 44000. Appendix A also includes numerous specific examples.

The logic 4100 may begin with the requirements testing system 4000 obtaining a sentence or statement from a document (4101). The statement may be a requirements sentence 106 from a requirements document 104, or may be another statement, sentence, or collection of words which may be gathered from a document. The requirements sentence 106 may be a statement randomly selected from a document, may be selected in a sequential order, may be selected according to one or more algorithms, or may be selected in various other ways. Other examples are possible.

The logic 4100 applies pre-processing (4102), e.g., prior to applying the entity extractor (4104). The pre-processing may be applied (4102) by the pre-processor 1008 according to any one of the methods described throughout this disclosure.

The logic 4100 applies the entity extractor 4004 (4104) to analyze the requirements sentence 106. While the entity extractor 4004 is shown as being applied to each requirements sentence 106 individually before each requirements sentence 106 is analyzed, in some systems, the logic 4100 may apply the entity extractor 4004 to an entire requirements document 104 prior to any parsing or analysis of the requirements document 104 or requirements sentence 106 within the document. For example, the entity extractor 4004 may be used before any parsing or analysis of the requirements document 104, to ensure that link grammar parser logic 1014 correctly identifies all nouns in each requirements sentence 106 when the requirements sentence 106 is parsed. Other variations are possible.

The role of the entity extractor 4004 may be to pick up some or all Noun-Phrases in a requirements sentence 106. The entity extractor 4004 may determine which nouns should be identified in a given requirements sentence in various ways. For example, the logic 4100 may cause the requirements testing system 4000 to identify noun phrases in a requirements sentence 106 with or using link grammar parser logic 1014, as shown in (4106). The logic 4100 may also cause the requirements testing system 4000 to run the link grammar parser in a "Batch" mode on the entire requirements document 104. The entity extractor 4004 may identify or otherwise pick up Noun-Phrases from the links generated by the parser. The Noun-Phrases may include acronyms (such as "ACBG"), proper nouns (such as "Peru"), common nouns (such as "Order Processing System") and/or phrases included in parentheses. Additionally or alternatively, if the requirements document 104 contains a "Glossary" section, such as an entity glossary 4108, the corresponding terms in the entity glossary 4108 may also be considered and used by the entity extractor 4004 in gathering nouns (4108). In some instances, the automatically identified nouns or entities gathered by the entity extractor 4004 may be presented to the user for verification (4110). In these cases, the user may have the option to either accept or modify the selected entities, and/or may add new ones. The entity extractor 4004 may, in some instances, be used to extract nouns from requirements sentences that even fail to link. Entity extractor examples may be found in Appendix A.

An example of the logic (in hardware or software) which the entity extractor 4004 may implement to identify noun-phrases is:

```
 1.   Let E be the set of entities.
 2.   For each Requirement Sentence - R
 3.     Pass R through Link Grammar
 4.     If Null Count > 0 // i.e., Link Grammar could not link the sentence
 5.       Find the unlinked words
 6.       For each unlinked word U
 7.         If U is "a", "the", or "an"
 8.           Let R be the word right after this determiner.
 9.           Let X be the word after R.
10.           If X is not a noun, then place R into E
11.           If X is a noun, then place R along with the consecutive nouns after it into E.
12.         If U is "in", "to", "on", "of", "for"
13.           Let R be the word after U.
14.           If R is a verb then place U along with the consecutive nouns after it, into E.
15.           If R is an adjective, then let RR be the contiguous set of adjective encapsulating R. Let X be the word after RR
16.             If X is a verb, place RR along with X and any nouns after X, into E
17.             If R is also unlinked, then place U along with R into E
18.           Else
19.             Let R be the word after U.
20.             If R is a noun, place U and all contiguous nouns after U and adjectives before U, into E.
21.
22.       Let W be the word that is linked by either S, O, or J links
23.       If W is an acronym, or has Title Case, or has an AN link
24.         Select the set of words connected to W by either AN, NM, YS, YP and A links. Place these words into E.
25.
26.       If the sentence starts with a verb, then place the verb along with the contiguous set of nouns after it into E
27.
28.   Remove Duplicate entries from E
29.
30.   Display E to the user for verification and modification
```

One reason for the inclusion of an entity extractor 4004 is to ensure that all entities are treated as "Nouns" by link grammar or link grammar parser logic 1014. For example, some requirements sentence 106 may use verbs as nouns. As an example of a requirements sentence that uses a verb as a noun, consider this requirements sentence:

(1) SENTENCE: Order Processing System should generate ACBG reports only for locations in Peru.

In the requirements sentence (1), the word "Order," which is normally a verb, is used as a noun in the requirements sentence. In such cases, without applying the entity extractor 4004, link grammar parser logic 1014 may interpret "Order" to be a verb and may produce a wrong set of linkages (treating Verbs as Verbs) which may lead to a wrong set of TCERs.

In the example of the requirements sentence (1), the entity extractor 4004 may automatically highlight—"Order Processing System", "ACBG reports" and "Peru" because they are nouns. The entity extractor 4004 may also suggest entities from requirements sentences where the link grammar parser logic 1014 fails to completely link the sentence. When such words are forcibly treated as a noun, the linkage by the link grammar parser logic 1014 may succeed. As noted, in some instances, the requirements testing system 4000 may show selected entities identified by the entity extractor 4004 to the user for verification (4110), and the user may modify the selected entities.

The entity extractor 4004 may help increase the accuracy of the requirements testing system 4000. In other systems, the entity extractor 4004 may not be needed or included in the requirements testing system 4000, and the user may generate test artifacts without running the entity extractor 4004.

In some systems, once the selected entities are accepted by the user, the logic 4100 may re-run the link grammar parser logic 1014 (4112), making sure the entities are treated as nouns. The link grammar parser logic 1014 may also obtain syntactic and lexical information about the requirements sentence 106 when re-running the link grammar parser logic 1014 (4112).

Once the requirements testing system 4000 has applied the entity extractor 4004 (as in 4104) and each requirements sentence 106 has been again parsed by the link grammar parser logic 1014, as in (4106) and (4112), to obtain syntactic and lexical information, the logic 4100 may cause the requirements testing system 4000 to determine if the requirements sentence 106 is testable (4114). Upon parsing, if the requirements sentence 106 is unable to be linked by the parser, the requirements testing system 4000 may report the requirements sentence 106 as "failed to analyze" and the requirements testing system 4000 may move onto the next requirements sentence 106. The requirements testing system 4000 may quantify input requirements sentence 106 that are successfully linked by the parser as either 'testable' or 'non-testable'. The requirements testing system 4000 may analyze the link grammar parser logic 1014 output of a sentence to identify a particular set of contiguous links which imply testability. In some instances, the logic 4100 may apply testability rules (T.x) to determine if the requirements sentence 106 is testable (4114). The logic 4100 may check the testability of the requirements sentence 106 as explained below or in other manners.

TABLE 3

Testability Ruleset
If any of the following rules are found to be true by the requirements testing system 4000, the requirements sentence 106 is testable. Otherwise, the requirements sentence 106 is untestable.

| Rule ID | Rule | Rule in LG nomenclature | Examples |
|---|---|---|---|
| T.1 | Subject - Modal -Verb - Object | S-I*-O | 1.1, FIG. 1 |
| T.2 | Subject-Modal-Passive Verb-Prepositions | S-Ix-P* | 1.3, FIG. 8 |
| T.3 | Subject - Modal - Passive Verb - Prepositions | S-Ix-OF | 1.4, FIG. 9 |
| T.4 | Subject-Participles-'in order to'- Modal-Verb-Object | S-Pv-TO-I*-O | 1.5, FIG. 10 |

*refers to any subscripts that may occur with 'I'. Examples are 'Ix', 'Ic'

An example of links which the requirements testing system 4000 may identify testability is shown above in Table 3. These examples may or may not include the presence of a modal verb (denoted by links I and Ix, examples may include "should" or "will"), which may indicate what a system 'ought' to do or quantify an action by a system. For example, the requirement statement may be determined to be testable based on the presence of contiguous links, (e.g., S-I-O (rule ID T.1)). The linkage S-I-O denotes that a subject (link S) should connect to a modal verb (link I) which in turn should connect to an object (link O). In some configurations, the requirement statement may be determined to be testable based on the presence of a combination of 8 links, as shown in Table 3 (i.e., links S, I, Ix, P, O, OF, Pv, TP, as specified in LG nomenclature in Table 3). Other examples are possible.

Figure 31:
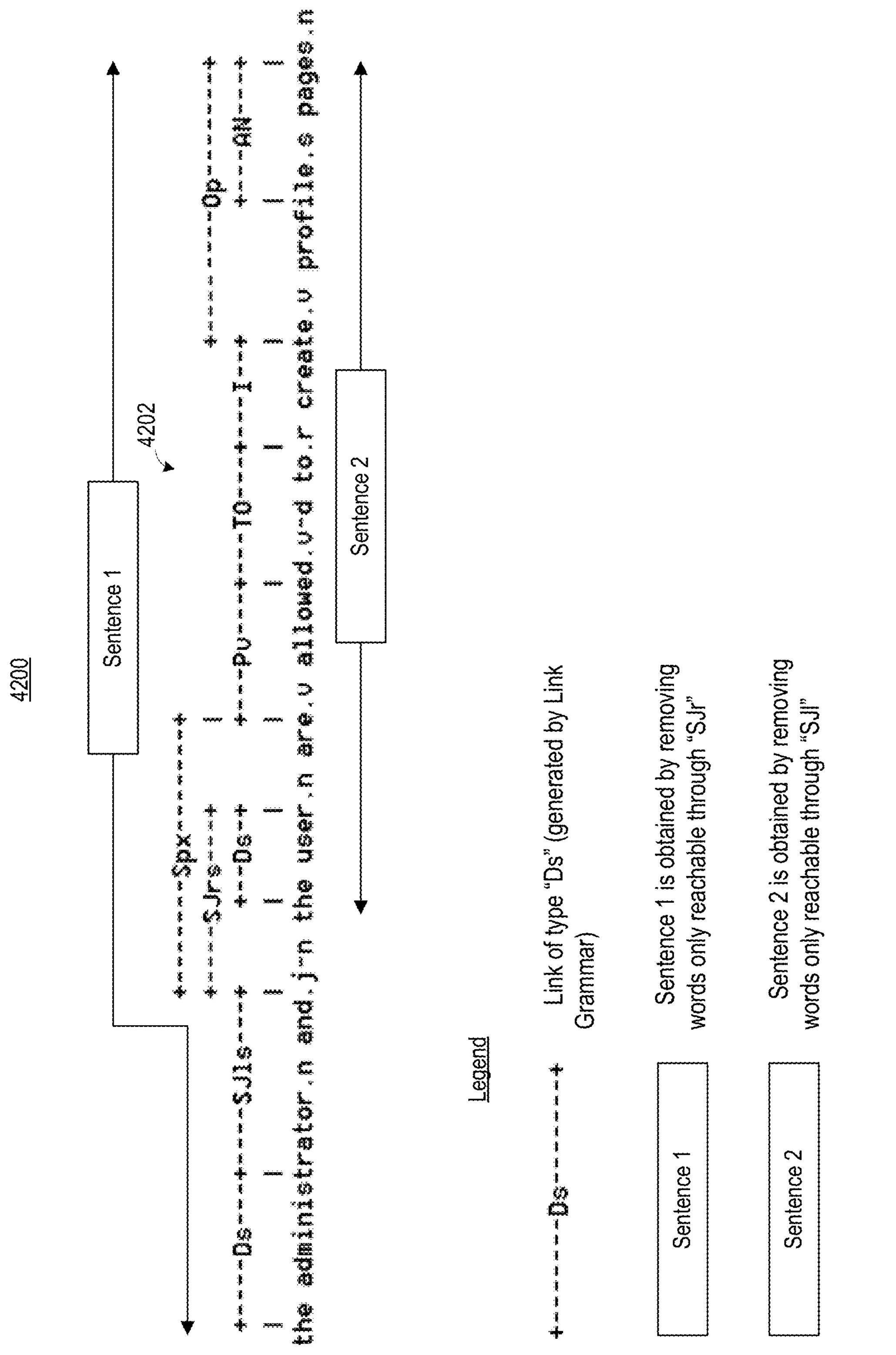
FIG. 31 shows an example of how a compound sentence may be broken into simple sentences.

FIG. 31 depicts a requirement sentence 4200 and the linkages 4202 that may be generated by a link grammar parser logic 1014. The requirements sentence 4200 may be identified by the requirements testing system 4000 as testable because of Rule "S-Pv-TO-I-O". As an example of a non-testable sentence, consider this statement:

(2) SENTENCE: Project Staffing Report is defined as a report containing information about the project name, project description, total employee count, staffing status This sentence is an assumption or definition and by itself does not imply testability.

A requirements sentence 106 that the requirements testing system 4000 determines is testable may be analyzed further to generate test artifacts, as discussed later. The requirements testing system 4000 may report a non-testable sentence or statement 106 may be reported and/or may proceed to the next requirement sentence.

Once the logic 4100 determines that a requirements sentence 106 is testable, the logic 4100 may break down a compound requirements sentence 106 into simple sentences or statements (4116).

A compound sentence may be one which has conjunctions joining multiple nouns, verbs or prepositions. The requirements testing system 4000 may break down these compound sentences into simple ones where each simple sentence has no conjunction.

Sentence Simplification Ruleset is shown below

Figure 27:
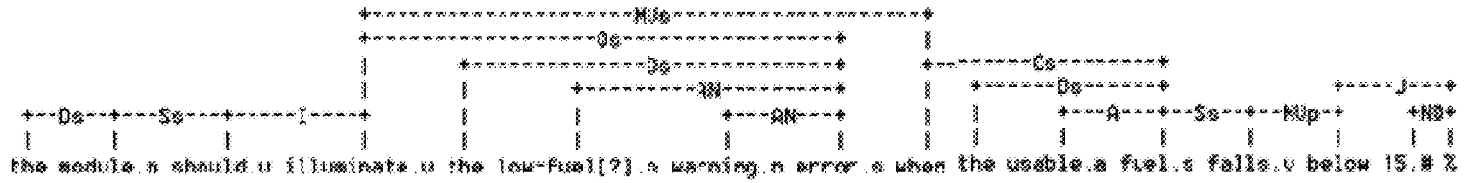

| Rule Id | Rule | Rule in LG Nomenclature | Breakup/simplification | Examples |
|---|---|---|---|---|
| S.1 | Sentences of type dependency (with antecedent and consequent) | MVs-Cs | Break the sentence into two clauses, <clause−> & <clause+>. <clause−> starts from the sentence beginning up to the word before the Cs+ word. Skip the Cs+ word. This word is recorded for use in Intents <clause+> starts from the Cs− word beginning up to the end of the sentence. | FIG. 27 2800 |
| S.2 | Sentence openers | CO, CO*s | Break the sentence into two clauses, <clause−> & <clause+>. <clause−> is the set of words that can be reached from CO*s+. <clause+> that can be reached through CO*s−. Record the Type of breakup with the word pointed by CO*s Similar Operation for CO | 1.6 FIG. 10, 1.8 FIG. 12 |
| 1.2 | Independent clauses | CC, Xx | Break the sentences into two clauses. <clause−> is the set of words that can be reached from CC−. <clause+> is the set of words that can be reached through <CC+>. Similar operation for Xx | 1.7 FIG. 11 |
| 1.4 | Conjunctions (Verb, Noun, Prepositions, adverbs) | VJ, MJ, RJ, SJ | Break the sentence into two clauses, <clause−> & <clause+>. <clause−> starts with the sentence beginning up to Jl+ word. It then continuous from the word after | 1.9 FIG. 13, 1.9.1 FIG. 14, 1.9.2 FIG. 15, 1.9.3 |

-continued

| Rule Id | Rule | Rule in LG Nomenclature | Breakup/simplification | Examples |
|---|---|---|---|---|
| | | | Jr− up to the end of the sentence. <clause+> starts with the sentence beginning up to the word before Jl−. It then continuous from the Jr− word up to the end of the sentence. | FIG. 16 |
| 1.5 | Sentence with “Neither - Nor” | SJn | If the Sentence contains an <N> link, flag as error and proceed to the next analysis. Find the word (other than SJr) that connects to the SJn− word. Introduce ‘not’ after this word. Remove the Dn+ word. Replace SJn− with ‘and’ | 1.1.1 FIG. 1 |
| 1.6 | Relative Clauses | B-R-RS, B-R-Cr | Break the sentence into two clauses, <clause−> & <clause+> at the B link. <clause−> contains the words reachable from the B+ word but not connected to the B− word. <clause+> starts with the B+ word. Include a determiner ‘the’; delete the word with the R− link. Continue till the end of the sentence. | 1.1.6, FIG. 3 |

As an example of sentence simplification, consider the following sentence. This example and its simplification are shown in FIG. 31:

(3) SENTENCE: The administrator and the user are allowed to create profile pages.

In the sentence (3), the compound sentence has two nouns (administrator; user—identified in this example by italics) that are joined by a conjunction “and.” The corresponding simple sentences for this compound sentence are:

(4) SENTENCE-1: The administrator is allowed to create new profile pages.

AND

SENTENCE-2: The user is allowed to create new profile pages.

The requirements testing system 4000 may record the conjunction (“and”) joining the two nouns as well. The simplification of the example is represented as Rule 1.4 in the above table and corresponds to Link Grammar Link—SJ.

The link grammar parser logic 1014 may identify a noun conjunction with “SJl” and “SJr” links (the labels “SJl” and “SJr” indicate “Subject Join Left” and “Subject Join Right” respectively). In this example, the first simple sentence (“SENTENCE-1”) is obtained by removing all words that are reachable only through the “SJr” link, and the second simple sentence (“SENTENCE-2”) is obtained by removing all words that are only reachable through “SJl”. In some instances, by breaking the sentence into two, the number agreement between the noun and the verb may be broken (i.e., Noun—“Administrator” and Verb—“are”). In these instances, the plural verbs may be converted by the requirements testing system 4000 into singular through the method of Stemming. The plural verb in the compound sentence and the corresponding singular verb in the simple sentences are underlined in sentences (3) and (4) respectively. In some instances, one or more simple sentences generated from a compound sentence may have a large portion of text that is common.

Compound sentences or statements of other structures may also or alternatively be broken by the requirements testing system 4000 into simple sentences, such as where the parsed output indicates multiple subjects—links with label “S+”. The link grammar parser logic 1014 may identify various cases of multiple subjects, sentence openers, coordinating conjunctions, dependent clauses and causal sentences. These structures correspond to the rules provided in the table above. A causal sentence has an “if-then-else” type of structure and corresponds to rule ID S.1 in the table above. As an example of a causal sentence, consider this sentence:

(5) SENTENCE: The user can proceed to the next screen if the entered password is correct.

The corresponding simple sentences generated from the statement (5) is shown as:

(6) If

SENTENCE-1: the entered password is correct then

SENTENCE-2: the user can proceed to the next screen

The requirements testing system 4000 may save the antecedent (SENTENCE-1) and the consequent (SENTENCE-2) as properties (“if” and “then” respectively) of the two simple sentences. These properties may be used in the generation of TCERs as discussed later. The link generated or otherwise denoted by the link grammar parser logic 1014 that corresponds to causal sentences is “MVs-Cs” (Rule ID S.1).

Upon breaking up a sentence, in certain cases the simplification may lead to a clause. As an example, consider this sentence:

(7) SENTENCE: Upon successful save, the module must update the last save time.

The simplified Clause/Sentence to this statement (7) may be:

(8) CLAUSE-1: upon successful save

SENTENCE-1: the module must update the last save time

The properties binding the simplified sentences and clauses may be recorded to be used while generating TCERs.

The requirements testing system 4000 may represent the compound sentences as a tree in memory. The order of breaking up a sentence may be useful or important when a single compound sentence has multiple attributes of "compoundness". In some instances, the break-up of compound statements into simplified sentences or statements may follow a specific order. For example, one order of breaking up compound sentences may be: a) the coordinating conjunctions may be broken first; then b) the conjunctions may be broken next; and c) the causal attributes, sentence openers and dependent clauses may be broken last. Other orders are possible.

Figure 32:
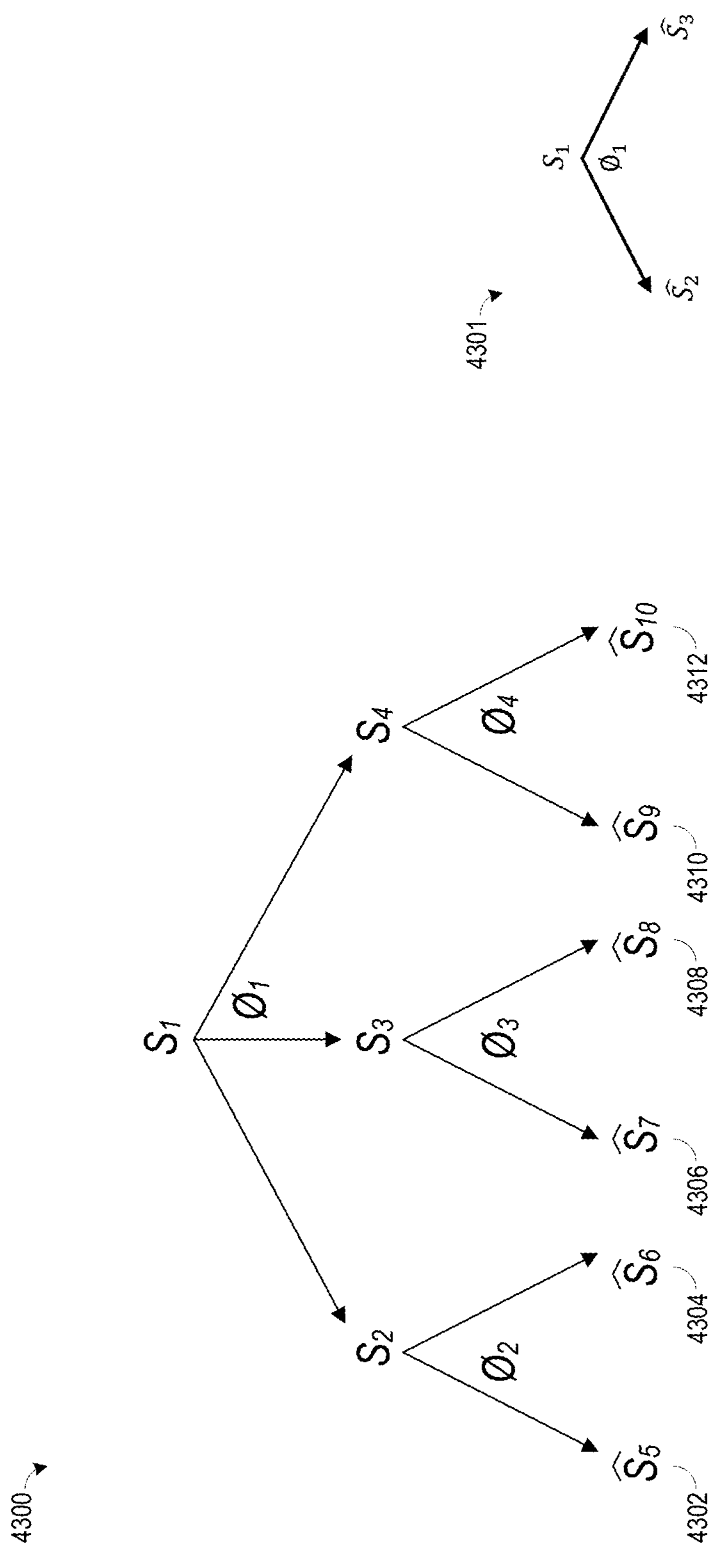
FIG. 32 shows an example of a compound sentence being represented into multiple simple sentences.

When a compound sentence is broken up, the compound sentence may be represented as a tree, and each leaf of the tree may either be a simple sentence or a clause. FIG. 32 shows an example of a tree 4300 generated by the requirements testing system 4000 illustrating how a compound sentence $S_1$ has been broken up into six simple sentences 4302, 4304, 4306, 4308, 4310, and 4312. Logic in the requirements testing system 4000 may create the tree 4300 as follows:

$$S_1=\{S_2 \O S_3\} \text{ or } \{C_2 \O \hat{S}_3\} \text{ or } \{\hat{S}_2 \O \hat{S}_3\} \quad (1)$$

Where, $S_1, S_2 \ldots S_k \in S$: A compound sentence $\hat{S}_1, \hat{S}_2 \ldots \widehat{S_k} \in \hat{S}$: A simple sentence $C_1, C_2 \ldots C_k \in C$: A clause And, Ø={"and", "or", "if-then", etc.}//the attribute value which caused the compound sentence to be broken.

Once the compound sentence has been broken down into simple sentences, the logic 4100 may analyze the simple sentences in parallel, or in various orders, through one or more of three analysis processes including a first analysis process performed at (4118), (4120), (4122) and (4124); a second analysis process performed in block (4126); and/or a third analysis process performed in block (4128).

For example, after the compound sentence has been broken down into simple sentences, the method may proceed to block 4118 where the requirements testing system 4000 may create test scenarios or scenario descriptions from the simple sentences. Creation or generation of test scenarios may be performed, for example, by scenario generation module 4006 of the memory 4002 in the requirements testing system 4000.

A test scenario (also referred to as a "scenario description" or a "test scenario description") may be a short description of the test being conducted to verify a requirement. The scenario generation module 4006 may generate a single test scenario for each requirements sentence 106, such that there may be a one-to-one mapping between a requirements sentence 106 and a test scenario. Where the requirements testing system has simplified a given requirement sentence or other statement 106 into multiple simple sentence, the scenario creation module 4006 may generate a test scenario from or for each simple sentence. In some systems, no test scenario is and/or needs to be generated for clauses. The scenario generation module 4006 may generate the test scenarios for the simple sentences by analyzing the links generated from the output of the link grammar parser logic 1014 for the given simple sentence.

Table 14, below, provides an example set of test scenario generation rule that the scenario generation module 4006 may apply or implement to generate a test scenario of a simple sentence.

TABLE 14

| Rule ID | Rule (in LG Nomenclature) | Scenario Template |
|---|---|---|
| S.1 | S-I | NP(S+)<br><I+><I−> |
| S.2 | S-I-O | <I−><br>NP(O−) |
| S.3 | S-I-P | {<N−>} <I−><br>(Group of words from I till J) |
| S.4 | S-Ix-O | NP(S+)<br><Ix+><Ix−>{<E+>}<br>NP(O−) |
| S.5 | S-Ix-OF | NP(S+)<br><Ix+><Ix−>{<E+>}<br>(Group of words from OF till J) |
| S.6 | S-Ix-P | NP(S+)<br><Ix+><Ix−>{<E+>}<br>(Group of words from OF till J) |
| S.7 | S-Pv-TO-I | {<E+>} <TO+><TO−><br><I−> |
| S.8 | S-Pv-TO-I-O | {<E+>} <TO+><TO−><br><I−>NP(O−) |
| S.9 | S-Pv-TO-I-P | {<E+>} <TO+><TO−> |

Notations:
NP(S+): The noun phrase containing the S+ link is/are used according to plurality of noun
{<N−>} : Include logic of <N−> if N link is present. ('N' denotes "not")
<I−>: Word having the I− link
<TO−>: Word having the TO− link
<TO+>: Word having the TO+ link
<Ix+>: Word having the Ix+ link
<Ix−>: Word having the Ix− link
<E−>: Word having the E− link The scenario generation module 4006 may apply the rules of Table 14 to the simple sentence of a requirements sentence 106 to generate test scenarios for each of the simple sentences. After test scenarios have been generated, such as using the rules in Table 14, for each of the simplified sentences, the scenario generation module may create or obtain a test scenario of the original requirements sentence 106 (before simplification) by combining the individual test scenarios of the simple sentences.

The requirements testing system 4000 may arrange a given requirements sentence 106 that has been simplified in the form of a tree. The tree can have a single node (corresponding to a requirement sentence being simple) or have a depth of D.

An example of logic that the scenario generation module 4006 may implement to generate the test scenario, such as a test scenario for an original requirements sentence 106 from test scenarios generated for multiple simple statements of the original requirements sentence 106, is:

```
    If D = 1
{
    Create Test Scenario Object: Obj1
    SD (Obj1) = Scenario (Ŝ1)
}

For all Levels L, from D-1 to 1
{
    For {k = all nodes at Level L }
    {
        If ( Øk= "if-then", "when-then", "by the time", "after", "until-then", "unless", Sentence Openers )
        {
            Create a Test Scenario Object:Objk
            SD (Objk) = Scenario (Second Child of k) // Scenarios are not created for the "if" part of an if-then sentence and clauses
```

-continued

```
15.         }
16.         Else if Ø_k="and", ",", "or"
17.         {
18.             Create a Test Scenario Object: Obj_k
19.             For Every Child of k
20.             {
21.                 SD (Obj_k) = SD (Obj_k) & Ø_k & Scenario (Child
of k)
22.             }
23.         }
24.     }
25. }
26.
27. Remove Duplicates from SD(Obj_1)
28. Display Scenario Description: SD(Obj_1)
```

The generation of the Scenario Description from the simple sentences as created from the rules of Table 14 is shown as: Scenario( ). The corresponding output may be saved in a temporary object and is shown as SD( ). The operator '&' joins the scenarios descriptions only if the descriptions are distinct.

The test scenarios generated by the scenario generation module 4006 using the rules in Table 14 and/or logic, an algorithm, or code may be further illustrated with one or more examples. For example, the sentence (1) above is a simple sentence ("Order Processing System should generate ACBG reports only for locations in Peru.") which does not get broken into further sentences/clauses. Thus the input to the scenario generation module 4006 would be the entire sentence as in sentence (1). The scenario generation module 4006 would then generate a test scenario for this sentence (1) according or due to Rule S.2 of Table 14, which would be:

(10) SCENARIO DESCRIPTION: generate ACBG reports

As another example, the compound sentence in sentence (5) ("The user can proceed to the next screen if the entered password is correct.") is simplified into two sentences corresponding to the "if" and "then" part respectively. As shown in line 14 of the logic used by the scenario generation module 4006, the test scenario is created only for the "then" part of the compound sentence. The corresponding test scenario for this sentence (5), generated according or due to Rule S.1 of Table 14, is thus:

(11) SCENARIO DESCRIPTION: the user is able to proceed

As another example, the compound sentence in sentence (7) ("Upon successful save, the module must update the last save time.") has an 'Opener' and is simplified into a Clause and a Simple Sentence. As shown in line 14 of the logic used by the scenario generation module 4006, the test scenario is created only for the simple sentence and not for the Clause. Thus, the test scenario for sentence (7), generated according or due to Rule S.2 of Table 14, is thus:

(12) SCENARIO DESCRIPTION: update the last save time

Consider a compound sentence as shown below:

(13) SENTENCE: The user can add or delete his profile page.

The requirements testing system 4000 may simplify the sentence (13) into two simple sentences and can be represented as a simplified compound sentence 4301 illustrated in FIG. 32.

Where, $S_1$="the user can add or delete his profile page"

$\hat{S}_2$="the user can add his profile page"

$\hat{S}_3$="the user can delete his profile page"

$\emptyset_1$="or"

The scenario generation module 4006 may determine or otherwise generate test scenarios for each simple sentence using the rules in Table 14, such as Rule S.2. The scenario generation module 4006 may then merge test scenarios for each simple sentence, such as described in line 21 of the logic used by the scenario generation module 4006.

(14) SCENARIO DESCRIPTION: add his profile page or delete his profile page

Various other examples of generating test scenarios using the scenario generation module 4006 are possible.

After creating the test description from the simple sentences (4118), the logic 4100 may break the simple sentences of the requirements sentence 106 into individual test intents (4120).

The Ruleset to generate Test Intents from a simple sentence is provided in the tables below.

TABLE 5a

Intent Ruleset

| Rule ID | Primary Rule | Secondary Rule | Primary Rule in LG nomenclature | Secondary Rule in LG nomenclature |
|---|---|---|---|---|
| I.1 | Subj-Modal-Verb--Object | — | S-I-O | |
| I.1.1 | | Noun Modifiers - Adjectival; | | <NP>-Mp |
| I.1.2 | | Noun Modifiers - Prepositional; Participle; Gerund | | <NP>-Ma <NP>-Mv <NP>-Mg |
| I.1.4 | | Noun modifiers- infinitive 'to'-object | | <NP>-TO-I-O |
| I.1.4.1 | | | | <:NP>- <:VP>-MV |
| I.1.5 | | Noun modifiers- preposition-infinitive | | TO-I |
| I.1.7 | | Verb Modifiers - Adverbs; Adjectival | | I-E I-MVa |
| I.1.8 | | Verb Modifiers - Prepositions; | | I-MVp I-PP |
| I.1.9 | | Verb Modifiers - conjunctions | | I-MVs |

TABLE 5a-continued

| Intent Ruleset | | | | |
|---|---|---|---|---|
| Rule ID | Primary Rule | Secondary Rule | Primary Rule in LG nomenclature | Secondary Rule in LG nomenclature |
| I.1.10 | | Verb Modifiers - “in order to” | | I-MVi |
| I.1.11 | | Verb Modified by forms of ‘be’ | | I-Pp |
| I.2 | Subject - Modal - Forms of Verb “be” - Object | | S-If-O | |
| I.2.1 | | Noun modifiers- Infinitive ‘to’-object | | TO-I-O |
| I.2.2 | | Noun modifiers- Infinitive ‘to’ | | TO-I |
| I.2.3 | | Verb modifiers - adjectival Prepositions; conjunctions | | If-MV |
| I.2.4 | | Verb Modifiers - Connecting to noun modifiers | | If-MV-M |
| I.3 | Subject- Modal- Passive Verb- | | S-Ix | |
| I.3.1 | | Modal Verb Modifiers - Adjectival | | Pa |
| I.3.2 | | Modal Verb Modifiers - Participle; gerund | | Pv, Pg |
| I.3.3 | | Modal Verb Modifiers - Prepositions | | Pp, OF |
| I.3.4 | | Modal Verb Modifiers connecting to Verb Modifiers - Prepositions | | P*-MVp |
| I.3.5 | | Modal Verb Modifiers connecting to Verb Modifiers - “in order to” | | P*-MVi |
| I.4 | - Subject- Participles- ‘in order to’- Modal-Verb- Object | | S-Pv-TO-I*-O | |
| I.4.1 | | Noun & Verb modifiers of I.1 | | All the links which S-I-O can take, can come here. |
| I.5 | Subject - Modal - Weak Verb - ‘TO’ - Verb - Object | | S-I(w)-TO-I*-O | |
| I.5.1 | | Noun & Verb Modifiers | | All the links which S-I-O can take come here. There would be no secondary links for the weak verb - I(w) |

TABLE 5b

Intent Ruleset

| Rule ID | Template<br>Note: in some cases, the object may not exist - thus the entire line of the object is not included in the intent. | Meaning | Example |
|---|---|---|---|
| I.1 | Intent: <agent> <modal><br><N> <action><br><object><br>(E.g., <S+:NP> {<N−>} <I+><br><I−><O−:NP>) | <agent> is the noun phrase in the constituent tree, collected recursively within NP starting from the word with the S+ link. Note: the immediate keyword may be ADVP (only system A can)<br><modal> is the modal verb collected from the I+ link.<br><action> is the verb phrase (VP) from the constituent tree<br><object> is the noun phrase in the constituent tree, collected recursively within NP starting from the word with the O− link.<br>If agent is plural denoted by a subscript p (of Sp) or if there are multiple subjects (denoted by SJl & SJr), use 'are', else 'is'<br><N> = 'Not' when an 'N' link connects after S | 1.1, FIG. 1 |
| I.1.2 | <Base Intent><br>If secondary rule connected to Subject:<br>Intent#: <subject><br>Is/are <CT>.<br>If secondary rule connected to Object:<br>Intent#: <object><br>Is/are <CT>.<br>(e.g., <NP> is/are<br><M+:CT>*) | <CT> (constituent tree):<br>Ma:<br><Ma*n><ADJP><PP><NP><br><VP>..<br>Mv: <Mp*n><VP><br>Mg: <Mg*n><VP><br>Where the new intent is started if one of the secondary links are found connected to the primary.<br><ADJP> is the word indicated by Ma−, MVa−<br><PP> is the word indicated by MVp−<br><NP> is the word indicated by <J−><br>Is/are is similarly decided on the plurality of the Object. If Op, 'are', else 'is' | I.1.2<br>FIG. 1 |
| I.1.4 | <Base Intent><br>{connected to subject:}<br>Intent#: <subject><br><modal> <action2><br><Object2><br>{connected to object:}<br>Intent#: <object><br><previous action in past tense><br><action2><br><Object2><br>(E.g., <O'+NP> <I+> <I−><br>the <O'−> using <O−:NP>) | <object2>&<action2> comes from I-O<br><model> is the model verb in the sentence | 1.1.4<br>FIG. 2 |
| I.1.5 | <Base Intent><br>{connected to subject:}<br>Intent#: <subject><br><modal> <action2><br>{connected to object:}<br>Intent#: <object><br><previous action in past tense><br><action2> | | 1.1.5,<br>FIG. 3 |
| I.1.7 | <Base Intent><br>Intent# <object><br><previous action in past tense><br><ADVP> | ADVP is the phrase in the constituent tree identified either by the E+ link or the MVa−. Note: ignore the comma if present in the ADVP | 1.1.7,<br>FIG. 4 |
| I.1.8 | <Base Intent><br>Intent# <object><br><previous action in past tense><br><PP><NP> | PP is the phrase in the constituent tree identified with the MVp− link. NP is the phrase in the constituent tree with the J− link. | 1.1.8,<br>FIG. 4 |

TABLE 5b-continued

| Intent Ruleset | | | |
|---|---|---|---|
| Rule ID | Template<br>Note: in some cases, the object may not exist - thus the entire line of the object is not included in the intent. | Meaning | Example |
| I.1.9 | <Base Intent><br>Intent# <object><br><previous action in past tense><br><WHADVP> or<br><SBAR>or<VP> | <WHADVP> is the phrase in the constituent tree identified with the MVs– link. VP is the phrase in the constituent tree with Mv– | 1.1.9, FIG. 5 |
| I.1.10 | <Base Intent><br>Intent# <object><br><previous action in past tense><br><action2><br><object2> | <action2> is the VP from the constituent tree with the second I–.<br><object2> is the NP from the constituent tree with the O– link.<br>Note: there may be multiple O links from the I, the analysis logic 1018 may pick up all the NP and simply append them | 1.1.10, FIG. 5 |
| I.1.11 | <Base Intent><br><PP><NP> | PP is the phrase in the constituent tree identified with the Pp– link. NP is the phrase in the constituent tree with the J– link. | 1.1.11, FIG. 6 |
| I.2 | <agent><modal><If Link><br><object> | Similar to rules of I.1 | 1.2, FIG. 6 |
| 1.2.1 | <Base Intent><br>Intent# <object><br><previous action in past tense><br><action2><object2> | Note: the TO-I-O can be with the subject or the object | 1.2.1, FIG. 6 |
| I.2.2 | <Base Intent><br>Intent# <object><br><previous action in past tense><br><action2> | Note: the TO-I can be with the subject or the object | 1.2.2, FIG. 7 |
| I.2.3 | <Base Intent><br><PP><NP> | <PP> is the phrase from the constituent tree connected by the MV– link<br>Similarly, the NP is the phrase with the J– link | 1.2.3, FIG. 7 |
| I.2.4 | <Base Intent><br><PP><NP><br><PP2><NP2> | <PP2> is the phrase from the constituent tree connected by the M– link<br>Similarly, the NP2 is the phrase with the J– link | 1.2.4, FIG. 7 |
| I.3 | | | 1.3, FIG. 8 |
| I.3.1 | <agent><br><Modal><ADJP> | ADJP is the ADJP phrase in the constituent tree pointed by the Pa– link | 1.3.1, FIG. 8 |
| I.3.2 | <agent><br><Modal><VP> | VP is the phrase in the constituent tree pointed by the Pv– link | 1.3.2, FIG. 8 |
| I.3.3 | <agent><br><Modal><PP> | If PP is there, then the analysis logic 1018 may analyze the <PP> in the constituent tree linked by Pp– | 1.3.3, FIG. 8 |
| I.3.4 | <Base Intent><br><PP><NP><br><PP2><NP2> | | 1.3.3, FIG. 8 |
| I.3.5 | <Base Intent><br><VP><NP> | VP is the phrase pointed by I– | 1.3.4, FIG. 8 |
| I.4 | <agent><br><modal> <action><br><object> | | 1.5, FIG. 10 |
| I.4.1 | Take the same intent as the corresponding link (i.e., consider S-Pv-TO-I-O as S-I-O) | | 1.1, FIG. 1 |
| I.5 | Intent: <agent><br><modal> <action1><br><object1><br><action 2><br><object2> | <action1> corresponds to the first verb (which is weak) while <action2> corresponds to the next action.<br>Similarly <object1> and <object2> correspond to the first and second objects respectively. | FIG. 28 |

Test intents may be the most atomic unit of a sentence that conveys enough information for a test to be made. As an example, a Parts-Of-Speech tagger has its atomic unit as a word. A test intent may be the smallest contiguous set of words (i.e., a phrase) that carries sufficient meaning. A single requirements sentence 106 or simple sentence may generate multiple test intents. These test intents, when collated into a test condition and test sequence, may correspond to the high level execution steps which a tester must perform.

Figure 33:
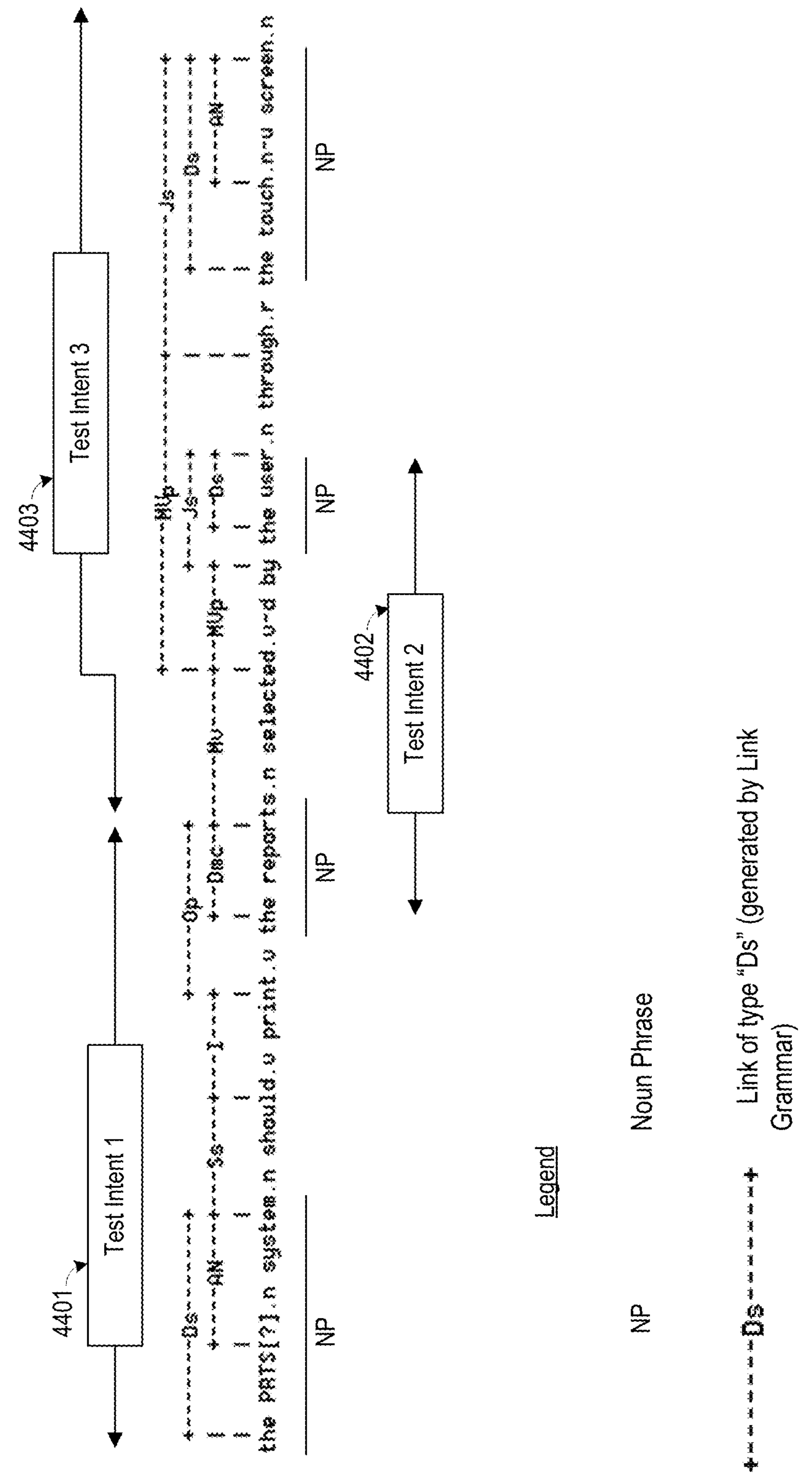
FIG. 33 shows an example of test intents that may be generated for an example sentence.

The analysis logic 4018 may generate test intents for a sentence that has been simplified from or using the parsed output of link grammar parser logic 1014. A test intent may be a set of words along a path of a link starting from the Subject of the sentence and bounded by noun phrases. The Subject of the sentence may, in some instances, tend to be the start of the sentence. An example of a generation of a test intent is shown below and in FIG. 33:

(15) SENTENCE: the PRTS system should print the reports selected by the user through the touch screen Referring to FIG. 33, the analysis logic 1018 may determine that the first test intent 4401 begins from the subject—"the PRTS system" and concludes at the occurrence of the noun phrase—"the reports". The second test intent 4402 begins from this point and proceeds till the next noun phrase is encountered—"the user". There are two paths that can be traversed from the verb "selected". The second path from the noun phrase—"the reports" till "the touch-screen" may form the third test intent 4403. The breaking of the sentence bounded by Noun-Phrases may create a simple or the simplest form of English sentences—sentences that have a Subject, an Action and an Object (or SAO). The structure of these SAO patterns may be identified in terms of the linkages created by the link grammar parser logic 1014. The requirements testing system 4000 may insert static text at precise points in the phrase to bring meaning from a testing perspective. An example set of rules and the corresponding templates are shown Table 5a above.

The test intents corresponding to FIG. 33 are:

(16) Test Intent-1:

the PRTS system should print the reports

Test Intent-2:

the reports were selected by the user

Test Intent-3:

The reports were selected through the touch screen

The text inserted through the template is shown in italics.

Referring to statement (16), the analysis logic 1018 or another component of the requirements testing system 4000 may generate Test Intent-1 due to Rule I.1 (see, e.g., Table 5a). The S-I-O structure of Rule I.1 is shown in FIG. 33. This intent may be referred to as "Primary" since it includes the Subject of the sentence (link grammar parser logic 1014 may indicate an 'S' indicating that the subject is "the PRTS system"). Test Intent-2 and Test Intent-3 may be generated through Rule I.1.2 of Table 5a. The requirements testing system may incorporate the tense and the number for the test intents through "were". The requirements testing system 4000 may identify these through the labels of the links ("Mv" and "Op" respectively). The requirements testing system 4000 may refer to test intents that do not include the subject as "Secondary".

Breaking a sentence into the individual components may remove structural ambiguity. As an example, consider this sentence:

(17) SENTENCE: The PRTS system should print the reports selected via the ACC module The sentence (17) is ambiguous because it can imply—"the selection is via the ACC module", or "the print is via the ACC module". The test intents for this example are

(18) Test Intent-1:

the PRTS system should print the reports

Test Intent-2:

the reports were selected

Test Intent-3:

the reports were printed via the ACC module

These test intents making the meaning explicit.

The analysis logic 4018 or another component of the requirements testing system 4000 may generate test intents for all simple sentences. In some systems, the requirements testing system 4000 may not generate a specific test intent for clauses. In some of these systems, the requirements testing system 4000 may treat a clause as a test intent. The requirements testing system 4000 may represent the generation of test intents in the form of notations below:

$$TI(\hat{S})=\{i_1,i_2 \ldots i_k\} \quad (2)$$

$$TI(C)=\{i_1\} \quad (3)$$

Where $i_1, i_2 \ldots i_k \in i$: a Test Intent

TI ( ) is the function generating Test Intents and works on simple sentences, $\hat{S}$ or Clauses, C.

TI ( ) generates a single Test Intent for a clause and does not work on compound sentences, S.

The values of the attributes that cause a break in the sentence is recorded as Ø.

After a test scenario has been created by the requirements testing system 4000 (4118), and test intents have been created (4120), the method may proceed to block 4122. In block 4122, test condition logic 4008 may group and arrange test intents into a test condition, test hints, and expected result. For example, the test condition logic 4008 may be used in block 4122 to create a positive test condition, corresponding test hints and an expected result from the test intents from (4120). The test condition logic 4008 may generate a single (positive) test condition for each requirements sentence 106 in (4122).

An example of logic that the test condition logic 4008 may implement to create the positive test condition, corresponding test sequence, and expected result (collectively referred to as "positive TCERs and Test Sequence"), is:

```
If D = 1
{
   Create TCER Object Obj1
   TC (Obj1 ) = Create_Test_Condition(TI (Ŝ1))
   TS (Obj1 ) = Create_Test_Hints(TI (Ŝ1))
   ER(Obj1 ) = Create_Expected_Results (Ŝ1)
}
Else
{
   Current Level, L = D - 1
   For k = all nodes at Level L
   {
      If ( Øk= "if-then", "when-then", "by the time", "after", etc. )
      {
         Create a TCER Object: Objk
         TC (Objk ) = Create_Test_Condition(TI (First Child of Node k))
         TS (Objk ) = Create_Test_Hints(TI (Second Child of Node k) )
         ER(Obj1 ) = Create_Expected_Results (Second Child of Node k)
      }
      Else if (Øk= "until-then", "unless", etc.)
      {
```

-continued

22. Create a TCER Object: $Obj_k$
23. TC ($Obj_k$) = Create_Test_Condition( TI (First Child of Node k) )
24. TS ($Obj_k$) = Create_Test_Hints ( Negation { TI (Second Child of Node k) })
25. ER ($Obj_k$) = Create_Expected_Results ( Negation {PTI (Second Child of Node k) })
26. }
27.
28. Else if $Ø_k$= "and", ","
29. {
30. Create a TCER Object: $Obj_k$
31. TC ($Obj_k$) = Create_Test_Condition ( TI (First Child of Node k)) & Create_Test_Condition ( TI (Second Child of Node k) )
32.
33. TS ($Obj_k$) = Create_Test_Hints ( TI (First Child of Node k ) ) & Create_Test_Hints ( TI (Second Child of Node k ) )
34. ER ($Obj_k$) = Create_Expected_Results (First Child of Node k) & Create_Expected_Results (Second Child of Node k)
35. }
36. Else if $Ø_k$= "or"
37. {
38. Create a TCER Object: $Obj_k$
39. TC ($Obj_k$) = Create_Test_Condition (TI (First Child of Node k))
40. TS ($Obj_k$) = Create_Test_Hints ( TI (First Child of Node k) )
41. ER ($Obj_k$) = Create_Expected_Results (First Child of Node k)
42.
43. Create a TCER Object: $Obj_k$
44. TC ($Obj_k$) = Create_Test_Condition (TI (Second Child of Node k))
45. TS ($Obj_k$) = Create_Test_Hints (TI (Second Child of Node k) )
46. ER ($Obj_k$) = Create_Expected_Results (Second Child of Node k)
47.
48. }
49.
50. }
51. For L= all Levels from D-1 to 1
52. {
53. For k = all nodes at Level L
54. {
55. if $Ø_k$= "and", ","
56. {
57. Create a TCER Object: $Obj_k$
58. TC ($Obj_k$) = TC (First Child of Node k) & TC(Second Child of Node k) )
59. TS ($Obj_k$) =TS (First Child of Node k) & TS (Second Child of Node k) )
60. ER ($Obj_k$) = ER (First Child of Node k) & ER (Second Child of Node k) )
61. }
62. if $Ø_k$= "or"
63. {
64. Create a TCER Object: $Obj_k$
65. TC ($Obj_k$) = TC (First Child of Node k)
66. TS ($Obj_k$) = TS (First Child of Node k)
67. ER ($Obj_k$) = ER (First Child of Node k)
68.
69. Create a TCER Object: $Obj_k$
70. TC ($Obj_k$) = TC (Second Child of Node k)
71. TS ($Obj_k$) = TS (Second Child of Node k)
72. ER ($Obj_k$) = ER (Second Child of Node k)
73. }
74. }
75. }
76. }
77.
86. Display TCER Object(s): $Obj_1$ The requirements testing system 4000 may, for a given requirements sentence 106 that has been simplified, arrange the given requirements sentence 106 in the form of a tree after being broken down, which may have a single node (corresponding to a requirement sentence being simple) or have a depth of D. The requirements testing system 4000 may number every node of the tree and may create one or more TCER objects at each node. The requirements testing system 4000 may denote the TCER object as $Obj_k$. The TCER object may have three attributes—the Test Condition, the Test Hints and the Expected Results. These may be denoted as TC, TS and ER respectively. The operator '&' may, in some instances, combine the operands only if they are distinct—i.e., the operation (a & b)=(ab) only if a≠b.

When executing the logic for generating the positive TCERs and test sequences, the requirements testing system 4000 may operate as follows. Initially, if the given requirements sentence 106 is simple and thus the tree representation has a single node, Line 4 of the positive TCERs and Test Hints logic shows the population of the Test Condition. The process of the creation of Test Condition is shown later. The Test Hints may be created using the Create_Test_Hints function (see line 5). The Create_Test_Hints function is explained later. The Expected Results may be created using the Create_Expected_Results function. (see line 6). This function is explained later in this disclosure.

The requirements testing system 4000, when executing the above logic, may generate Pre-Conditions by identifying "data" and associated "conditions" in sentences. Data may include numerals, numbers written in text (like 'four'), Boolean conditions (like, ON, TRUE) and date & time. By conjoining data with the conditions (like '<=', 'before'), the requirements testing system 4000 may generate positive and negative conditions.

For requirements sentences 106 which are compound in nature, the simplification may result in a tree with at least 3 nodes (and at least a depth of 2). The requirements testing system 4000 may begin the analysis, then, at the level above the leaves (i.e., if depth of the tree is D, the analysis starts at level D-1 as shown in line 10). When the sentence is broken due to dependency structure (if-then), the requirements testing system 4000 may put test intents corresponding to the "if" part of the sentence into the Test Conditions (see line 16). The order in which a compound sentence is broken may ensure that the first child of the node is the 'if' part of the sentence and the second child is the 'then' part. The requirements testing system 4000 may then identify the Test Hints as the test intents of the "then" part (line 17). The requirements testing system 4000 may then identify the expected result from the complete simplified sentence. (line 18).

Certain sentences or statements may semantically imply an opposite of "if-then" even though they carry the same syntactic structure. An example of such a sentence is:

(22) SENTENCE: Unless the user is logged-in as a Guest, the report page should be editable.

Here, the sentence (22) implies: if the user is a Guest, verify for "not editable". This semantic understanding may be achieved by negating the action of the test intents (lines 24, 25). The Negation may work by introducing a "not" before the Verb of the sentence.

For a compound sentence that has been broken due to the conjunction "and", the requirements testing system 4000 may identify the TCER as a combination of the test conditions and expected results of both the simple sentences. This may be similar to checking for both simple sentence 1 and simple sentence 2 together. The requirements testing system 4000 may merge the test intents (shown by the operator '&'). Some test intents may be an exact duplicate because of the way a compound sentence may be broken up. The duplication may arise because the simple sentences may be lexically common and the test intents are created from the common text. In such a case, the merge operation performed by the requirements testing system 4000 when executing the logic may drop one of the duplicate test intent without any loss of information. The requirements testing system 4000 may identify the Test Condition in such a case as the merging of the Test Conditions (line 31). The requirements testing system 4000 may identify the Test Hints as the merge of the Test Hints of the simplified sentences (line 33). Similarly, the expected result may be the merge of the Expected Results of the simplified sentences. (line 34).

A compound sentence with conjunction “or” may create individual TCERs, each corresponding to the simple sentence created. This may be similar to having a tester check, individually, for each of the options specified through “or”. The requirements testing system 4000 may represent the operation as in lines 39-41 of the positive TCERs and Test Hints logic.

Having created Objects of TCERs using test intents, the requirements testing system 4000 may merge the objects according to the way the sentence has been broken (based on conjunctions—“and”, “or”). The requirements testing system 4000, when executing the positive TCERs and Test Hints logic, may proceed to move from the depth above the leaves to the root (line 51). At this point, all nodes may have one or more TCER objects created. The requirements testing system 4000 may again merge the nodes according to the logic of “and” or “or”. Because of the order in which a compound sentence is broken, “if-then” type of sentences may, in some systems, always occur at the last level and not appear at the current level of analysis. Finally, the requirements testing system 4000 may display the TCER objects created at the root.

The Test Conditions generated at this point and with this logic may correspond to positive test conditions—i.e., cases which verify the positive action of/on the Subject.

The Create_Test_Condition logic is explained here. The test condition is obtained by the concatenation of the first test intent of the simplified sentence and subsequent intents provided certain conditions hold between the first and subsequent intents. The rules to create a test condition are shown in the table below. The Test Condition is obtained by merging the first intent with all secondary intents that satisfy the rules mentioned in the table below:

| Rule ID | Rule Description | |
|---|---|---|
| TC1 | If the Link joining the secondary intent is MV* but not MVi, then check further rules (as provided in TC1.1, etc.) | |
| TC1.1 | | If the word that joins secondary intent to the first is any of ‘using’, ‘during’, ‘on’, ‘to’, ‘into’, ‘by’, Then include the secondary intent into the Test Condition |
| TC1.2 | | If the word that joins the secondary intent with the first is ‘for’ and the secondary intent does not end with the Link ‘Ju’, then include the secondary intent |
| TC1.3 | | if the link following MV* is Mgn, then include the secondary intent |
| TC1.4 | | if the word that joins the secondary intent with the first is any of ‘between’, ‘from’, ‘within’ and the secondary intent contains data on date or time, then include the secondary intent |
| TC2 | if the link joining the secondary intent to the first intent is Mv or Mv-Mvn or Mg, then include the secondary intent | |

The Create_Test_Hints function is explained here. This function simply takes every Test Intent generated and adds the keyword ‘Verify’. These test intents with the appended keyword is then set as the Test Hints.

The Create_Expected_Results is explained here. The Expected Result is taken as the entire simplified sentence and the modal verb if present is dropped. In this case, the verb following the modal verb is changed to present tense.

Once the positive test conditions, test hints and expected results have been determined by requirements testing system 4000 in block 4122, the method may move to (4124). The test condition logic 4008 may be executed to generate negative test conditions and associated test hints and expected results (4124).

The test condition logic 4008 may make or generate negative test conditions by first looking at the Test Condition field of the TCER object created in block 4122. If the Test Condition of the TCER object is populated due to a sentence of type dependency (“if-then”, “unless”, etc.), or the presence modifiers such as ‘only’, ‘except’, then the test condition logic 4008 may create the negative test conditions, and may generate Test Hints and Expected Results which correspond to this negative test condition.

In generating negative test conditions, the requirements testing system 4000 may leverage the test condition logic 4008 to identify test data from a test data ruleset as described, Boundary Value Analysis and the negation of sentences.

The identification of test data by the requirements testing system 4000 may include picking up the absolute number, the units associated with the data and the data condition. This may be achieved by modifying the dictionary of the link grammar parser logic 1014 to annotate all data with an appropriate tag. Data may include numbers (like “1”), and textual numerals (like “one”). Rules may also be developed to pick up the condition associated with the data (i.e., “<”, “greater than”, etc.). The condition could be symbolic or in text. The requirements testing system 4000 may also pick up the units associated with the data.

The ruleset to identify test data is provided in the table below:

TABLE 8

Data Ruleset

Figure 19:
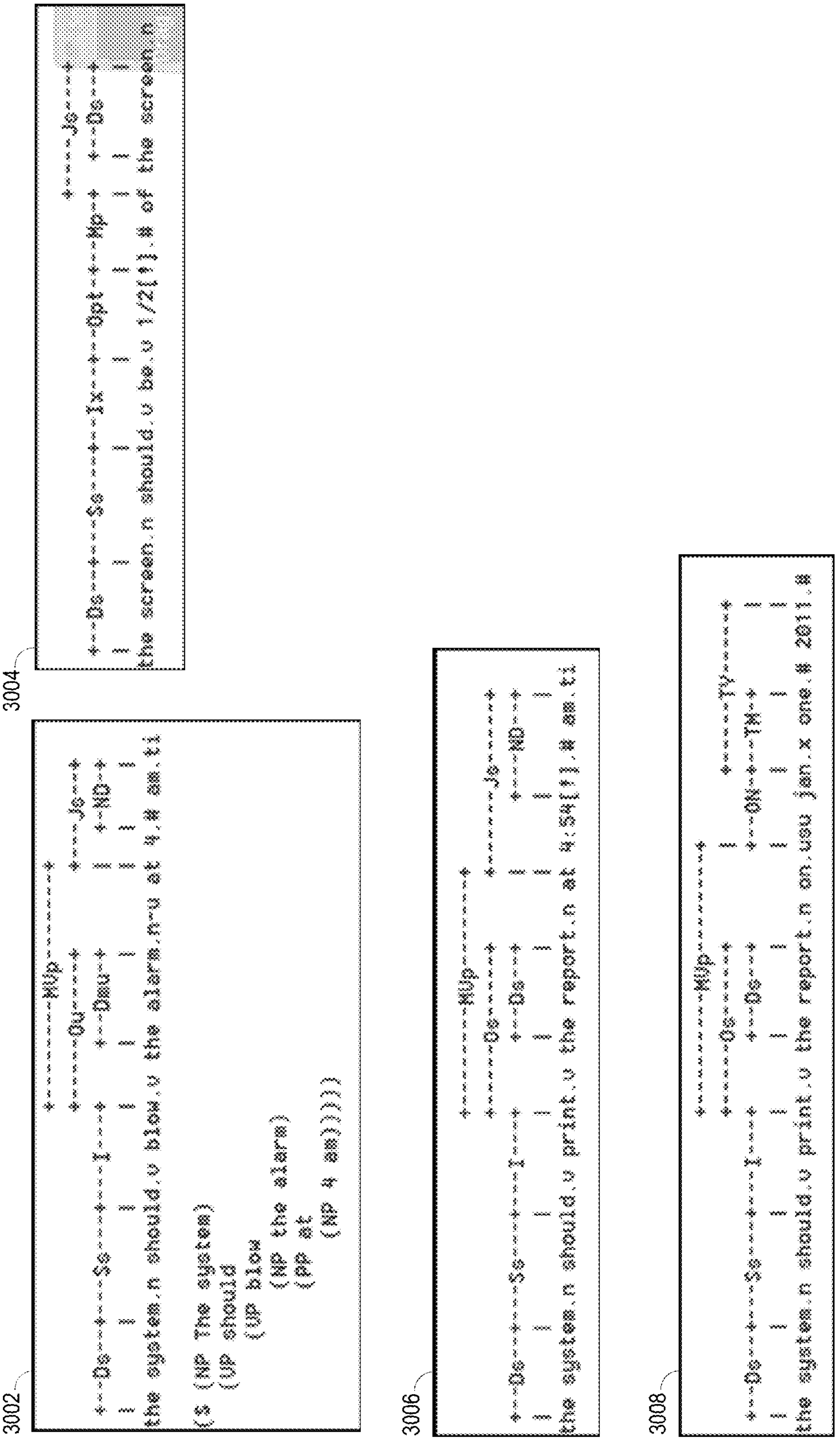
FIG. 19 illustrates examples of number and time data located in requirement statements.
Figure 20:
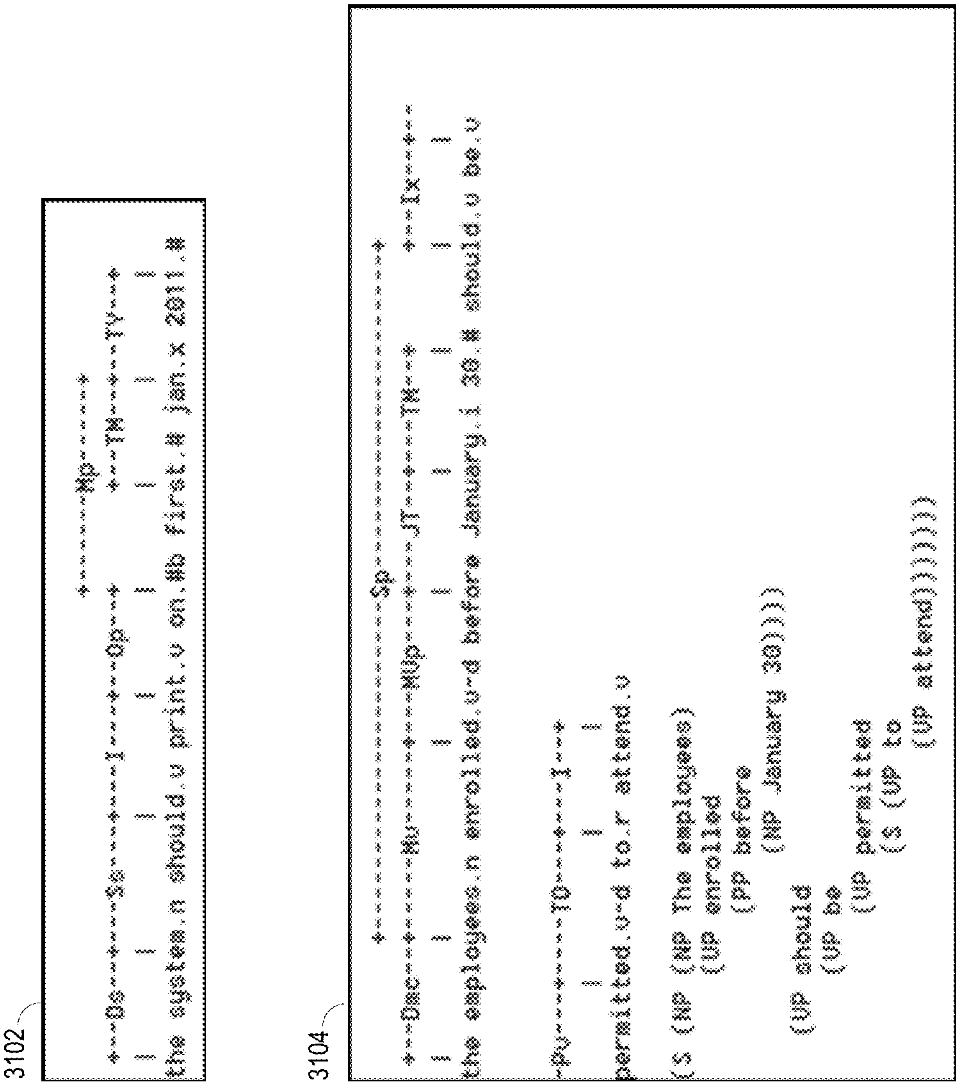
FIG. 20 illustrates examples of handling date data in requirement statements.
Figure 21:
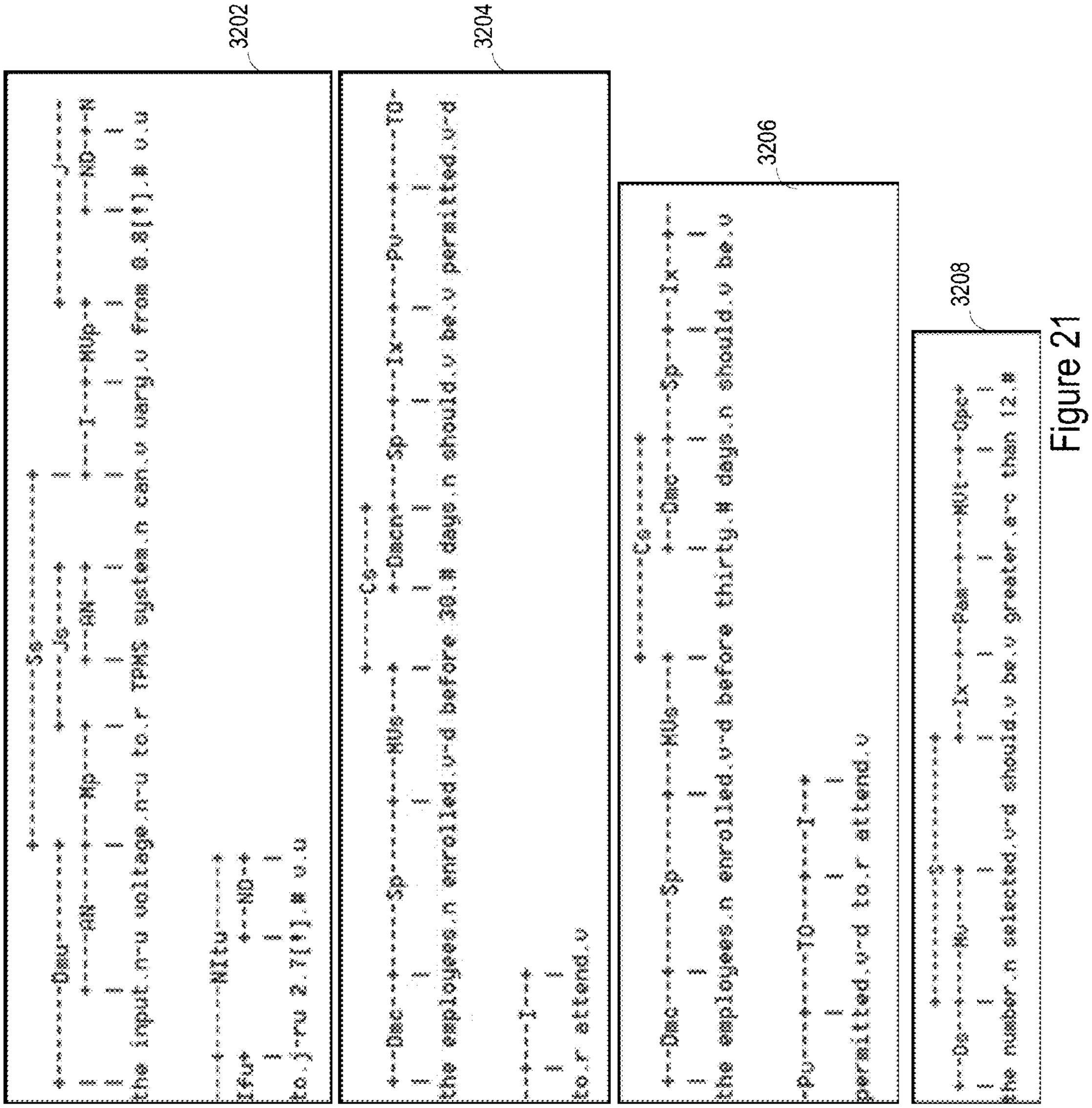
FIG. 21 illustrates examples of handling numeric data in requirement statements.
Figure 22:
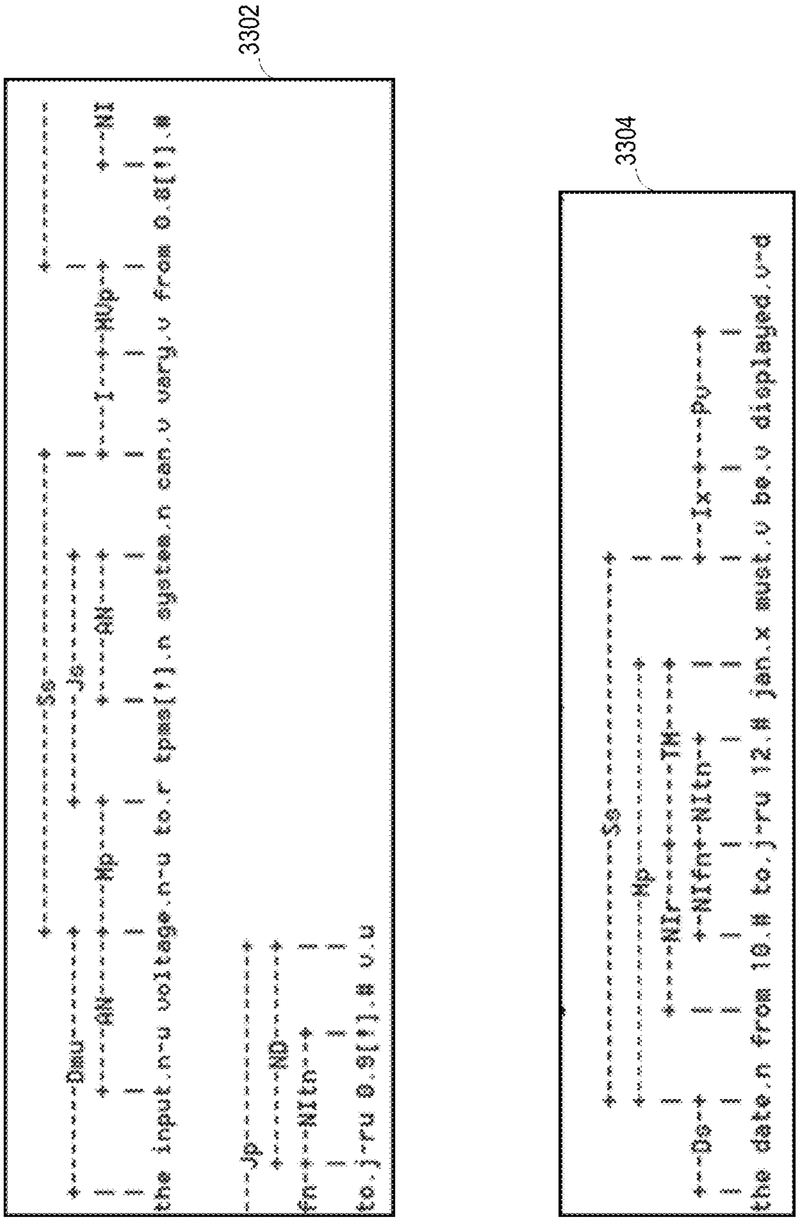
FIGS. 22 and 23 illustrates examples of handling range data in requirement statements.
Figure 23:
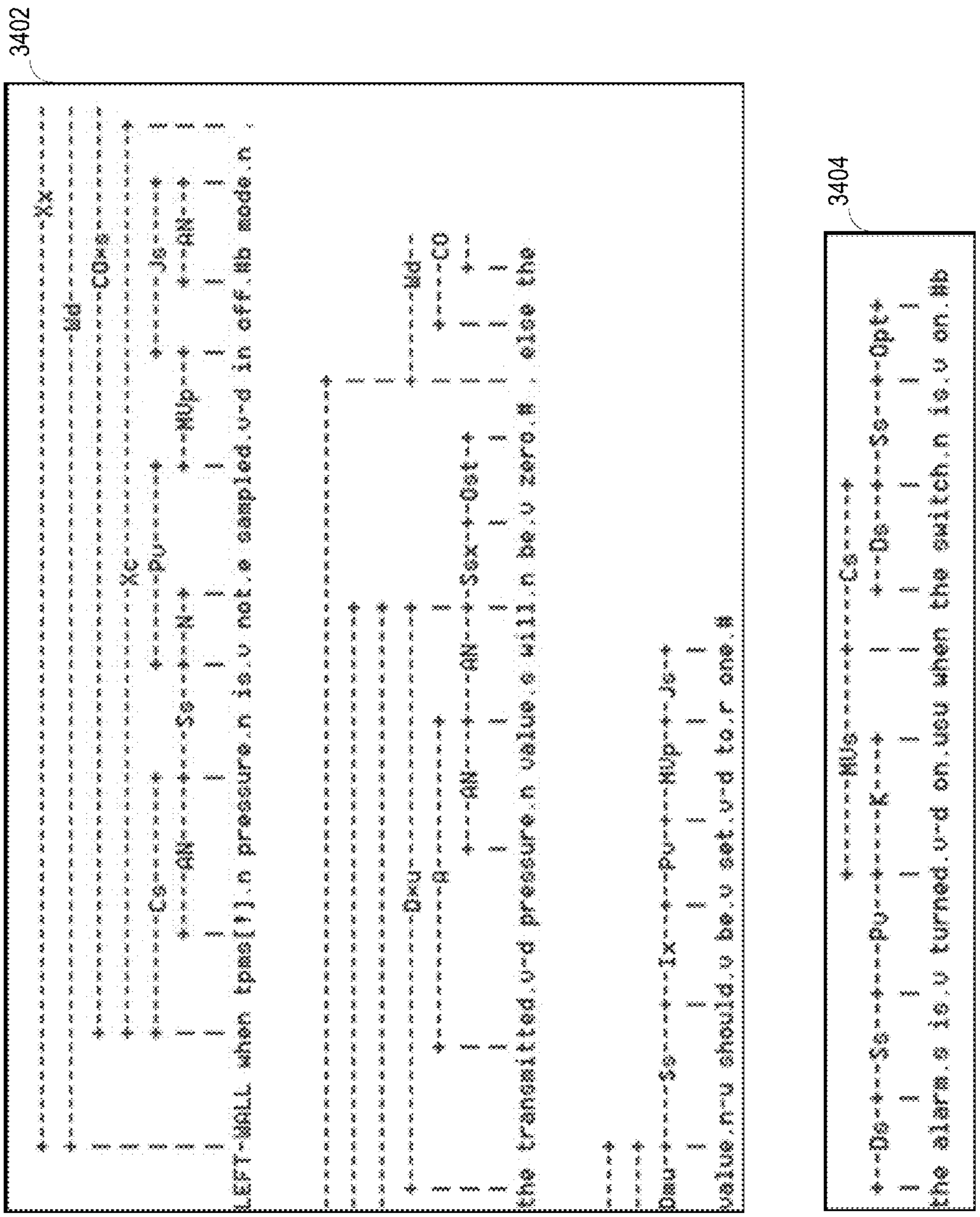
Figure 24:
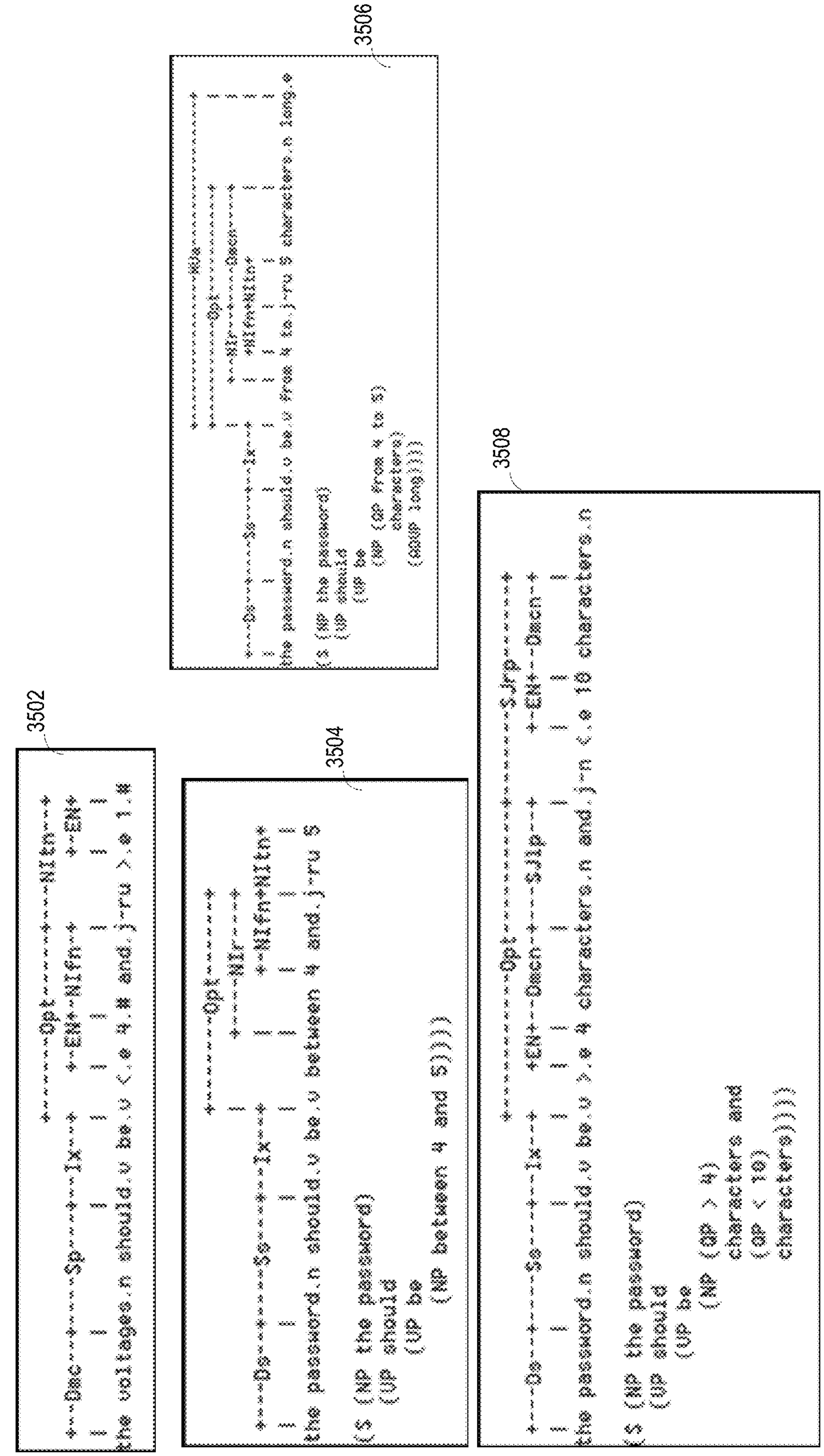
FIG. 24 illustrates examples of handling Boolean data in requirement statements.

| Rule ID | Rule | Rule in LG nomenclature | Meaning | Example |
|---|---|---|---|---|
| D.1 | Identify all numerals | Pull out the abs number which has the suffix .# | All numerals will have a suffix of .# | Described below |
| D.1.1 | Identify unit for time numeral | If abs no. has an (ND+ link or ( NIf*or Nit*) -> ND+ link ) and ND– connects to a word with a suffix of .ti; Then data unit = word with ND– and data type = time | Test Data = abs. no & unit Data Type = time | FIG. 19, 3002, 3006, FIG. 22, 3302 |
| D.1.2 | Identify month | If abs no. has (TM+ or TM– link) or (NIf*or Nit*)-> TM; data type = day. Month = the other end of the TM link. | | FIG. 19, 3008, FIG. 22, 3304 |
| D.1.3 | Identify the year | If abs. no has TY– link, data type = year. Month = other end of TY link (TY+). Check the month is the same. Else log error and keep month as that pointed by TY+ | Test Data = day (abs no) + Month + year (abs no) Data type = Date | FIG. 19, 3008; FIG. 20, 3102, 3104 |
| D.1.4 | Identify other units | If abs. no has ND+, Dmc+, Dmnc+ or AN, or (Nit* or NIf*) -> ND+, Dmc+, Dmnc+ or AN the unit is that pointed by the other end of the link | Test Data = abs no. & unit Data Type = natural number | FIG. 21, 3202, 3204, 3206, 3208; FIG. 19, 3004 |
| D.2 | Identify Boolean data | If the LG output has .#b data | | FIG. 23, 3402, 3404 |
| D.2.1 | Identify the units | Pull out the word with the subscript as .#b | Test Data = NP Data Type = Boolean | FIG. 23, 3402, 3404 |
| D.3 | Identify the condition by looking at the preposition before the numeral | For all .# data, check the SBAR or PP phrase before the tag containing the .# | | Described below |
| D.3.1 | Cases of lesser than | SBAR or PP = “before”, | Test Condition - < | |
| D.3.2 | Cases of greater than | SBAR or PP or VP = “after” | Test Condition - > | |
| D.3.3 | Cases of lesser than and equal to | SBAR or PP = “by” | Test condition - <= | |
| D.3.4 | Cases of greater than and equal to | SBAR or PP = “from” | Test Condition - >= | |
| D.3.5 | Cases of equal to | SBAR or PP or VP = “on,”, “to”, “at”, “but”, “in”, “be” | Test Condition - = | FIG. 24, 3506 |
| D.3.6 | Cases of symbols | If .# data has an EN link, pick up the symbol from EN+ | Test Condition - symbol from EN+ | FIG. 24, 3502, 3508 |
| D.4 | Conditions with a range | If the sentence has NIr link, | Test Condition - < with the NIf+ data Test Condition - > with the Nit– data * if the condition is between (the analysis logic 1018 may check the abs. nos. before putting < & > - eg: between 8 and 4 | FIG. 24, 3504 |

TABLE 8-continued

| Data Ruleset | | | | |
|---|---|---|---|---|
| Rule ID | Rule | Rule in LG nomenclature | Meaning | Example |
| D.5 | Print the test date | — | Data = {condition} {test data} Type = {data type} | |

The test condition logic 4008 may be executed by the requirements testing system 4000 to determine if negative TCERs can be generated using Boundary Value Analysis after having picked up the data, condition and the units. The test condition logic 4008 may look to generate TCERs at the given data value (i.e., =data), TCERs below the data value (i.e., <data) and TCERs above the data value (i.e., >data). For example, if the data in the requirement sentence is "<10", boundary value analysis may create TCERs for "=10" and ">10".

The negation of the action specified in a sentence by the requirements testing system 4000 may also be useful or needed for the generation of TCERs. The requirements testing system 4000 may achieve the negation in a three step process. The first option is to negate any roles present in the sentence. Currently 'admin' and 'administrator' are considered roles. If such words occur, then they are negated into 'non-admin' and 'non-administrator' respectively. If no roles are present, then the presence of permissions is checked in the sentence. Permission includes words like 'having', 'using' and 'with'. If any of these prepositions occur, the negation is achieved by inserting a 'not' before the preposition. If no permissions can be found in the sentence, then negation is achieved by inverting the verb associated with the subject. If there are two contiguous verbs between the subject and the object, the requirements testing system 4000 may insert a "not" between them. The requirements testing system 4000 may identify the verb by passing the given sentence (or sentence fragment) into the link grammar parser logic 1014 and checking the constituent tree output (see FIG. 25, 3610 and FIG. 26, 3704 for examples of constituent tree output). For example, the below sentence has two verbs:

(23) SENTENCE: The user should upload the report

By inserting a "not" between the verbs, the sentence is negated:

(24) SENTENCE: The user should not upload the report

In cases where there is a single verb and the verb is "is", "are", "were", etc., the requirements testing system 4000 may replace the verb with "is not", "are not", "were not", etc. This list of verbs may be limited and not endless, and may be maintained as a semantic list. For other cases of single verbs, the requirements testing system 4000 may convert the verb to singular using stemming (a heuristic based approach which looks at the last few characters of words and replaces them to convert the word into singular). The singular verb may then be pre-pended with "does not". See for example:

(25) SENTENCE: the user uploads the report

(26) SENTENCE: the user does not upload the report

Table 15 offers example rules to negate a sentence.

TABLE 15

| Number of contiguous Verb Phrases in Constituent Tree | Action |
|---|---|
| 1 | If Verb Phrase is "is", "or", "was", "were", put the phrase "not" after the Verb Phrase. Else convert Verb Phrase to singular using Stemming and put "does not" before the singular verb |
| >1 | If the first Verb Phrase contains "not", remove it ("not"). Else put "not" after the first verb phrase. |

The requirements testing system 4000 may generate the negative TCERs for TCERs identified as negative using Boundary Value Analysis and other non-data TCERs with Test Conditions populated from causal sentences. An example of logic that the test condition logic 4008 may implement to create the negative test condition, corresponding test sequence, and expected result (collectively referred to as "negative TCERs and Test Sequence"), is:

```
{
    Current Level, L = D - 1
    For k = all nodes at Level L
    {
        If ( Øk= "if-then", "when-then", "by the time", "after", , 'only', 'except', etc. )
        {
            Let t = Create_Test_Condtion ( TI (First Child of Node k) )
            Let s = Create_Test_Hints (TI (Second Child of Node k) )
            Call Function: GenerateNegativeTCERs (t, s)
        }
        Else if (Øk= "until-then", "unless", etc.)
        {
            Let t = Create_Test_Condtion ( TI (First Child of Node k) )
            Let s = Create_Test_Hints ( TI (Second Child of Node k) )
            Call Function: GenerateNegativeTCERs (t, s)
        }
        Else if (Øk= "or",)
        {
            Let t = Create_Test_Condtion ( (TI (First Child of Node k) ) & ... for all children of Node k
            Let s = Create_Test_Hints (First Child of Node k) & . . . for all children of Node k
        Call Function: GenerateNegativeTCERs (t, s)
        }
        Else if ((Øk= "and", ",")
        {
            Let t = Create_Test_Condtion (TI (First Child of Node k) )
            Let s = Create_Test_Hints (First Child of Node k)
```

-continued

```
27.         Call Function: GenerateNegativeTCERs (t, s)
28.
29.         Let t = Create_Test_Condtion (TI (Second Child of Node k) )
30.         Let s = Create_Test_Hints (Second Child of Node k)
31.         Call Function: GenerateNegativeTCERs (t, s)
32.
33.         .
            .
            .
34.         For all Children of Node k
35.       }
36.     }
37.   Call Function: Collate( )
38.   Display Negative TCERs Objects: Obj
39.   }
40.
41.   Function GenerateNegativeTCERs (T, S)
42.   {
43.     If ( T is Null )
44.       Exit
45.     For Every Combination of the Group of Test Intents in T // i.e., Test Intents joined by '&'
46.     For i = 1 to Number of Intents in T
47.     {
48.       If { Intent number i of T contains Data }
49.       {
50.         If ( Data Condition is "<" )
51.         {
52.           Create TCER Object Obj
53.           TC (Obj) =Intent Number 1 to i of T
54.           Replace Data Condition in Intent number "i" with "="
55.           TS (Obj) = Negation (S)
56.           ER (Obj) = Negation (S)
57.
58.           Create TCER Object Obj1
59.           TC (Obj) = Intent Number 1 to i of T
60.           Replace Data Condition in Intent number "i" with ">"
61.           TS (Obj) = Negation (S)
62.           ER (Obj) = Negation (S)
63.         }
64.         Else if (Data Condition is ">")
65.         {
66.           Create TCER Object Obj
67.           TC (Obj) = Intent Number 1 to i of S
68.           Replace Data Condition in Intent number "i" with "="
69.           TS (Obj) = Negation (S)
70.           ER (Obj) = Negation (S)
71.
72.           Create TCER Object Obj
73.           TC (Obj) = Intent Number 1 to i of T
74.           Replace Data Condition in Intent number "i" with "<"
75.           TS (Obj) = Negation (S)
76.           ER (Obj) = Negation (S)
77.         }
78.         Else if (Data Condition is "=")
79.         {
80.           Create TCER Object Obj
81.           TC (Obj) = Intent Number 1 to i of T
82.           Replace Data Condition in Intent number "i" with "!="
83.           TS (Obj) = Negation (S)
84.           ER (Obj) = Negation (S)
85.         }
86.         Else if (Data Condition is "<="
87.         {
88.           Create TCER Object Obj
89.           TC (Obj) = Intent Number 1 to i of T
90.           Replace Data Condition in Intent number "i" with ">"
91.           TS (Obj) = Negation (S)
92.           ER (Obj) = Negation (S)
93.         }
94.         Else if (Data Condition is ">="
95.         {
96.           Create TCER Object Obj1
97.           TC (Obj) = Intent Number 1 to i of T
98.           Replace Data Condition in Intent number "i" with "<"
99.           TS (Obj) = Negation (S)
100.          ER (Obj) = Negation (S)
101.        }
102.      }
103.      Else
104.      {
105.        Create TCER Object Obj1
106.        TC (Obj) = Intent Number 1 to i-1 of T
107.        TC (Obj) = TC (Obj1) & Negation (Intent Number "i" of T)
108.        TS (Obj) = Negation (S)
109.        ER (Obj) = Negation (S)
110.      }
111. }
112.
113. Function Collate ( )
114. {
115.   For L= all Levels from D-1 to 1
116.   {
117.     For k = all nodes at Level L
118.     {
119.       if (Øk= "or")
120.       {
121.         Create TCER Object: Obj
122.         TC (Obj) = TC (First Object of First Child) & TC (First Object of Second Child) .... & TC (First Object of Last Child)
123.         TS (Obj) = TS (First Object of First Child) & TS (First Object of Second Child) .... & TS (First Object of Last Child)
124.         ER (Obj) = ER (First Object of First Child) & ER (First Object of Second Child) .... & ER (First Object of Last Child)
125.
126.         Create TCER Object: Obj
127.         TC (Obj) = TC (Second Object of First Child) & TC (Second Object of Second Child) .... & TC (Second Object of Last Child)
128.         TS (Obj) = TS (Second Object of First Child) & TS (Second Object of Second Child) .... & TS (Second Object of Last Child)
129.         ER (Obj) = ER (Second Object of First Child) & ER (Second Object of Second Child) .... & ER (Second Object of Last Child)
130.
131.         .
             .
             .
132.         For all Objects at Node k
133.
134.     }
135.     if (Øk= "and")
136.     {
137.         Create TCER Object: Obj
138.         TC (Obj) = TC (First Object of First Child)
139.         TS (Obj) = TS (First Object of First Child)
140.         ER (Obj) = ER (First Object of First Child)
141.
142.         Create TCER Object: Obj
143.         TC (Obj) = TC (Second Object of First Child)
144.         TS (Obj) = TS (Second Object of First Child)
145.         ER (Obj) = ER (Second Object of First Child)
146.
147.         .
             .
             .
148.         For all Objects and all Children of Node k
149.       }
150.
151.     }
152.   }
158.}
```

The test condition logic 4008 may start the generation of negative TCERs by handling a requirements sentence 106 that was initially compound and has been simplified at this stage. The TCER object may contain the Test Conditions from the Create_Test_Condition module and is shown in line 7 of the negative TCERs and Test Hints logic. The Test Hints is similarly generated from the Create_Test_Hints function.

For a compound sentence of type dependency ("if-then", etc.), the test condition logic 4008 may designate or determine the Test Conditions as in the case of the Positive TCER. Similarly, for sentences of type "until-then", etc., the test condition logic may not negate the Test Conditions (unlike the case in the Positive TCER). The requirements testing system 4000 may identify the test hints as the entire test intents (lines 14).

The test condition logic 4008 may reverse the functioning of conjunctions 'or' and 'and' from that in the case of Positive TCERs. Here, for the case of 'or', the test condition logic 4008 may join test intents (lines 19-20). For the case of 'and' or ',', the test condition logic 4008 may keep the test intents distinct (lines 25-34). Once the TCER Objects are created at the level of "Leaf-1", the test condition logic 4008 may collate along the tree representation of the sentence. The collation may be similar to the case of the Positive TCER with the difference being that the collation for 'or' and 'and' are reversed. For example, for a conjunction 'and', the test condition logic 4008 may keep the TCER objects distinct and may merge the objects for the case of 'or'. This is shown in lines 113-149.

The operation when data is present is shown from lines 48-101. The logic for the various data conditions may be implemented which will give the negative test coverage. In cases where the test intent does not contain data, the test condition logic may perform the negation of the Test Condition and the associated Test Hints and Expected Result (lines 105-109). A set of examples depicting the various aspects of this logic are provided in the Appendix A.

After the negative test conditions and associated test hints and expected result are generated (4124), the requirements testing system 4000 may publish or otherwise display the TCERs generated for the given requirements sentence 106 in a report (4130). For example, the requirements testing system 4000 may publish the TCERs generated in an excel sheet. The requirements testing system 4000 may, in some instances, largely be based on the syntax of the sentence. Semantics may be needed at specific places, such as: a) the User defined Entities (although optional), b) the semantics of sub-ordinate conjunctions ("if-then", "unless", etc.), c) the semantics of conjunctions ("and", "or") and d) the semantics of conditions associated with data ("<", "after", etc.). The identification of the words that need semantic interpretation may be performed by the requirements testing system 4000 using the link grammar parser logic 1014 dictionary. For example, having determined that the semantics of "before" is to be created, the requirements testing system 4000 may identify all other words similar to "before" in structure by looking at the category in link grammar parser's dictionary. The category may contain all other words including "after", "by", etc. Other examples are possible.

Returning to where the method illustrated in FIG. 30 may break down compound requirements sentence 106 into simple sentences or statements (4116), along with performing the processes (4118-4124), the method may also or alternatively proceed to (and/or the requirements testing system 4000 may perform the function in) (4126) in parallel or at any time before, during, or after any of the processes (4118-4124). The requirements testing system 4000 may identify ambiguous phrases in the requirements sentence 106 (4126).

The identification of ambiguous phrases by the requirements testing system 4000 may be driven by a semantic list of phrases and a set of Links. When the words occurring with this given set of Links is not present in the list of phrases, the requirements testing system 4000 may mark a word as ambiguous. Ambiguous phrases may often occur as adjectives or adverbs, though not all adjectives or adverbs may be ambiguous. In some systems, a set of words have been developed whose occurrence does not imply ambiguity. The ruleset for ambiguity is shown in the table below.

TABLE 4

Ambiguity Ruleset

| Rule ID | Rule | Rule in LG nomenclature | Examples |
|---|---|---|---|
| T.A.1 | Identify word acting as an adjective | A, AJl, AJr, Ma, Pa, MJla, MJra | |
| T.A.1.1 | Check if the word is not present in the non-ambiguous list (e.g., by checking the glossary for unambiguous terms)- if so, the system 4000 marks the word as ambiguous | — | Described below with regard to the ambiguity checker and ambiguity glossary. |
| T.A.2 | Identify adverbs | EA, MVa, RJl, RJr, EN, EE, EC, EI | |
| T.A.2.1 | Check if the word is not present in the non-ambiguous list - if so, the system 4000 marks the word as ambiguous | — | Described below with regard to the ambiguity checker and ambiguity glossary. |
| T.A.3 | Identify determiners to nouns | Dmc*, Ds, p | |
| T.A.3.1 | Check if the word is not present in the non-ambiguous list - if so, the system 4000 marks the word as ambiguous | — | Described below with regard to the ambiguity checker and ambiguity glossary. |

TABLE 4-continued

| Ambiguity Ruleset | | | |
|---|---|---|---|
| Rule ID | Rule | Rule in LG nomenclature | Examples |
| T.A.4 | Identify the presence of ambiguous modal verbs | I*m, Ifm, Icm | |
| T.A.4.1 | If the link is present, mark the modal word attached to the link as ambiguous | | |
| T.A.5 | Identify Adverbs connected to E | E | |
| T.A.5.1 | If such words have a type ".a" or nothing, then we check if the word is not present in the non-ambiguous list - if so, the system 4000 marks the word as ambiguous | | |

TABLE 9

| Ambiguity Glossary - glossary for unambiguous terms, with respect to testability, used in conjunction with the ambiguity ruleset shown in Table 4. | | |
|---|---|---|
| Link Type | Word Type | Words |
| Adjective | Rank Comparator | First, last, second, third, fourth, fifth, sixth, seventh, eighth, ninth, tenth, eleventh, twelfth, thirteenth, fourteenth, fifteenth, sixteenth, seventeenth, eighteenth, nineteenth, twentieth, twenty-first, twenty-second, twenty-third, twenty-fourth, twenty-fifth, twenty-sixth, twenty-seventh, twenty-eighth, twenty-ninth, thirtieth, thirty-first, current, next, previous |
| Adjective | Mathematical and Statistical | accumulative, analytic, analytical, angular, arithmetical, asymmetric, asymmetrical, circular, concave, concentric, conic, conical, convex, cubic, cubical, cuboid, cuboid, cylindrical, diagonal, disjunct, double, equilateral, exponential, hexagonal, nonlinear, orthogonal, oval, parallel, polygonal, polyhedral, polynomial, probabilistic, quadrupedal, relational, round, single, square, tetrahedral, total, triangular, trigonal, trilateral, triple, absolute, accurate, average, binary, canonical, consecutive, decimal, hexadecimal, inaccurate, infinite, logarithmic, max, maximum, mean, median, medium, micro, mid, min, minimum, negative, nonzero, ordinal, polynomial, positive, positive, prime, random, rational, rational, real, zero, hundred, thousand, half-thousand, million, half-million, quarter-million, billion, half-billion, quarter-billion, trillion, half-trillion, quarter-trillion, dozen, half-dozen, bajillion, bazillion, gadzillion, gagillion, gajillion, gazillion, godzillion, jillion, jizillion, kabillion, kajillion, katrillion, killion, umptillion, zillion |
| Adjective | Technical | abstract abstracted, accessible, agile, anonymous, archival, broadband, cellular, clean, columnar, commercial compliant, conditional, constant, deadlocked, deterministic, dialup, digital, dimensional, dirty, dynamic, handheld, incremental, invalid, lazy, logical, lossless, lossy, multithreaded, multi-threaded, not null, null, online, persistent, plaintext, primitive, private, programmable, programmatic, public, secure, static, thick, thin, unique, valid, void, |
| Adjective | General | blank, bold, bolded, handwritten, italic, special, typewritten, academic, academical, accessible, All, alphabetic, alphabetical, automatic, autonomous, auxiliary, both, chief, chronological, compulsory, computable, computational, computerized, concrete, concurrent, conditional, constant, discrete, distinct, distinctive, double, empty, equal, equidistant, exact, excess, final, financial, finite, functional, handmade, hierarchical, |

TABLE 9-continued

| Ambiguity Glossary - glossary for unambiguous terms, with respect to testability, used in conjunction with the ambiguity ruleset shown in Table 4. | | |
|---|---|---|
| Link Type | Word Type | Words |
| | | horizontal, hour, hypothetical, identical, left, left-handed, lexical, linear, mandatory, manual, mathematical, metric, minute, numeric, numeric, numerical, numerical, onboard, onscreen, ontological, passive, perpendicular, radial, regional, regional, reusable, righthanded, right-handed, secret, successful, sufficient, tabbed, technical, technological, textual, topmost, unambiguous, unnumbered, un-registered, unregulated, unsuccessful, un-tested, untitled, visible, |
| Adjective | Colours | Black, blue, orange, red, green, pink, purple, gold, yellow, azure, brown, blond, gray, green, silver, white |
| Adjective | Languages | Arab, Arabian, British, Arabic, American, Cantonese, Congolese, Chinese, Danish, English, Finnish, french, French, German, Guyanese, hispanic, Irish, Italian, Japanese, Lebanese, Maltese, Polish, Portugese, Roman, Russian, Scottish, Senegalese, Spanish, Slavic, Sudanese, Surinamese, Swedish, Swiss, Taiwanese, Thai, Turkish, Vietnamese, |
| Adverbs | | alphanumerically, anonymously, anticlock-wise, clockwise, counterclockwise, diagonally, experimentally, exponentially, hierarchically, insecurely, lazily, legislatively, lengthways, lexically, locally, logarithmically, loosely, Only, orthogonally, previously, programmatically, quarterly, randomly, securely, serially, statically, successfully, successively, terminal, thrice, twice, un-classified, unsuccessfully, visually, |
| EN Adverbs | | by, after, <, <=, >, >=, =, <>, !=, Only, just, exactly, all but, nothing_but, an_estimated, an_additional, as_much_as |

The requirements testing system 4000 may also or alternatively display the results of the identification of ambiguous phrases may also or alternatively in a created report in block 2130. In some instances, the requirements testing system 4000 may display results of the identification of ambiguous phrases with the results of the test scenarios, test conditions, test sequences, and expected results. In other instances, the results may be displayed separate. Other examples or variations are possible.

Returning to block 4116, along with performing the processes (4118-4126), the method may also or alternatively proceed to (4128) in parallel or at any time before, during, or after any of the processes (4118-4126). The requirements testing system 4000 may classify a requirement sentence into one or more categories (4128).

Categorization of a given requirements sentence 106 into one or more pre-defined categories by the requirements testing system 4000 may be driven through a set of Links and a glossary of terms. During certain categorizations, the requirements testing system 4000 may look at the links and the type of nouns associated with them (e.g., Person noun versus a system noun). Other categories may be decided based on the presence of terms in the glossary.

The requirements testing system 4000 or 4000 may also, as described below, leverage the categorization processing described in the document commenting, analysis, and reporting applications ("DARAs"), including U.S. Pat. Publication Nos. 2011-0022902, 2010-0005386, and 2009-0138793, which are incorporated by reference in this document in their entireties.

The Rules for Categorisation is given in the table below:

TABLE 6

| Category Ruleset | | | |
|---|---|---|---|
| Rule ID | Rule | Rule in LG nomenclature | Example |
| C.1 | Check if any phrase from the NFR security glossary is present in the input sentence. Tag as "Security" | — | Described below |
| C.2 | Check if any phrase from the NFR logging glossary is present in the input sentence. Tag as "Error Handling" | — | Described below |

TABLE 6-continued

| Category Ruleset | | | |
|---|---|---|---|
| Rule ID | Rule | Rule in LG nomenclature | Example |
| C.3 | If category is not (C.1 or C.2) and a phrase from NFR glossary is present in the input sentence. Tag as "NFR" | — | Described below |
| C.4 | Noun−>action−>noun Where either of the nouns are "people", Tag as "Input/Output" Else if both the nouns are "system nouns", | S-I-O S-MVp-J S-Ix-Pa-TO-MVp-J S-I-MVs | FIG. 17, 2802 |
| C.5 | Noun−>action−>noun Where either of the nouns is a "person". If the "person noun" is connected to the "input" side of the verb, Tag as "Input test" | S-I-O S-MVp-J S-Ix-Pa-TO-MVp-J S-I-MVs | FIG. 17, 2804 |
| C.6 | Noun−>action−>noun Where either of the nouns is a "person". If the "person noun" is connected to the "output" side of the verb, Tag as "Output test" | S-I-O S-MVp-J S-Ix-Pa-TO-MVp-J S-I-MVs | FIG. 17, 2806 |
| C.7 | Check if the sentence has an if/then, when, | Cs | FIG. 18, 2902 |
| C.8 | Check if any of the phrases in the system 4000 Conformance glossary is present in the input sentence. Tag as "Conformance" | — | FIG. 18, 2904 |
| C.9 | Check if any of the phrases in the system 4000 Usability glossary is present in the input sentence. Tag as "Usability" No rules fire Tag as "Business Logic" | — | FIG. 18, 2904 |

TABLE 10

| Conformance Glossary | |
|---|---|
| Conformance | ICS |
| Conform to | HIPAA |
| Adhere to | CMI |
| Must follow | A4 |
| Oriented to | Policy |
| In orientation with | Style guide |
| In accordance to | ANSI |
| Browser | FCC |
| Browsers | IEC |
| Internet Explorer | IETF |
| Chrome | Protocol |
| Firefox | SIP |
| Safari | ASN |
| Compliant with | ITU |
| Comply with | TCP |
| compliance | IP |
| Standard | GSM |
| IEEE | ISDN |
| W3C | OMA |
| ETS | TOGAF |
| ISO | UML |
| IEC | OASIS |
| | COTS |
| | RUP |
| | Law |
| | Legal |
| | Format |
| | Formatted |
| | HIPAA |
| | SOX |
| | Basel |
| | UTF |
| | Validation/validity |

TABLE 11

| Usability Glossary | |
|---|---|
| Usability | UI |
| useful | GUI |
| Resolution | Graphic |
| Scroll | Right approach |
| Location | Time to learn |
| environment | Less interference |
| Look and feel | No interference |
| Ease | Satisfaction |
| Easy | Satisfactory |
| Appeal | Acceptable |
| attract | Effective |
| Difficult | Internationalization |
| Readable | i18n |
| legible | Localization |
| Display | L10n |
| Look at | Locale |
| Distortion | Accessibility |
| distorted | Navigation |
| Brightness | |
| Color | |
| Contrast | |
| Pixels | |
| Bandwidth | |
| Size | |
| Height | |
| width | |
| Font | |
| Picture | |
| Language | |

TABLE 12

NFR Glossary

| Area | System Attribute | Indicator_Phrases |
|---|---|---|
| Delivery Channels | Delivery channels | Delivery channel, delivery channels, environment, environments, Browser, browsers, PDA, printed report, report, reports, reporting, Internet Explorer, Mozilla, Safari, Netscape, Firefox, iPhone, windows mobile, black berry, palm, mobile phone, smart phone, fax, facsimile, android, RSS, twitter, pdf, Word, Excel, cellphone, screen monitor, LCD, CRT, Americans with Disabilities Act, ADA, screens, display screen, screen dimension, screen resolution, VGA, hidef, high-def, HD, high definition GUI, UI, query, querying, web service, web services, XML, Ajax, sd card, letter, email, emails, e-mail, e-mails, text message, SMS, WAP, web application, web app, desktop application, goggle app, facebook app |
| Delivery Channels | Connectivity Requirement | Dial-up, dial, broadband, dsl, internet, web, intranet, leased line, LAN, WLAN, 3G, Edge, 4G, wifi, wi-fi, landline, fiber, twisted pair, https, CDMA, GSM, wimax, Bluetooth, Ethernet, dix, WAP, satellite, cat5, cat6, fibre, coaxial, coax |
| CapacityVolumetrics | Locations | User located, user location, processing location, location, locations, inside firewall, onsite, offsite, onshore, offshore, local, nationwide, worldwide |
| CapacityVolumetrics | Number Of Users | User count, users, average, max, maximum, over, peak, total |
| CapacityVolumetrics | Concurrent Users | Logged-in, logged, connections, Concurrent Users, concurrent sessions, average, max, maximum, over, peak, total |
| CapacityVolumetrics | Transaction Mode | Online, asynchronous, transaction, processing, async, interactive, trans-action, batch mode, batch process, batch processing, spring batch, scheduling, batch cycle, batch function, batch scheduler, batch job, batch-queuing, batch queuing, batch queue, queue |
| CapacityVolumetrics | UseCaseExecutionRate | Use case execution, Per minute, per hour, per second, per sec, per seconds, average, maximum, peak |
| CapacityVolumetrics | ServerTransactionPerUseCase | Transaction, Transactions, server, Hits, http requests, transactions, process hits, web service requests, average, max, maximum, over, peak, total |
| CapacityVolumetrics | Transaction Rate | Transaction rate, Per minute, per hour, per second, per sec, per seconds, average, maximum, peak |
| CapacityVolumetrics | TransactionSize | Transaction, data exchange, data transfer, data interface, upload, download, average, byte, Bytes, kilobyte, kilobytes, megabytes, megabyte, gigabytes, terabytes, pentabytes, kb, MB, GB, TB, average number of bytes |
| CapacityVolumetrics | DataVolumes | data storage, database, relational database, record Records, byte, Bytes, kilobyte, kilobytes, megabytes, megabyte, gigabytes, terabytes, pentabytes, kb, MB, GB, TB, average number of bytes |
| CapacityVolumetrics | DataRetentionReq | Purge, retention, data retention policy, retain, email retention, record retention, 7-years, privacy, seven, data, retain, account retention, years online, years in archive, business records, data deletion, delete, discovery request, information retention, discovery cost, archiving, backup, database, relational database |
| Performance | TotalExpectedExecutionTimePerUseCase | complete processing, return a response, execution time, executed, finished, finish, millisecond, milliseconds, ms, Seconds, second, sec, minute, minutes, mins, hour, hours, hr, hrs, use case |

TABLE 12-continued

NFR Glossary

| Area | System Attribute | Indicator_Phrases |
|---|---|---|
| Performance | AverageUserThinkTimePerTransaction | complete processing, return a response, execution time, executed, finished, finish, millisecond, milliseconds, ms, Seconds, second, sec, minute, minutes, mins, hour, hours, hr, hrs, use case |
| Performance | Concurrent Transactions | Concurrent transaction, simultaneously, simultaneous, combined, synchronous, wait, waiting, queue, average, max, maximum, over, peak, total, connections, concurrent sessions, at the same time |
| Performance | Response Time | Response time, response times, respond, average response time, 95th percentile, millisecond, milliseconds, ms, Seconds, second, sec, minute, minutes, mins, hour, hours, hr, hrs |
| Performance | BatchCycle | batch mode, batch process, batch processing, spring batch, scheduling, batch cycle, batch function, batch scheduler, batch job, batch-queuing, batch queuing, batch queue, queue |
| Performance | BatchProcessingWindow | AM, PM, weekend, weekends, weekday, weekday, workday, Monday, Tuesday, Wednesday, Thursday, Friday, Saturday, Sunday, between, time, batch mode, batch process, batch processing, spring batch, scheduling, batch cycle, batch function, batch scheduler, batch job, batch-queuing, batch queuing, batch queue, queue |
| Performance | Batch Execution Time | Maximum execution time, complete processing, return a response, execution time, executed, finished, finish, millisecond, milliseconds, ms, Seconds, second, sec, minute, minutes, mins, hour, hours, hr, hrs, batch mode, batch process, batch processing, spring batch, scheduling, batch cycle, batch function, batch scheduler, batch job, batch-queuing, batch queuing, batch queue, queue, average, max, maximum, over, peak, total |
| Performance | Batch dependencies | Start, finish, before, dependent, depends, batch mode, batch process, batch processing, spring batch, scheduling, batch cycle, batch function, batch scheduler, batch job, batch-queuing, batch queuing, batch queue, queue |
| Scalability | Scale | Scalable, machines, increase load, increases, grow, growth, scale up, readily enlarged, performance, enlarge, enlarged, augment, increment, transaction volume, transaction volumes, data growth, expand capacity, expanded, expanding, increased number, increased amount |
| Availability | Hours of operation | Operation, operate, 7-days, seven days, 24 × 7 24/7, AM, PM, 24-hours, 24-hr, 24-hrs, weekend, weekday, workday, 365, AM, PM, weekend, weekends, weekday, weekday, workday, Monday, Tuesday, Wednesday, Thursday, Friday, Saturday, Sunday |
| Availability | Scheduled Maintenance | Down maintenance, Scheduled Maintenance, Operation, operate, AM, PM, weekend, weekends, weekday, weekday, workday, Monday, Tuesday, Wednesday, Thursday, Friday, Saturday, Sunday |
| Availability | Percent Availability | Availability percentage, %, percent, outage duration, five nines, available, 99.9, 99.99, 99.999, uptime, high availability, SLA |
| Availability | Recovery Time | Recover, heart beat ping, detect failure, failover, second, seconds, minute, minutes, hour, hours, average, maximum, failure detection, unavailability, outage, outages, downtime, system failure, network outage, average, max, maximum, over, peak, total, millisecond, milliseconds, ms, Seconds, second, sec, minute, minutes, mins, hour, hours, hr, hrs |

TABLE 12-continued

| NFR Glossary | | |
|---|---|---|
| Area | System Attribute | Indicator_Phrases |
| Availability | DisasterRecoveryRequirements | Disaster recovery, disaster recovery plan, natural disaster, catastrophic, catastrophe, outage, unavailability, earthquake, sabotage, DOS, DDOS, failover, service degradation, critical business function, business continuity planning, business impact analysis, recovery time objective, recovery point objective, cyber attack, utility outage, terrorism, emergency management |
| Security | Information Security | access rights, access, level access, LDAP, microsoft domain authentication, authentication, data transfer, VPN, DNS, private data, integrity, confidential |
| Security | Security Roles | privileged, standard role, access rights |
| Security | Security Administration | access request, grant access, request access, transfer access, terminate access, password policy, account disable, change password |
| Security | Access Review | |
| Security | Security Audit Trail | security audit, transaction audit |
| Security | Security Monitoring | |
| Security | Data Classification | |
| Security | Encryption | encrypt, encryption, cryptograph, cryptographic, unencrypted, digital signature, ciphertext, encipher, decryption, cipher, DES, AES, RSA |
| Security | Operation Security | |
| Security | Customer Privacy | |
| Support Requirement | Archive | archive, log, recovery |
| Support Requirement | Backup | backup, log recovery |
| Support Requirement | Purging | purge, purging |
| Support Requirement | Logging | log, logging, exception, recovery |
| Support Requirement | Monitoring | monitor, monitoring, notification, frequency, dashboard, |
| Support Requirement | Disaster recovery | disaster, recovery, |

The system 4000 may employ the entity glossary and the category keyword glossary from the DARAs, or may employ customized glossaries including additional, different, or fewer glossary entries. In particular, the entity glossary may be implemented as the agent glossary in the DARAs. An example NFR dictionary, including a logging and security section is given above in Table 12.

Table 7 shows some examples of categories that the system 4000 may recognize.

TABLE 7

| Example Categories | |
|---|---|
| Category Types | Example |
| Function (or Business Logic) test | User shall update the table to overwrite system default |
| Interface/Inter-module test | The user shall use a touch-screen kiosk to select options |
| Input domain test | The user must enter an 8 digit alphanumeric password NOT containing special character "!" |
| Usability/conformance | 75% of the portal content must be viewable in standard 40004*768 browser resolution without scrolling down |
| Output correctness | The system should emit "1" on successful exit |
| Condition/dependency test | The invoice is generated only after the shipment entry tag is processed. |

TABLE 7-continued

| Example Categories | |
|---|---|
| Category Types | Example |
| Error handling | The exception should be captured and a user specific error code should be displayed |
| Security | For any secure browser sessions an inactivity and timeout condition must be set |
| NFR | The system should support 300 logged in users and 40 concurrent users |

For the security category, the requirements testing system 4000 or 4000 may compare the requirement statement 1006 to the indicator phrases in the DARAs NFR glossary marked as security. For error handling, the system 4000 may compare the requirement statement 1006 to the indicator phrases in the DARAs NFR glossary marked as "logging", "disaster recovery", "DisasterRecoveryRequirements", "Recovery Time", or any other phrases that indicate error handling.

As noted above, the non-functional requirement (NFR) statement specifies how a system should behave. What the behavior should be is captured in the functional requirement. The requirements testing system 4000 may compare the requirements sentence 106 to the indicator phrases in the DARAs NFR glossary, except those marked for security or error handling (as noted above).

The requirements testing system 4000 may categorize a requirement statement as involving an inter-module test as follows:

Noun→Modal Verb→{Preposition, condition}→Noun

Figure 17:
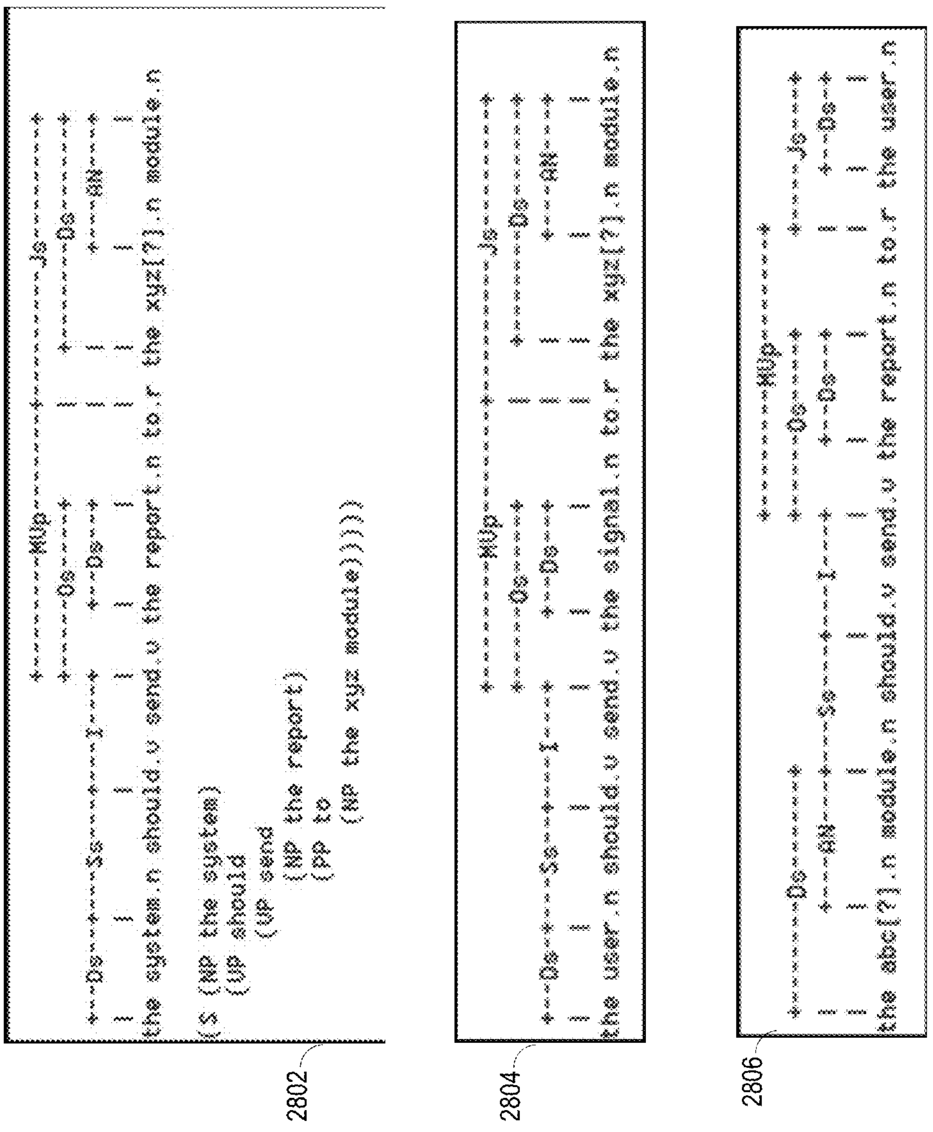
FIG. 17 illustrates examples of inter-module test and input/output domain requirement statements.

Then, the requirements testing system 4000 may confirm that both the nouns are not actors and not persons. An example inter-module test statement 2802 is shown in FIG. 17 for the requirement statement "The system should send the report to the xyz module."

The requirements testing system 4000 may classify verbs as input/output. For example, the requirements testing system 4000 may regard "send" and "click" as outputs and "receive" as an input. The requirements testing system 4000 may then determine whether a person noun phrase occurs to the left of the verb or to the right of the verb. If the person noun phrase is to the left, the requirements testing system 4000 may categorize the requirement sentence as an "Input domain", else as an "Output domain." An example Input domain sentence 2804 is present in FIG. 17. An example output domain sentence 2806 is also present in FIG. 17.

Figure 18:
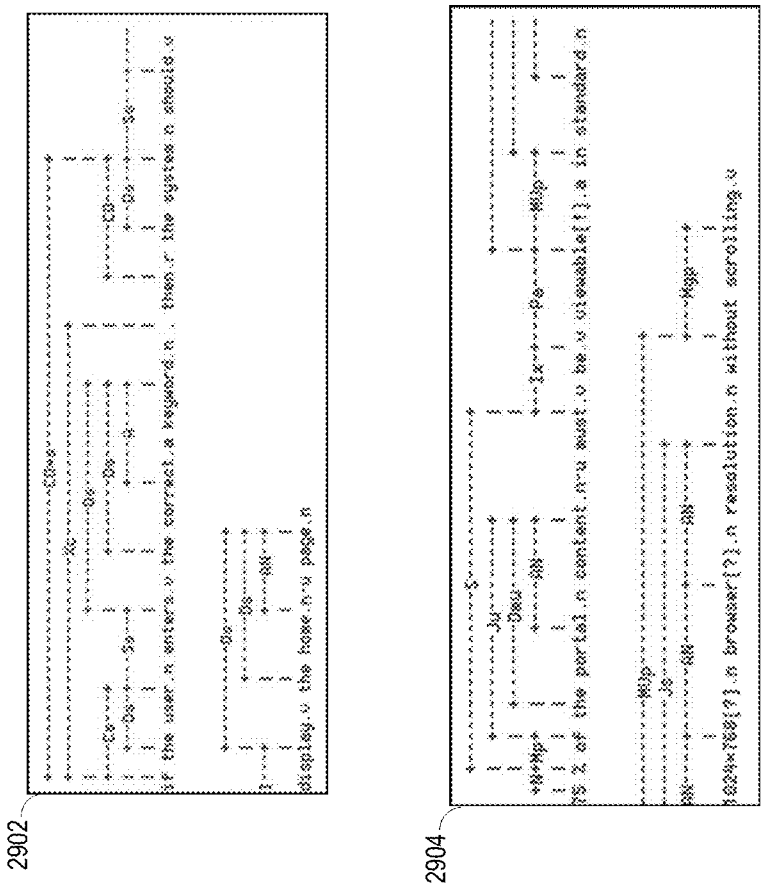
FIG. 18 illustrates examples of condition/dependency and usability/conformance requirement statements.

The requirements testing system 4000 may determine that a requirement sentence is of the category Condition/Dependency, when the link grammar parser logic 1014 locates condition "C" structures in the requirement sentence. An example Condition/Dependency statement 2902 is shown in FIG. 18.

The requirements testing system 4000 may determine that a requirement sentence is of the category Usability/Conformance, when the link grammar parser logic 1014 locates any of the keywords in the usability glossary or in the conformance glossary, respectively, in the requirement sentence. An example Usability/Conformance statement 2904 is shown in FIG. 18.

The requirements testing system 4000 may also or alternatively display the results of the classification of the sentence into the categories in a created report in block 2130. In some instances, these results may be displayed by the requirements testing system 4000 with the results of the test scenarios, test conditions, test sequences, and expected results. In other instances, the results may be displayed separate. Other examples or variations are possible.

Figure 34:
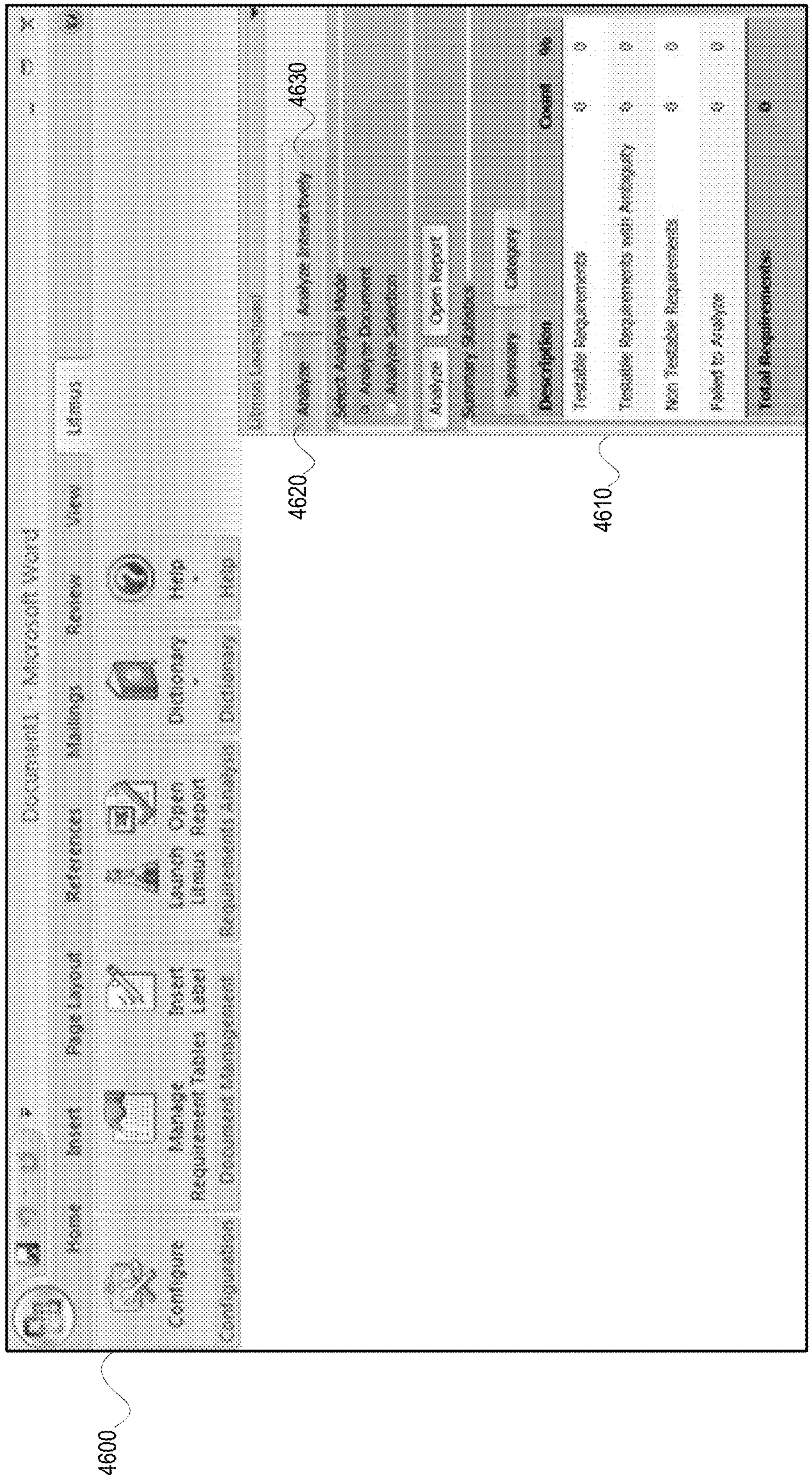
FIG. 34 shows an example of a user interface display generated by the requirements testing system.

As noted, the requirements testing system 4000 may create a report (4130). FIG. 34 shows an example of a user display screen 4600 generated and displayed by the requirements testing system 4000, the screen 4600 having a window 4610 showing a display of data and information provided by the requirements testing system 4000. The window 4610 may include an "Analyze" tab 4620. The "Analyze" tab 4620 may provide summary information about analysis performed by the requirements testing system 4000. The requirements testing system 4000 may also or alternatively provide an "Analyze Interactively" tab 4630, which may allow the requirements testing system 4000 to analyze requirement sentences or other statements interactively. Business analysts or other users may use this feature to write a requirement sentence or other sentence, execute the requirements testing system 4000, and review the results in window 4610 itself, thereby enabling users to improve the requirements or statement definition process. FIG. 35 shows an example of a report 4700 that may be generated by the requirements testing system 4000, such as in (4130) of the method in FIG. 30.

In some systems, the requirements testing system 4000 may operate in two basic modes—Analyze the entire document, or analyze interactively. In the interactive mode, the requirements testing system 4000 may enable receive a given sentence and output without generating any report. If the given requirement document has already been analyzed, the "Open Report" will directly open the analyzed excel report. This "Open Report" may also be present as a separate button in the Ribbon. Many other examples of displays and reports generated by a requirements testing system 4000 are possible.

In some instances, the requirements testing system 4000 may create or generate separate reports for each process or branch of the method. In other instances, the requirements testing system 4000 may create one report for all of the processes or branches. In one example, after the analysis of all the requirements sentence 106 in a requirements document 104, the requirements testing system 4000 may generate an excel report which may include the test description of a requirements sentence 106, the Test Conditions, Test Sequence and Expected Results for the requirements sentence 106, and/or the Category and Ambiguous phrases if any. The results of a single requirements sentence 106 may also be seen in some systems by running the tool in interactive mode, where an excel sheet is not created but the result is shown in the requirements document 104 itself.

The report 4700 generated by the requirements testing system 4000 in (4130) may give a summary of analysis that includes the total requirements analyzed, number of scenarios, total number of TCERs and total number of test steps generated. The logic 4100 may also or alternatively categorize requirement sentences or statements in the report 4700 generated in (4130) into different categories (for example, as defined by IEEE standards). The category information may be used to identify gaps in requirements gathering and to fine tune the estimates. For example, if security is an important consideration for the system, and the number of security requirements is either zero or very few, then the requirements gathering process may be incomplete. Similarly, if there are many non-functional requirements (NFRs), then the test estimates may need to budget for this. The report 4700 generated in (4130) may also or alternatively give the details of the analysis which includes sentences that could not be analyzed, the ambiguous words in requirement sentences, the category a requirement belongs to and/or the requirement sentences that are 'Non-Testable'. The report 4700 may be automatically generated and/or fields in the report may be filled automatically or manually. Other examples or reports 4700 and displays are possible.

The requirements testing system 4000 may be implemented as a plug-in or add-in into Microsoft word and Excel.

The requirements testing system 4000 has been tested on approximately 1600+ functional requirements from various projects on different domains, with the results achieved shown below in Table 16.

TABLE 16

| Domain | Number of Requirements | Accuracy of Link Grammar | No. of Positive TCERs | No. of Negative TCER | No. of Test Steps | Accuracy of the requirements testing system |
|---|---|---|---|---|---|---|
| Pharma | 26 | 100% | 28 | 19 | 81 | 72.3% |
| Pharma | 864 | 89% | 778 | 205 | 1249 | 84.2% |
| Pharma | 42 | 93% | 39 | 9 | 93 | 79.2% |
| Pharma | 37 | 84% | 30 | 24 | 87 | 55.6% |
| Pharma | 322 | 80% | 242 | 137 | 741 | 70.7% |
| IT | 178 | 75% | 144 | 44 | 324 | 63.3% |
| IT | 183 | 81% | 159 | 43 | 431 | 64.4% |
| Total | 1652 | 85% | 1420 | 481 | 3006 | 76.1% |

The requirements testing system 4000 demonstrates excellent accuracy across the different domains.

The requirements testing system 4000 may be configured to operate in an "insert label" mode. In this mode, the requirements testing system 4000 may identify that a requirements document does not have labels for a requirements sentence. The requirements testing system 4000 may identify requirements for which labels are desired, and then, the requirements testing system 4000 may insert label for the sentences. In some systems, the prompting of the insertion of the label may take place after the sentence has been identified, but before the label has been applied, such as where a user may identify or otherwise highlight the sentence and select or trigger the requirements testing system 4000 to insert a label for it.

The requirements testing system 4000 may be configured or operable to handle short forms like "i.e." and "e.g.". The requirements testing system 4000 may ignore images, which may improve processing speeds. The requirements testing system 4000 may be configured or operable to account for and handle "track changes" in requirements document, such as "track changes" in a Microsoft Word document. For example, if the requirement document has many revisions and user has not accepted changes, the requirements testing system 4000 may identify that and prompt a user, or require a user, to accept all the changes before analyzing the document. The requirements testing system 4000 may be configured or operable to handle table of contents and table of figures. The requirements testing system 4000 may skip the table of contents and table of figures for labeling functionality and may not analyze sentences in those sections.

The requirements testing system 4000 may be used by many different users, businesses, or entities, such as Business Analysts and Test Engineers. Business Analysts may run a requirements testing system 400 to ensure that the requirements captured are testable and cover all the required test categories. Test Engineers may use a requirements testing system 4000 to generate test design artifacts and estimate the testing effort (based on the summary report generated by the requirements testing system 400). The requirements testing system 4000 may ensure completeness and reduce dependency on skilled and experienced resources during the test design phase. The requirements testing system 4000 may improve productivity and provide more fine grained information that helps in better testing effort estimation. Reports generated by the requirements testing system 4000 may help in traceability and audit. The requirements testing system 4000 may include various other advantages.

The methods, systems, and logic described above may be implemented in many different ways in many different combinations of hardware, software or both hardware and software. For example, the logic executed by the system 4000 may be circuitry in a controller, a microprocessor, or an application specific integrated circuit (ASIC), or may be implemented with discrete logic, or a combination of other types of circuitry. The logic may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for example, instructions for execution by a processor, controller, or other processing device. Similarly, the memory in the system may be volatile memory, such as Dynamic Random Access Memory (DRAM) or Static Radom Access Memory (SRAM), or non-volatile memory such as NAND Flash or other types of non-volatile memory, or may be combinations of different types of volatile and non-volatile memory. When instructions implement the logic, the instructions may be part of a single program, separate programs, implemented in an application programming interface (API), in libraries such as Dynamic Link Libraries (DLLs), or distributed across multiple memories and processors. The system 4000 may test input sentences other than requirement sentences.

While various embodiments have been described, it will be apparent to those of ordinary skill in the art that many more embodiments and implementations are possible. For example, a method for testing a requirement sentence may be provided. The method may include obtaining a requirement sentence and storing the requirement sentence in a memory. The method may further include submitting the requirement sentence to a grammatical parser executed by a processor to obtain parser outputs characterizing the requirement sentence. The method may further include applying a test artifact ruleset with the processor to the parser outputs to determine a test artifact applicable to the requirement sentence.

In some cases, applying the test artifact ruleset includes applying a testability ruleset with the processor to the parser outputs to determine a test artifact that indicates whether the requirement sentence is testable. Additionally or alternatively, it may be that applying the test artifact ruleset includes applying an ambiguity ruleset with the processor to the parser outputs to determine a test artifact that indicates whether the requirement sentence is ambiguous with respect to testability. Additionally or alternatively, applying the test artifact ruleset may include applying an intent ruleset with the processor to the parser outputs to determine a test artifact that indicates an intent characteristic of the requirement sentence. Additionally or alternatively, applying the test artifact ruleset may include applying a category ruleset with the processor to the parser outputs to determine a test artifact that indicates a category characteristic of the requirement sentence. Additionally or alternatively, applying the test artifact ruleset may include applying a data ruleset with the processor to the parser outputs to determine a test artifact that indicates a data characteristic of the requirement sentence. Additionally or alternatively, applying the test scenario ruleset can determine the test scenarios. Additionally or alternatively, applying the test condition and expected results logic can generate the test conditions, the expected results and the test hints. Additionally or alternatively, the method may further include executing a pre-processor on the requirement sentence prior to submitting the requirement sentence to the grammatical parser.

According to another aspect, a computer program product including computer-readable instructions may be provided. The instructions, when loaded and executed on a computer system, may cause the computer system to perform operations according to the steps (aspect and/or embodiments) discussed above.

According to yet another aspect, a requirement sentence analysis system may be provided. The system may include a processor and a memory in communication with the processor. The memory may include a requirement sentence and grammatical parser logic. The memory may further include analysis logic operable to, when executed by the processor obtain the requirement sentence and store the requirement sentence in the memory. When executed, the analysis logic may be further operable to submit the requirement sentence to the grammatical parser logic and obtain parser outputs characterizing the requirement sentence. The analysis logic may be further operable to apply a test artifact ruleset to the parser outputs to determine a test artifact applicable to the requirement sentence.

In some cases the test artifact ruleset may include a testability ruleset configured to determine, as the test artifact, whether the requirement sentence is testable. Additionally or alternatively, the test artifact ruleset may include an ambiguity ruleset configured to determine, as the test artifact, whether the requirement sentence is ambiguous with regard to testability. Additionally or alternatively, the test artifact ruleset may include an intent ruleset configured to determine, as the test artifact, an intent characteristic of the requirement sentence. Additionally or alternatively, the test artifact ruleset may include a category ruleset configured to determine, as the test artifact, a category characteristic of the requirement sentence. Additionally or alternatively, the test artifact ruleset may include a data ruleset with the processor to the parser outputs to determine a test artifact that indicates a data characteristic of the requirement sentence. Additionally or alternatively, applying the test scenario ruleset can determine the test scenarios. Additionally or alternatively, applying the test condition and expected results logic can generate the test conditions, the expected results and the test hints. Also, the analysis logic may be further operable to execute a pre-processor on the requirement sentence prior to submitting the requirement sentence to the grammatical parser.

It should be understood that various modifications to the disclosed examples and embodiments may be made. In particular, elements of one example may be combined and used in other examples to form new examples. Accordingly, the implementations are not to be restricted except in light of the attached claims and their equivalents.

APPENDIX A

1 Examples of Entity Extractor 1.1 Sentences which Link Grammar Parser Logic 1014 can Link Req-1: The Resource Management System may generate the project report.

Req-2: The Resource Manager may ensure that every process does not exceed 100 MB of runtime memory.

Req-3: Project Resource management system may be required to have good response time.

Req-4: When the employee roll-off date from the project is less than 20 days, the Reporting module may send email notification to the Project Manager with roll-off information.

Req-5: When ignition is ON, the polling pattern system may give priority to the TPMS message.

1.2 Sentences which Link Grammar Cannot Link

Req-6: Build the ABC solution identified during analyze phase as a contingency option on Number Ranges.

Req-7: Test Facility may be required to be connected to UXR with AS2.

Req-8: Create a credit note from order history and delete the credit note.

Figure 36:
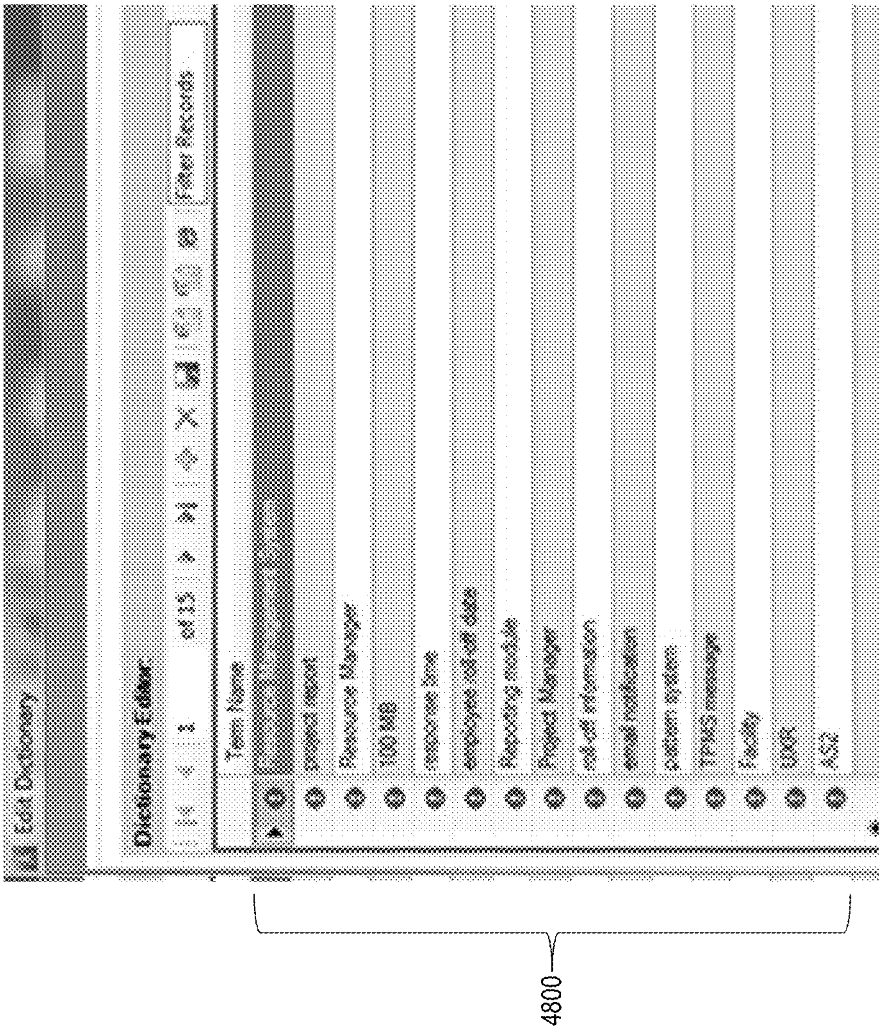
FIG. 36 shows an example of entities automatically selected for a set of examples shown in Appendix A.

FIG. 36 shows an example of entities 4800 automatically selected for a set of example Sentences in 1.1. and 1.2.

2 Examples of Test Scenarios, Test Conditions and Expected Results

Various examples depicting the automatic generation of the Test Artifacts are provided. The examples range from a simple sentence to compound ones including data. The Generated Test Intents are shown as well.

2.1 Simple Sentence 2.1.1 The ABC System May Generate the Report of Excellence

Intents:

1. The ABC System May Generate the Report of Excellence

| Scenario Description: generate the report of excellence<br>Test Condition ID: 001.TC |
|---|
| Test Condition:<br>The ABC system generates the report of excellence<br>Expected Result:<br>The ABC system should generate the report of excellence<br>Test Hints:<br>Verify the ABC system generates the report of excellence |

2.1.2 The Profile Page should Display the Nickname Selected During Registration

Intents:

1. The profile page should display the nickname
2. The nickname was selected during registration

| Scenario Description: display the nickname selected<br>Test Condition ID: 001.TC |
|---|
| Test Condition:<br>The profile page displays the nickname selected during registration<br>Expected Result:<br>The profile page should display the nickname selected during registration<br>Test Hints:<br>Verify the profile page displays the nickname<br>Verify the nickname was selected during registration |

2.1.3 Maintaining the Session, the System Will Delete the Table

Intents:

1. Maintaining the session
2. the system will delete the table

| Scenario Description: delete the table<br>Test Condition ID: 001.TC |
|---|
| Test Condition:<br>the system deletes the table, maintaining the session<br>Expected Result:<br>the system should delete the table, maintaining the session<br>Test Hints:<br>Maintaining the session<br>Verify the system deletes the table |

2.1.4 The System should Print the Report Selected Via the RTPS User Having Admin Privileges Intents:

1. the system should print the report
2. the report was selected via the RTPS user
3. the RTPS user is having admin privileges

| Scenario Description: print the report selected having admin privileges<br>Test Condition ID: 001.TC |
|---|
| Test Condition:<br>The system prints the report selected<br>Expected Result:<br>The system should print the report selected via the RTPS user having admin privileges<br>Test Hints:<br>Verify the system prints the report<br>Verify the report was selected via the RTPS user<br>Verify the RTPS user is having admin privileges |

2.1.5 The Password should Contain Alpha Numeric Characters Adhering to Policy

Intents:

1. the password should contain alpha numeric characters
2. alpha numeric characters are adhering to policy

| Scenario Description: contain alpha numeric characters adhering to policy<br>Test Condition ID: 001.TC |
|---|
| Test Condition:<br>The password contains alpha numeric characters adhering to policy<br>Expected Result:<br>The password should contain alpha numeric characters adhering to policy<br>Test Hints:<br>Verify the password contains alpha numeric characters<br>Verify alpha numeric characters are adhering to policy |

2.1.6 The Password should Contain Numbers Whose Total is 8

Intents:

1. the password should contain numbers
2. the numbers' total is 8

| Scenario Description: contain numbers<br>Test Condition ID: 001.TC |
|---|
| Test Condition:<br>The password contains numbers whose total is 8<br>Expected Result:<br>The password should contain numbers whose total is 8<br>Test Hints:<br>Verify the password contains numbers<br>Verify the numbers ' total is 8 |

2.1.7 The System should Generate a Password to Authenticate the User

Intents:

1. the system should generate a password
2. the password is generated to authenticate the user

| Scenario Description: generate a password<br>Test Condition ID: 001.TC |
|---|
| Test Condition:<br>The system generates a password to authenticate the user<br>Expected Result:<br>The system should generate a password to authenticate the user<br>Test Hints:<br>Verify the system generates a password<br>Verify the password is generated to authenticate the user |

2.1.8 The User should Click the PRT Button to Print the Page

Intents:

1. the user should click the PRT button
2. the PRT button is clicked to print the page

| Scenario Description: click the PRT button<br>Test Condition ID: 001.TC |
|---|
| Test Condition:<br>The user clicks the PRT button to print the page<br>Expected Result:<br>The user should click the PRT button to print the page<br>Test Hints:<br>Verify the user clicks the PRT button<br>Verify the PRT button is clicked to print the page |

2.2 Compound Sentences

This section contains example sentences which are simplified using scenario generation module 4006 and/or the test condition logic 4008. Various cases of "compoundness" are provided as examples. The Term provided in the brackets "( )" corresponds to the Link of a link grammar parser logic 1014 for the given case.

2.2.1 Neither/Nor (SJn)

Explanation: These examples relate to the case having "Neither/Nor" in the sentence. Such a sentence should have the link SJn when passed through link grammar parser logic 1014.

2.2.1.1 Neither the Customer Nor the Guest should Delete the Profile.

Intents:

1. the customer should not delete the profile
2. the guest should not delete the profile

| Scenario Description: not delete the profile<br>Test Condition ID: 001.TC |
|---|
| Test Condition:<br>the customer and the guest do not delete the profile<br>Expected Result:<br>the customer and the guest should not delete the profile<br>Test Hints:<br>Verify the customer does not delete the profile<br>Verify the guest does not delete the profile |

2.2.2 Conjunctions (SJ)

2.2.2.1 The Admin and User should Edit the Profile.

Intents:

1. the admin should edit the profile
2. the user should edit the profile

| Scenario Description: edit the profile<br>Test Condition ID: 001.TC |
|---|
| Test Condition:<br>The admin and user edit the profile<br>Expected Result:<br>The admin and user should edit the profile<br>Test Hints:<br>Verify the admin edits the profile<br>Verify the user edits the profile |

2.2.2.2 The Admin or User should Edit the Profile.

Intents:

1. the admin should edit the profile
2. the user should edit the profile

| Scenario Description: edit the profile |
|---|
| Test Condition ID: 001.TC |
| Test Condition:<br>The admin edits the profile<br>Expected Result:<br>The admin should edit the profile<br>Test Hints:<br>Verify the admin edits the profile |
| Test Condition ID: 002.TC |
| Test Condition:<br>The user edits the profile<br>Expected Result:<br>The user should edit the profile<br>Test Hints:<br>Verify the user edits the profile |

2.2.3 Conjunctions (VJ)

2.2.3.1 The Admin should be Able to Add or Delete the User

Intents:

1. the admin should add the user
2. the admin should delete the user

| Scenario Description: add the user or delete the user |
| --- |
| Test Condition ID: 001.TC<br>Test Condition:<br>The admin can add the user<br>Expected Result:<br>The admin should add the user<br>Test Hints:<br>Verify the admin can add the user |
| Test Condition ID: 002.TC<br>Test Condition:<br>The admin can delete the user<br>Expected Result:<br>The admin should delete the user<br>Test Hints:<br>Verify the admin can delete the user |

2.2.3.2 The Front End or Data Entry User should be Able to Add and Delete the Profile Intents:

1. the front end should add the profile
2. the front end should delete the profile
3. the data entry user should add the profile.
4. the data entry user should delete the profile

| Scenario Description: add the profile and delete the profile |
| --- |
| Test Condition ID: 001.TC<br>Test Condition:<br>The front end can add the profile and the front end can delete the profile<br>Expected Result:<br>The front end should add and delete the profile<br>Test Hints:<br>Verify the front end can add the profile<br>Verify the front end can delete the profile |
| Test Condition ID: 002.TC<br>Test Condition:<br>The data entry user can add the profile and the data entry user can delete the profile<br>Expected Result:<br>The data entry user should add and delete the profile<br>Test Hints:<br>Verify the data entry user can add the profile<br>Verify the data entry user can delete the profile |

2.2.4 Dependent Clauses (CO)

2.2.4.1 When the User has Submitted, the Application should not be Editable

Intents:

1. the user has submitted
2. the application should not be editable

| Scenario Description: the application should not be editable |
| --- |
| Test Condition ID: 001.TC<br>Test Condition:<br>When the user has submitted, the application is not editable<br>Expected Result:<br>the application should not be editable<br>Test Hints:<br>Ensure the user has submitted<br>Verify the application is not editable |
| Test Condition ID: 002.TC<br>Test Condition:<br>When the user has not submitted, the application is editable |

-continued

| Scenario Description: the application should not be editable |
| --- |
| Expected Result:<br>the application should be editable<br>Test Hints:<br>Ensure the user does not have submitted<br>Verify the application is editable |

2.2.5 Dependent Clauses (Ce)

2.2.5.1 The System should Ensure that the User Holds a Valid Login Id.

Intents:

1. the user holds a valid login Id.
2. the system should ensure that above holds true

| Scenario Description: the user holds a valid login Id.<br>Test Condition ID: 001.TC |
| --- |
| Test Condition:<br>The system ensures that the user holds a valid login Id.<br>Expected Result:<br>The system should ensure that the user should a valid login Id.<br>Test Hints:<br>Verify the user holds a valid login Id.<br>Verify the system ensures that above holds true |

2.2.6 Dependent Clauses (Cr, Mr)

2.2.6.1 The System should Print the Report which the ACBG System has Displayed in its List Intents:

1. the system should print the report
2. the report is what the ACBG system has displayed in its list

| Scenario Description: print the report<br>Test Condition ID: 001.TC |
| --- |
| Test Condition:<br>The system prints the report which the ACBG system has displayed in its list<br>Expected Result:<br>The system should print the report which the ACBG system has displayed in its list<br>Test Hints:<br>Verify the system prints the report<br>Verify the report is what the ACBG system has displayed in its list |

2.2.7 Causal Clauses (Cs)

2.2.7.1 When the Edit Box is Enabled, the User Must be Able to Update the Form

Intents:

1. the edit box is enabled
2. the user must update the form

| Scenario Description: update the form |
| --- |
| Test Condition ID: 001.TC<br>Test Condition:<br>When the edit box is enabled, the user can update the form<br>Expected Result:<br>the user should update the form<br>Test Hints:<br>Ensure the edit box is enabled<br>Verify the user can update the form |

-continued

| Scenario Description: update the form |
| --- |
| Test Condition ID: 002.TC |
| Test Condition:<br>when the edit box is not enabled, the user cannot update the form<br>Expected Result:<br>The user cannot update the form<br>Test Hints:<br>Ensure the edit box is not enabled<br>Verify the user cannot update the form |

2.2.7.2 If a User is Identified as Marketing or Servicing, then the Campaign Management Hyperlink should be Displayed Intents:

1. a user is identified as Marketing
2. a user is identified as Servicing
3. the Campaign Management hyperlink should be displayed

| Scenario Description: the Campaign Management hyperlink should be displayed |
| --- |
| Test Condition ID: 001.TC |
| Test Condition:<br>When a user is identified as Marketing, the Campaign Management hyperlink is displayed<br>Expected Result:<br>the Campaign Management hyperlink should be displayed<br>Test Hints:<br>Ensure a user is identified as Marketing<br>Verify the Campaign Management hyperlink is displayed<br>Test Condition ID: 002.TC |
| Test Condition:<br>When a user is identified as Servicing, the Campaign Management hyperlink is displayed<br>Expected Result:<br>the Campaign Management hyperlink should be displayed<br>Test Hints:<br>Ensure a user is identified as Servicing<br>Verify the Campaign Management hyperlink is displayed<br>Test Condition ID: 003.TC |
| Test Condition:<br>When a user is not identified as Marketing and a user is not identified as Servicing, the Campaign Management hyperlink is not displayed<br>Expected Result:<br>the Campaign Management hyperlink should not be displayed<br>Test Hints:<br>Ensure a user is not identified as Marketing<br>Ensure a user is not identified as Servicing<br>Verify the Campaign Management hyperlink is not displayed |

2.2.7.3 If a User is Identified as Marketing or Servicing and has a Name or Profile, then the Campaign Management Hyperlink should be Displayed Intents:

1. a user is identified as Marketing
2. a user has a name
3. a user is identified as Servicing
4. a user has a name
5. a user is identified as Marketing
6. a user has the profile
7. a user is identified as Servicing
8. a user has the profile
9. the Campaign Management hyperlink should be displayed

| Scenario Description: the Campaign Management hyperlink should be displayed |
| --- |
| Test Condition ID: 001.TC |
| Test Condition:<br>When a user is identified as Marketing and a user has a name, the Campaign Management hyperlink is displayed<br>Expected Result:<br>the Campaign Management hyperlink should be displayed<br>Test Hints:<br>Ensure a user is identified as Marketing<br>Ensure a user has a name<br>Verify the Campaign Management hyperlink is displayed<br>Test Condition ID: 002.TC |
| Test Condition:<br>When a user is identified as Servicing and a user has a name, the Campaign Management hyperlink is displayed<br>Expected Result:<br>the Campaign Management hyperlink should be displayed<br>Test Hints:<br>Ensure a user is identified as Servicing<br>Ensure a user has a name<br>Verify the Campaign Management hyperlink is displayed<br>Test Condition ID: 003.TC |
| Test Condition:<br>When a user is identified as Marketing and a user has the profile, the Campaign Management hyperlink is displayed<br>Expected Result:<br>the Campaign Management hyperlink should be displayed<br>Test Hints:<br>Ensure a user is identified as Marketing<br>Ensure a user has the profile<br>Verify the Campaign Management hyperlink is displayed<br>Test Condition ID: 004.TC |
| Test Condition:<br>When a user is identified as Servicing and a user has the profile, the Campaign Management hyperlink is displayed<br>Expected Result:<br>the Campaign Management hyperlink should be displayed<br>Test Hints:<br>Ensure a user is identified as Servicing<br>Ensure a user has the profile<br>Verify the Campaign Management hyperlink is displayed<br>Test Condition ID: 005.TC |
| Test Condition:<br>When a user is not identified as Marketing and a user is not identified as Servicing, the Campaign Management hyperlink is not displayed<br>Expected Result:<br>the Campaign Management hyperlink should not be displayed<br>Test Hints:<br>Ensure a user is not identified as Marketing<br>Ensure a user is not identified as Servicing<br>Verify the Campaign Management hyperlink is not displayed<br>Test Condition ID: 006.TC |
| Test Condition:<br>When a user does not have a name and a user does not have the profile, the Campaign Management hyperlink is not displayed<br>Expected Result:<br>the Campaign Management hyperlink should not be displayed<br>Test Hints:<br>Ensure a user does not have a name<br>Ensure a user does not have the profile<br>Verify the Campaign Management hyperlink is not displayed |

2.2.8 Independent Clauses (CC)

2.2.8.1 The Screen should Display the User's Home Page and the User should be Allowed to Alter it Intents:

1. the Screen should display the user's home page
2. the user should be allowed to alter it

| Scenario Description: display the user's home page and the user should be allowed to alter it Test Condition ID: 001.TC |
|---|
| Test Condition:<br>The Screen displays the user's home page and the user is allowed to alter it<br>Expected Result:<br>The Screen should display the user's home page and the user should be allowed to alter it<br>Test Hints:<br>Verify the Screen displays the user's home page<br>Verify the user is allowed to alter it |

2.3 Sentences with Data

2.3.1 Natural Number

2.3.1.1 If More than 250 Search Results are Found, the Search Must be Retried.

Intents:

1. >250 search results are found
2. the search must be re-tried

| Scenario Description: the search must be re-tried |
|---|
| Test Condition ID: 001.TC |
| Test Condition:<br>When >250 search results are found, the search is re-tried<br>Expected Result:<br>the search should be re-tried<br>Test Hints:<br>Ensure >250 search results are found<br>Verify the search is re-tried<br>Test Condition ID: 002.TC |
| Test Condition:<br>When =250 search results are found, the search is not re-tried<br>Expected Result:<br>the search must not be re-tried<br>Test Hints:<br>Ensure =250 search results are found<br>Verify the search is not re-tried<br>Test Condition ID: 003.TC |
| Test Condition:<br>When <250 search results are found, the search is not re-tried<br>Expected Result:<br>the search must not be re-tried<br>Test Hints:<br>Ensure <250 search results are found<br>Verify the search is not re-tried |

2.3.1.2 When the Employee Roll-Off Date from the Project is Less than 20 Days, the Reporting Module Shall Send email Notification to the Project Manager With Roll-Off Information.

Intents:

1. the employee roll-off date from the project is <20 days
2. the Reporting module shall send email notification
3. email notification is sent to the Project Manager
4. email notification is sent with roll-off information

| Scenario Description: send email notification |
|---|
| Test Condition ID: 001.TC |
| Test Condition:<br>When the employee roll-off date from the project is <20 days, the Reporting module sends email notification to the Project Manager<br>Expected Result:<br>the Reporting module should send email notification to the Project Manager with roll-off information<br>Test Hints:<br>Ensure the employee roll-off date from the project is <20 days<br>Verify the Reporting module sends email notification<br>Verify email notification is sent to the Project Manager<br>Verify email notification is sent with roll-off information<br>Test Condition ID: 002.TC |
| Test Condition:<br>When the employee roll-off date from the project is =20 days, the Reporting module does not send email notification to the Project Manager<br>Expected Result:<br>the Reporting module shall not send email notification to the Project Manager with roll-off information<br>Test Hints:<br>Ensure the employee roll-off date from the project is =20 days<br>Verify the Reporting module does not send email notification<br>Test Condition ID: 003.TC |
| Test Condition:<br>When the employee roll-off date from the project is >20 days, the Reporting module does not send email notification to the Project Manager<br>Expected Result:<br>the Reporting module shall not send email notification to the Project Manager with roll-off information<br>Test Hints:<br>Ensure the employee roll-off date from the project is >20 days<br>Verify the Reporting module does not send email notification |

2.3.2 Boolean

2.3.2.1 When Ignition is ON, the Polling Pattern System should Give Priority to the TPMS Message.

Intents:

1. ignition is on
2. the polling pattern system should give priority
3. priority is given to the TPMS message

| Scenario Description: give priority |
|---|
| Test Condition ID: 001.TC |
| Test Condition:<br>When ignition is on, the polling pattern system gives priority to the TPMS message<br>Expected Result:<br>the polling pattern system should give priority to the TPMS message<br>Test Hints:<br>Ensure ignition is on<br>Verify the polling pattern system gives priority<br>Verify priority is given to the TPMS message<br>Test Condition ID: 002.TC |
| Test Condition:<br>When ignition is != on, the polling pattern system does not give priority to the TPMS message<br>Expected Result:<br>the polling pattern system should not give priority to the TPMS message<br>Test Hints:<br>Ensure ignition is != on<br>Verify the polling pattern system does not give priority |

2.3.3 Date & Time

2.3.3.1 If the Employee Registration Date is Before 1 Dec. 2011, then Increments Should be Given Intents:

1. the employee registration date is before 1 Dec. 2011
2. increments should be given

| Scenario Description: increments should be given |
| --- |
| Test Condition ID: 001.TC |
| Test Condition:<br>When the employee registration date is before 1 Dec. 2011, increments are given<br>Expected Result:<br>increments should be given<br>Test Hints:<br>Ensure the employee registration date is before 1 Dec. 2011<br>Verify increments are given |
| Test Condition ID: 002.TC |
| Test Condition:<br>When the employee registration date is on 1 Dec. 2011, increments are not given<br>Expected Result:<br>increments should not be given<br>Test Hints:<br>Ensure the employee registration date is on 1 Dec. 2011<br>Verify increments are not given |
| Test Condition ID: 003.TC |
| Test Condition:<br>When the employee registration date is after 1 Dec. 2011, increments are not given<br>Expected Result:<br>increments should not be given<br>Test Hints:<br>Ensure the employee registration date is after 1 Dec. 2011<br>Verify increments are not given |

2.3.3.2 The System should Print the Report Selected by the Manager after 5 am

Intents:

1. the system should print the report
2. the report was selected by the manager
3. the report was selected after 5 am

| Scenario Description: print the report selected |
| --- |
| Test Condition ID: 001.TC |
| Test Condition:<br>The system prints the report selected by the manager after 5 am<br>Expected Result:<br>The system should print the report selected by the manager after 5am<br>Test Hints:<br>Verify the system prints the report<br>Verify the report was selected by the manager<br>Verify the report was selected after 5 am |
| Test Condition ID: 002.TC |
| Test Condition:<br>The system does not print the report selected by the manager before 5 am<br>Expected Result:<br>The system should not print the report selected by the manager before 5 am<br>Test Hints:<br>Ensure the Time is before 5 am<br>Verify the system does not print the report |
| Test Condition ID: 003.TC |
| Test Condition:<br>The system does not print the report selected by the manager on 5 am<br>Expected Result:<br>The system should not print the report selected by the manager on 5 am<br>Test Hints:<br>Ensure the Time is on 5 am<br>Verify the system does not print the report |

2.4 Specific Examples of Negative Test Conditions 2.4.1 Sub-Ordinate Conjunctions 2.4.1.1 If the User is from Marketing, the System Must Enable the 'Sales & Marketing' Functions Intents:

1. the user is from marketing
2. the system must enable the 'Sales & Marketing' functions

| Scenario Description: enable the 'Sales & Marketing' functions |
| --- |
| Test Condition ID: 001.TC |
| Test Condition:<br>When the user is from marketing, the system enables the 'Sales & Marketing' functions<br>Expected Result:<br>the system should enable the 'Sales & Marketing' functions<br>Test Hints:<br>Ensure the user is from marketing<br>Verify the system enables the 'Sales & Marketing' functions |
| Test Condition ID: 002.TC |
| Test Condition:<br>When the user is not from marketing, the system does not enable the 'Sales & Marketing' functions<br>Expected Result:<br>the system must not enable the 'Sales & Marketing' functions<br>Test Hints:<br>Ensure the user is not from marketing<br>Verify the system does not enable the 'Sales & Marketing' functions |

2.4.2 Sub-Ordinate Conjunctions+BVA 2.4.2.1 The Low Fuel Warning Indicator should be Illuminated when the Fuel Level has Fallen Below 15% Usable Fuel Intents:

1. the fuel level has fallen below 15% usable fuel
2. the low fuel warning indicator should be illuminated

| Scenario Description: the low fuel warning indicator should be illuminated |
| --- |
| Test Condition ID: 001.TC |
| Test Condition:<br>When the fuel level has fallen below 15% usable fuel, the low fuel warning indicator is illuminated<br>Expected Result:<br>The low fuel warning indicator should be illuminated<br>Test Hints:<br>Ensure the fuel level has fallen below 15% usable fuel<br>Verify the low fuel warning indicator is illuminated |
| Test Condition ID: 002.TC |
| Test Condition:<br>When the fuel level has fallen =15% usable fuel, the low fuel warning indicator is not illuminated<br>Expected Result:<br>The low fuel warning indicator should not be illuminated<br>Test Hints:<br>Ensure the fuel level has fallen =15% usable fuel<br>Verify the low fuel warning indicator is not illuminated |
| Test Condition ID: 003.TC |
| Test Condition:<br>When the fuel level has fallen >15% usable fuel, the low fuel warning indicator is not illuminated<br>Expected Result:<br>The low fuel warning indicator should not be illuminated<br>Test Hints:<br>Ensure the fuel level has fallen >15% usable fuel<br>Verify the low fuel warning indicator is not illuminated |

2.4.3 Coordinating Conjunctions 2.4.3.1 If User is an Admin or Data Owner, System should Allow the User to Update Access-Log Data Intents:

1. user is an admin
2. user is the data owner 3. system should allow the user to update access-log data

| Scenario Description: allow the user to update access-log data |
|---|
| Test Condition ID: 001.TC |
| Test Condition: When user is an admin, system allows the user to update access-log data Expected Result: system should allow the user to update access-log data Test Hints: Ensure user is an admin Verify system allows the user to update access-log data |
| Test Condition ID: 002.TC |
| Test Condition: When user is the data owner, system allows the user to update access-log data Expected Result: system should allow the user to update access-log data Test Hints: Ensure user is the data owner Verify system allows the user to update access-log data |
| Test Condition ID: 003.TC |
| Test Condition: When user is not an admin and user is not the data owner, system does not allow the user to update access-log data Expected Result: system should not allow the user to update access-log data Test Hints: Ensure user is not an admin Ensure user is not the data owner Verify system does not allow the user to update access-log data |

2.4.4 Role/Permission/Action Negation

2.4.4.1 When the Admin User Creates a Table, the Delete Option Must be Displayed Intents:

1. the admin user creates a table
2. the delete option must be displayed

| Scenario Description: the delete option must be displayed |
|---|
| Test Condition ID: 001.TC |
| Test Condition: When the admin user creates a table, the delete option is displayed Expected Result: the delete option should be displayed Test Hints: Ensure the admin user creates a table Verify the delete option is displayed |
| Test Condition ID: 002.TC |
| Test Condition: When the non-admin user creates a table, the delete option is not displayed Expected Result: the delete option must not be displayed Test Hints: Ensure the non-admin user creates a table Verify the delete option is not displayed |

2.4.4.2 When the User with Admin Privileges Creates a Table, the Delete Option Must be Displayed Intents:

1. the user with admin privileges creates a table
2. the delete option must be displayed

| Scenario Description: the delete option must be displayed |
|---|
| Test Condition ID: 001.TC |
| Test Condition: When the user with admin privileges creates a table, the delete option is displayed Expected Result: the delete option should be displayed Test Hints: Ensure the user with admin privileges creates a table Verify the delete option is displayed |
| Test Condition ID: 002.TC |
| Test Condition: When the user without admin privileges creates a table, the delete option is not displayed Expected Result: the delete option must not be displayed Test Hints: Ensure the user without admin privileges creates a table Verify the delete option is not displayed |

2.4.4.3 When the User is Admin, the Delete Option Must be Displayed

Intents:

1. the user is admin
2. the delete option must be displayed

| Scenario Description: the delete option must be displayed |
|---|
| Test Condition ID: 001.TC |
| Test Condition: When the user is admin, the delete option is displayed Expected Result: the delete option should be displayed Test Hints: Ensure the user is admin Verify the delete option is displayed |
| Test Condition ID: 002.TC |
| Test Condition: When the user is not admin, the delete option is not displayed Expected Result: the delete option must not be displayed Test Hints: Ensure the user is not admin Verify the delete option is not displayed |

2.4.4.4 Project Resource Management System Will not Allow Employee to Login if Employee does not have Access Rights Intents:

1. employee does not have access rights
2. project Resource Management System will not allow Employee to login

| Scenario Description: not allow Employee to login |
|---|
| Test Condition ID: 001.TC |
| Test Condition: When employee does not have access rights, project Resource Management System does not allow Employee to login Expected Result: Project Resource Management System should not allow Employee to login Test Hints: Ensure employee does not have access rights Verify project Resource Management System does not allow Employee to login |

-continued

Scenario Description: not allow Employee to login

Test Condition ID: 002.TC

Test Condition:
When employee does have access rights, project Resource Management System allows Employee to login
Expected Result:
Project Resource Management System will allow Employee to login
Test Hints:
Ensure employee does have access rights
Verify project Resource Management System allows Employee to login

2.4.5 Only/Except Negation

2.4.5.1 Only the Admin should be Able to Delete the Table

Intents:

1. The admin should delete the table

Scenario Description: delete the table

Test Condition ID: 001.TC

Test Condition:
the admin can delete the table
Expected Result:
the admin should delete the table
Test Hints:
Verify the admin can delete the table Test Condition ID: 002.TC Test Condition:
the non-admin cannot delete the table
Expected Result:
the non-admin should not be able to delete the table
Test Hints:
Verify the non-admin cannot delete the table

2.4.5.2 Only Owners with Appropriate Access Rights can Edit the Quote Once Placed Intents:

1. owners with appropriate access rights can edit the quote
2. the quote was once placed Scenario Description: edit the quote once placed Test Condition ID: 001.TC Test Condition:
owners with appropriate access rights can edit the quote once placed
Expected Result:
owners with appropriate access rights should have the ability to edit the quote once placed
Test Hints:
Verify owners with appropriate access rights can edit the quote
Verify the quote was once placed Test Condition ID: 002.TC Test Condition:
non- owners with appropriate access rights cannot edit the quote once placed
Expected Result:
non- owners with appropriate access rights cannot edit the quote once placed
Test Hints:
Verify non- owners with appropriate access rights cannot edit the quote Test Condition ID: 003.TC Test Condition:
owners without appropriate access rights cannot edit the quote once placed
Expected Result:
owners without appropriate access rights cannot edit the quote once placed
Test Hints:
Verify owners without appropriate access rights cannot edit the quote

2.4.5.3 The Two Byte Address Field for all Records Except for the Data Record Shall be all Zeros.

Intents:

1. the two byte address field for all records except for the Data Record shall be all zeros Scenario Description: the two byte address field for all records except for the Data Record is all zeros Test Condition ID: 001.TC Test Condition:
The two byte address field for all records except for the Data Record is all zeros
Expected Result:
The two byte address field for all records except for the Data Record should be all zeros
Test Hints:
Verify the two byte address field for all records except for the Data Record is all zeros Test Condition ID: 002.TC Test Condition:
The two byte address field for the Data Record is not all zeros
Expected Result:
The two byte address field for the Data Record shall not be all zeros
Test Hints:
Verify the two byte address field for the Data Record is not all zeros

What is claimed is:

1. A method for generating test artifacts for a requirements sentence, the method comprising:

receiving, by a processor, data that defines a first document;

searching, by the processor, the data to identify data sections that define a requirements sentence;

in response to identifying a requirements sentence, storing, by the processor, the data sections that define the requirements sentence to a memory in communication with the processor;

generating, a link grammar parser of a natural language processor, one or more links between pairs of words in the requirements sentence, wherein the link grammar parser labels the one or more links as linking pairs of words corresponding to at least one of: words that correspond to a subject, words that correspond to a noun phrase, and words that correspond to a verb phrase;

submitting the requirements sentence to a scenario generation module to obtain a test scenario for the requirements sentence, wherein determination of the test scenario is based at least in part on the one or more links generated between pairs of words in the requirement sentence;

submitting the requirements sentence to test condition logic executed by a processor to obtain a test condition and expected result based on the requirements sentence; and generating a report containing the test scenario, test condition, and expected result.

2. The method of claim 1, where the scenario generation module applies a test scenario generation ruleset to the requirement statement to identify the test scenario.

3. The method of claim 1, further comprising:

identifying a test intent for the requirement statement using a test intent ruleset.

4. The method of claim 3, further comprising:

obtaining a test condition based on the test intent, wherein the test intent is the smallest unit of the requirements sentence that is able to convey enough information to obtain a test condition from.

5. The method of claim 3, wherein the test condition logic analyzes the test intent to determine the test condition and expected result.

6. The method of claim 1, further comprising:

pre-processing the requirements sentence through pre-processor logic prior to submitting the requirements sentence to the scenario generation module.

7. The method of claim 1, further comprising:

pre-processing the requirements sentence through pre-processor logic, wherein the pre-processing includes partitioning the requirements sentence into a plurality of portions.

8. The method of claim 7, wherein at least one test intent is identified from at least one of the plurality of portions of the requirements sentence, wherein the test intent is the smallest unit of the requirements sentence that is able to convey enough information to obtain a test condition from.

9. The method of claim 1, wherein a test condition is generated for each test intent that is identified.

10. The method of claim 1, further comprising:

pre-processing the requirements sentence through pre-processor logic, wherein the pre-processing includes modifying the requirements sentence according to at least one rule from a pre-processor ruleset.

11. A method for generating a test condition and expected result for a requirements sentence, the method comprising:

receiving, by a processor, data that defines a first document;

searching, by the processor, the data to identify data sections that define a requirements sentence;

in response to identifying a requirements sentence, storing, by the processor, the data sections that define the requirements sentence to a memory in communication with the processor;

generating, by a link grammar parser of a natural language processor, one or more links between pairs of words in the requirements sentence, wherein the link grammar parser labels the one or more links as linking pairs of words corresponding to at least one of: words that correspond to a subject, words that correspond to a noun phrase, and words that correspond to a verb phrase;

identifying, with analysis logic executed by a processor, a test intent for the requirements sentence based at least one part on the one or more links generated by the link grammar parser;

arranging, with test condition logic executed by a processor, the test intent into a positive test condition and positive expected result.

12. The method of claim 11, further comprising:

generating, with the test condition logic, a negative test condition and negative expected result.

13. The method of claim 11, further comprising:

arranging, with the test condition logic, the one or more test intents into a positive test sequence.

14. The method of claim 11, further comprising: displaying the positive test condition and positive expected result.

15. The method of claim 11, further comprising:

parsing the requirements sentence using an entity extractor prior to parsing the requirements sentence using the link grammar parser.

16. The method of claim 11, wherein parsing the requirements sentence using the entity extractor comprises at least identifying noun units within the requirements sentence, and wherein parsing the requirements sentence using the link grammar parser comprises recognizing each noun unit as a noun.

17. A requirements sentence testing system comprising:

a natural language processor that includes a grammatical parser logic configured to generate one or more links between pairs of words in a requirements sentence, wherein the link grammar parser labels the one or more links as linking pairs of words corresponding to at least one of: words that correspond to a subject, words that correspond to a noun phrase, and words that correspond to a verb phrase;

a second processor;

a memory in communication with the second processor that includes instruction code for causing the second processor to obtain a requirements sentence and store the requirements sentence in the memory;

communicate the requirements sentence to the grammatical parser logic to obtain a parsed requirements sentence;

identify a test intent for the requirements sentence using the parsed requirement statement; and test condition logic operable to, when executed by the processor:

obtain the test intent from the analysis logic; and arrange the test intent into a positive test condition and positive expected result.

18. The system of claim 17, further comprising:

a pre-processor operable to pre-process the requirements sentence prior to submitting the requirements sentence to a scenario generation module to obtain a test scenario for the requirements sentence.

19. The system of claim 17, further comprising:

a pre-processor operable to partition the requirement statement into multiple portions, and where the analysis logic is further operable to identify the test intent from at least one portion of the requirements sentence.

20. The system of claim 17, further comprising:

a pre-processor operable to modify the requirements sentence according to at least one rule from a pre-processor ruleset.

* * * * *